(12) United States Patent
Hara et al.

(10) Patent No.: US 7,308,964 B2
(45) Date of Patent: Dec. 18, 2007

(54) VEHICLE STEERING APPARATUS

(75) Inventors: Kazuo Hara, Kanagawa (JP); Noriki Kubokawa, Kanagawa (JP); Tetsuya Osonoi, Kanagawa (JP); Takaaki Eguchi, Yokohama (JP); Kiyotaka Shitamitsu, Kanagawa (JP); Hitoshi Ono, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 241 days.

(21) Appl. No.: 10/952,917

(22) Filed: Sep. 30, 2004

(65) Prior Publication Data

US 2005/0072621 A1    Apr. 7, 2005

(30) Foreign Application Priority Data

| Oct. 2, 2003 | (JP) | ............................. 2003-344519 |
| Oct. 2, 2003 | (JP) | ............................. 2003-344520 |
| Oct. 2, 2003 | (JP) | ............................. 2003-344839 |
| Nov. 26, 2003 | (JP) | ............................. 2003-395960 |

(51) Int. Cl.
   *B62D 5/04*    (2006.01)

(52) U.S. Cl. ........................ 180/446; 180/402; 180/405

(58) Field of Classification Search ................ 180/402, 180/405, 446
   See application file for complete search history.

(56) References Cited

U.S. PATENT DOCUMENTS

| 2,757,014 | A | | 7/1956 | Schmitz | |
| 4,753,308 | A | * | 6/1988 | Noto et al. ................. | 180/446 |
| 6,176,341 | B1 | * | 1/2001 | Ansari ........................ | 180/402 |
| 6,345,681 | B1 | * | 2/2002 | Hackl et al. ................ | 180/402 |
| 6,442,462 | B1 | | 8/2002 | Nishizaki et al. | |
| 6,548,969 | B2 | * | 4/2003 | Ewbank et al. ............... | 318/34 |
| 6,554,094 | B1 | * | 4/2003 | Bell et al. .................... | 180/402 |
| 6,622,813 | B2 | * | 9/2003 | Matz et al. ................... | 180/411 |
| 6,715,578 | B2 | | 4/2004 | Shimizu et al. | |
| 2002/0060106 | A1 | * | 5/2002 | Kogiso ....................... | 180/446 |
| 2003/0213641 | A1 | * | 11/2003 | Nakano et al. ............. | 180/446 |
| 2005/0087390 | A1 | * | 4/2005 | Furumi et al. .............. | 180/446 |
| 2005/0257992 | A1 | * | 11/2005 | Shiino et al. ............... | 180/444 |

FOREIGN PATENT DOCUMENTS

| DE | 199 02 556 A1 | 7/2000 |
| JP | 2002-145098 A | 5/2002 |
| JP | 2002-225733 A | 8/2002 |
| JP | 2003-165453 A | 6/2003 |
| KR | 1999-015815 A | 3/1999 |

* cited by examiner

*Primary Examiner*—Lesley D. Morris
*Assistant Examiner*—Marlon Arce-Diaz
(74) *Attorney, Agent, or Firm*—Foley & Lardner LLP

(57) ABSTRACT

A vehicle steering apparatus includes a steering input section having at least a steering wheel to which steering input is applied, and a steering output section having at least a steering rack shaft and operatively associated with left and right steered wheels for steering the steered wheels by steering-rack-shaft movement produced by a steering force determined based on the steering input and transmitted directly or indirectly to the steering rack shaft. The steering rack shaft is split into left and right movable rack shaft portions. Also provided is a steer angle converter enabling a differential rack stroke between left and right rack strokes of the left and right movable rack shaft portions. The steer angle converter is constructed by at least one of a variable-pitch dual rack arrangement and a dual taper-pulley arrangement of a cable back-up mechanism.

32 Claims, 41 Drawing Sheets

FIG.12

[DURING RIGHT-HAND TURN]

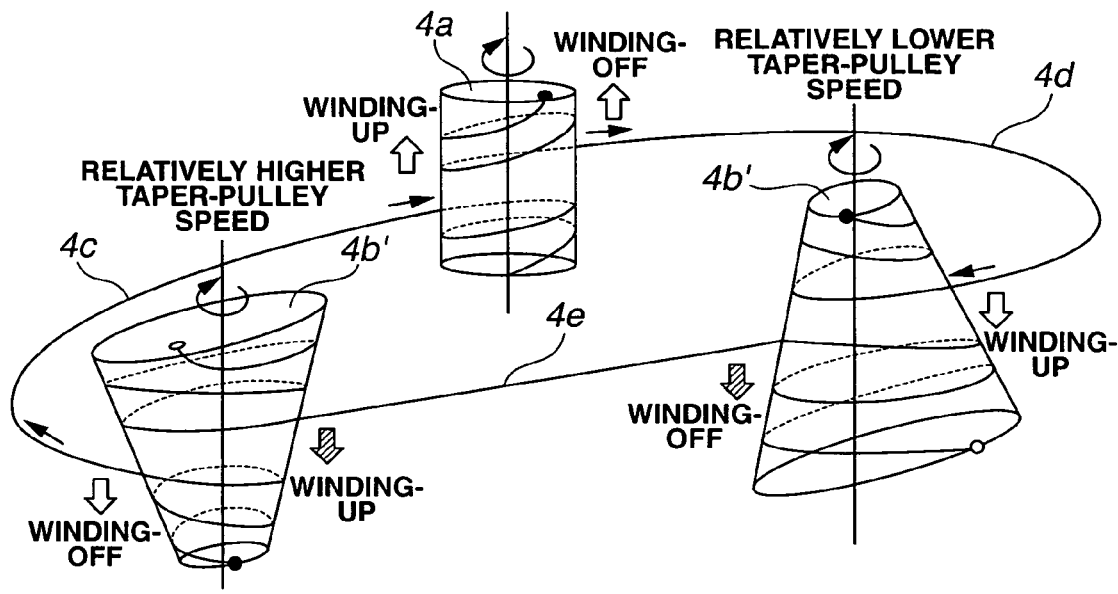

FIG.13A
WITH NO DIFFERENTIAL RACK STROKE
BETWEEN LEFT AND RIGHT RACKS ON TURNS

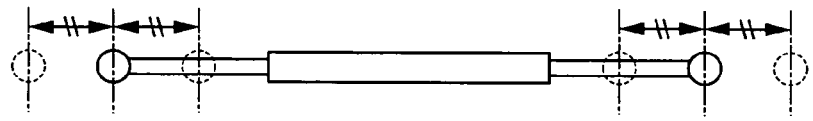

FIG.13B
WITH DIFFERENTIAL RACK STROKE THAT RACK STROKE OF RACK
SHAFT PORTION EXTENDING OUTSIDE IS GREATER THAN THAT OF RACK
SHAFT PORTION CONTRACTING INSIDE ON TURNS

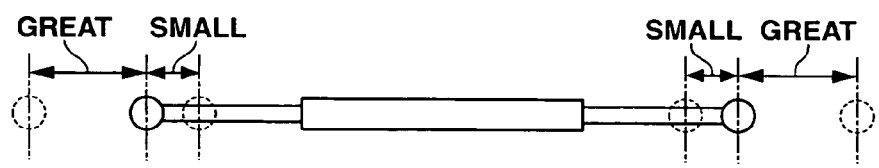

FIG.13C
WITH DIFFERENTIAL RACK STROKE THAT RACK STROKE OF RACK
SHAFT PORTION EXTENDING OUTSIDE IS SMALLER THAN THAT OF RACK
SHAFT PORTION CONTRACTING INSIDE ON TURNS

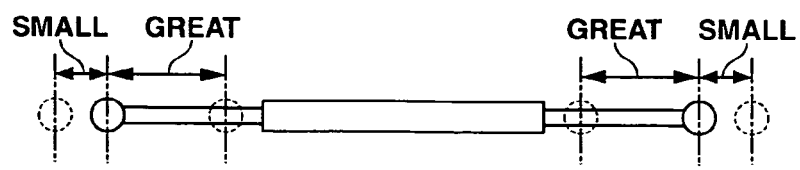

VEHICLE STEERING APPARATUS

TECHNICAL FIELD

The present invention relates to a vehicle steering apparatus through which steered wheels are turned by movement of a rack shaft of a rack-and-pinion steering gear device in presence of steering input to a steering wheel, and more specifically to a steer-by-wire (SBW) vehicle steering apparatus with a back-up system disposed between an operating section or a steering input section (containing a steering wheel) and a steering output section (containing a rack-and-pinion steering gear device) linked to steered wheels, and an SBW controller capable of executing (i) an SBW operating mode for SBW control for both of the steering input and output sections mechanically separated from each other and (ii) a back-up operating mode during which the steering input and output sections are mechanically coupled to each other via the back-up system, in presence of an SBW system failure.

BACKGROUND ART

In recent years, there have been proposed and developed various automotive SBW vehicle steering systems in which a steering reaction torque (or a steering reaction force) applied to a steering wheel and a steer angle at steered road wheels can be arbitrarily determined. Such an automotive SBW vehicle steering apparatus generally employs a mechanical back-up system in a middle of a column shaft for mechanically coupling steering input and output sections to each other via the mechanical back-up system during a back-up operating mode (or a fail-safe operating mode) initiated due to an SBW system failure. The use of a cable back-up mechanism (flexible torque-transmission means) as the mechanical back-up system is very advantageous with respect to enhanced layout design flexibility of a cockpit, reduction in noise and vibration input from the road surface via the steered wheels to the steering wheel, and elimination of shock or impact in presence of frontal collision. One such SBW vehicle steering apparatus with a cable back-up mechanism has been disclosed in Japanese Patent Provisional Publication No. 2002-225733 (hereinafter is referred to as JP2002-225733). In the SBW vehicle steering apparatus of JP2002-225733, the back-up operating mode is achieved by engaging a clutch disposed between the cable back-up mechanism and a steering output section linked to steered wheels. In a similar manner to the cable back-up mechanism employed in the SBW vehicle steering apparatus of JP2002-225733, Japanese Patent Provisional Publication No. 2003-165453 (hereinafter is referred to as "JP2003-165453") discloses a cable steering column system of enhanced cockpit design flexibility realized by using flexible torque-transmission means such as Bowden cables instead of using a steering shaft mechanically linking a steering wheel to a rack-and-pinion steering gear box. Japanese Patent Provisional Publication No. 2002-145098 (hereinafter is referred to as "JP2002-145098") teaches the use of a clutch capable of mechanically coupling steering input and output sections to each other for back-up or fail-safe purposes in presence of an SBW system failure, and also teaches the use of a steering reaction-torque actuator applying a reaction torque (or a feedback torque) to a steering wheel and a dual steering actuator system comprised of primary and secondary steering actuators driving a rack-and-pinion steering gear device. In the SBW vehicle steering apparatus disclosed in JP2002-145098, the clutch, serving as the back-up mechanism, is provided in a middle of a steering shaft mechanically linking a steering wheel to a rack-and-pinion steering gear box. In absence of the SBW system failure, an SBW controller incorporated in the SBW system of JP2002-145098 executes SBW control for all of the steering reaction-torque actuator, and the primary and secondary steering actuators, with the clutch disengaged. Conversely in presence of the SBW system failure, the SBW controller executes a back-up operating mode (or a fail-safe operating mode) with the clutch engaged, so that a steering assist force is produced by means of the normally-operating actuators except the malfunctioning actuator.

SUMMARY OF THE INVENTION

However, the steering apparatus disclosed in JP2002-225733, JP2003-165453, and JP2002-145098 have the following drawbacks.

(A) In the steering apparatus disclosed in JP2002-225733, JP2003-165453, and JP2002-145098, a rack-and-pinion steering gear device is comprised of a sole rigid steering rack shaft, and thus the rack stroke of the left rack-shaft end and the rack stroke of the right rack-shaft end become identical to each other during steering operation. Under a condition where a slight steer-angle margin at a first one of left and right steered wheels still exists during the steering operation and additionally the second steered wheel, whose maximum allowable steer angle is less than that of the first steered wheel, comes into abutment with its stopper, further movement of the first steered wheel is stopped because of the same rack strokes at the left and right rack-shaft ends. This undesirably limits a minimum turning radius of the vehicle.

Furthermore, in case of the use of the rack-and-pinion steering gear device comprised of the sole rigid rack shaft, suppose that the proper relative installation-position relationship between the tie rods and steering knuckle arms is determined to ensure an Ackerman ratio or an Ackerman steer angle $\delta$ ($=L/R$), which is represented as only a ratio ($L/R$) of a wheelbase $L$ to a radius $R$ of turn, and correlates with the minimum radius of turn of the vehicle. A link efficiency of the steering linkage is also univocally determined by the relative installation-position relationship between the tie rods and steering knuckle arms. As is generally known, the link efficiency can be adjusted within layout limits by changing the suspension geometry. However, it is difficult to remarkably enhance or improve the link efficiency determined by the relative linkage installation-position relationship based on the Ackerman steer angle $\delta$ ($=L/R$) by way of only the suspension geometry, because of the layout limits. In case of the steering linkage of a comparatively low link efficiency, a steering actuator must be large-sized. In contrast, assuming that the proper installation-position relationship between the tie rods and steering knuckle arms is determined to provide a higher link efficiency, it is difficult to provide the required Ackerman steer angle $\delta$ ($=L/R$). Therefore, in case of the use of the sole rigid rack shaft, it would be desirable to balance two contradictory requirements, that is, enhanced link efficiency and required Ackerman steer angle.

(B) In the steering apparatus disclosed in JP2002-225733, the cable back-up mechanism is permanently mechanically linked to the steering wheel of the steering input section, and additionally the clutch is disposed between the cable back-up mechanism and the rack-and-pinion steering gear device linked to the steered road wheels. During the back-up operating mode with the clutch engaged, in the presence of excessive steering torque transmission from the steering wheel via the cable back-up mechanism and the rack-and-pinion steering gear device to the steered road wheels, the clutch tends to slip owing to the excessive torque. This results in a lack of the actual steer angle at the steered road wheels, that is, a minus deviation of the actual steer angle from the desired steer angle.

Furthermore, in the steering apparatus of JP2002-225733, the cable back-up mechanism is permanently linked via the column shaft to the steering wheel irrespective of whether the clutch is engaged or disengaged, inner cables of the cable back-up mechanism are wound up or off continuously in synchronism with rotation of the steering wheel, irrespective of whether the steering system is operated in the SBW operating mode or in the back-up operating mode. Owing to the continuous winding-up and winding-off operations, there is an increased tendency for the inner cable and the outer tube in sliding-contact with each other, to undesirably wear rapidly. This deteriorates the durability of the back-up mechanism. During the continuous winding-up and winding-off operations in synchronism with rotation of the steering wheel, friction between the inner cable and the outer tube means friction resistance to any movement of the steering wheel, in other words, increased steering effort, thus deteriorating a steering feel.

(C) As discussed above, JP2002-145098 teaches the use of the dual steering actuator system, namely the primary and secondary steering actuators used to drive the sole rigid rack shaft for steering. However, the steering apparatus of JP2002-145098 uses a single steering wheel angle sensor system needed for SBW control. In other words, JP2002-145098 fails to teach a dual steering wheel angle sensor system. Thus, in presence of the single steering wheel angle sensor system failure, it is impossible to detect the steering wheel angle by way of the single steering wheel angle sensor system. Immediately when the steering wheel angle sensor system failure occurs, the clutch is engaged to initiate the back-up operating mode. For the reasons discussed above, there is a problem of the discrepancy between the neutral position of the steering wheel and the neutral position corresponding to zero average steer angle of a pair of steered wheels after a transition from the SBW operating mode to the back-up operating mode has occurred.

Accordingly, it is a main object of the invention to provide a vehicle steering apparatus capable of giving a differential rack stroke between left and right rack shaft portions during steering operation, and thus further reducing a minimum radius of turn of the vehicle, for the substantially same steering system layout as the conventional steering apparatus.

It is another object of the invention to provide a vehicle steering apparatus capable of balancing two contradictory requirements, that is, enhanced steering link efficiency and required Ackerman steer angle (required Ackerman ratio).

It is another object of the invention to provide an SBW vehicle steering apparatus with a back-up mechanism, capable of compensating for and eliminating a deviation (or a lack) of the actual steer angle at steered wheels from the desired steer angle during a back-up operating mode, even in presence of undesirable slippage of a clutch used to couple steering input and output sections to each other via a back-up system, for instance due to excessive torque transmission above a power-transmission limit.

It is another object of the invention to provide an SBW vehicle steering apparatus with a back-up mechanism, capable of shifting from an SBW operating mode to a back-up operating mode, while ensuring a condition where there is a less discrepancy between a neutral position of a steering wheel and a neutral position corresponding to zero average steer angle of a pair of steered wheels, even in presence of a system failure of a single SBW control system.

In order to accomplish the aforementioned and other objects of the present invention, a vehicle steering apparatus comprises a steering input section having at least a steering wheel to which steering input is applied, a steering output section having at least a steering rack shaft and operatively associated with left and right steered wheels for steering the steered wheels by steering-rack-shaft movement produced by a steering force determined based on the steering input and transmitted directly or indirectly to the steering rack shaft, the steering rack shaft being split into left and right movable rack shaft portions, and a steer angle converter enabling a differential rack stroke between left and right rack strokes of the left and right movable rack shaft portions.

The other objects and features of this invention will become understood from the following description with reference to the accompanying drawings.

BRIEF DESCRIPTION OF THE DRAWINGS

FIG. 12 is a schematic view explaining only the principle of operation related to differential movement of two taper pulleys of a cable back-up mechanism, which can be applied to the vehicle steering apparatus of the modification of FIG. 7.

FIGS. 13A-13C are comparative diagrams, respectively showing the same rack stroke characteristic, the differential rack stroke characteristic, and the inverted differential rack stroke characteristic during leftward or rightward rack strokes.

DESCRIPTION OF THE PREFERRED EMBODIMENTS

Figure 1:
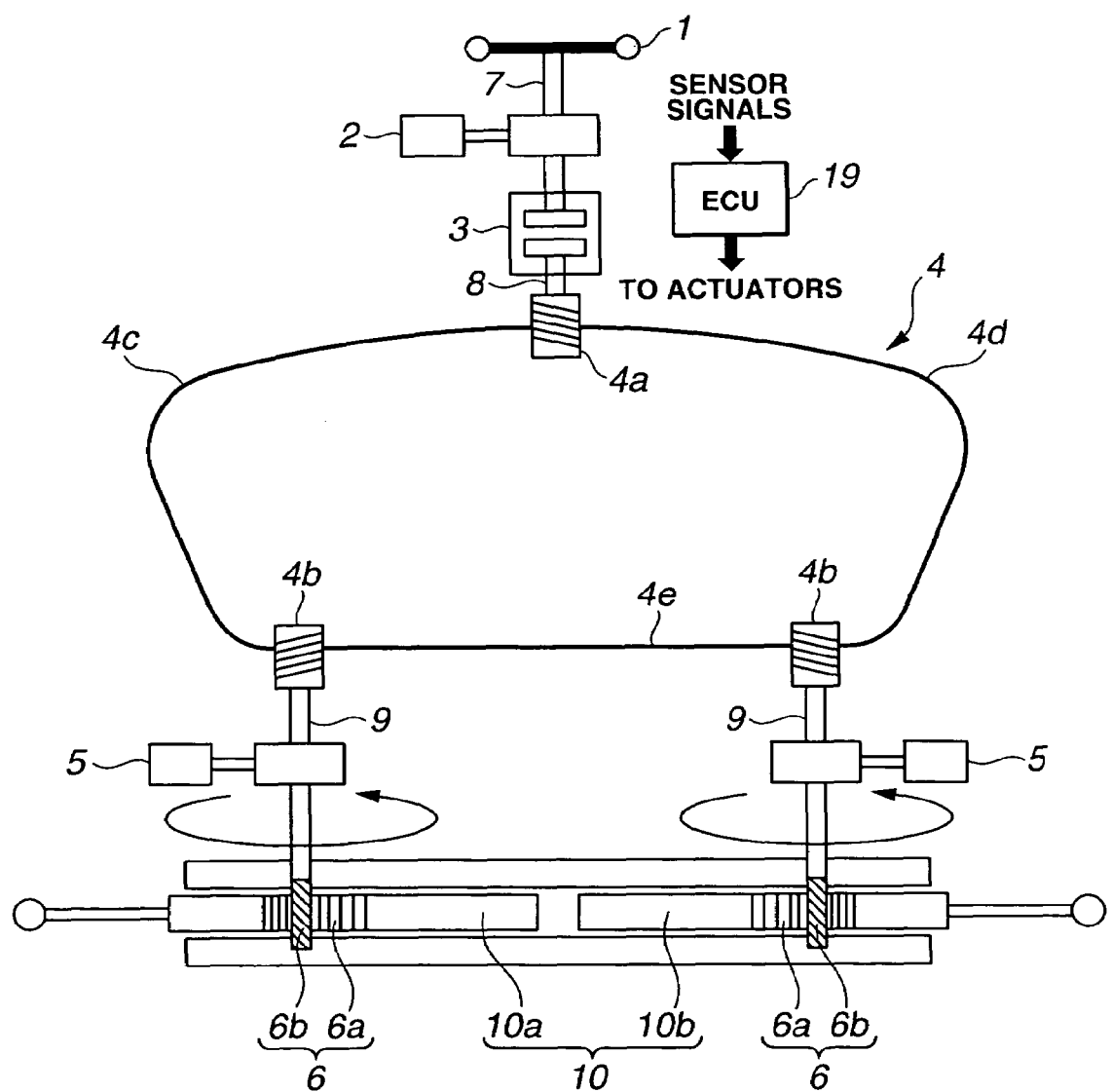
FIG. 1 is a system diagram illustrating an embodiment of a vehicle steering apparatus having a steer angle converter capable of giving a differential rack stroke between left and right racks.

Referring now to the drawings, particularly to FIG. 1, the vehicle steering apparatus of the embodiment is exemplified in an steer-by-wire (SBW) vehicle steering apparatus equipped with a reaction torque actuator (a reaction force actuator or a feedback actuator) 2, a clutch device 3, a cable back-up mechanism 4 having three pulleys 4a, 4b, and 4b, and two steering actuators 5, 5. Note that the vehicle steering apparatus of the embodiment has a two-split variable-pitch rack-and-pinion arrangement, simply a variable-pitch dual rack arrangement (described later), comprised of left and right variable-pitch racks (variable racks) 6, 6, being movable independently of each other and serving as a steer angle conversion mechanism (simply, a steer angle converter) that enables a differential rack stroke between left and right rack strokes. As seen in FIG. 1, a first column shaft 7 is connected to a steering wheel 1, serving as part of a steering input section.

Feedback actuator 2 is provided in a middle of first column shaft 7. Feedback actuator 2 functions to apply a feedback torque or a steering reaction torque (or a steering reaction force) to steering wheel 1 during an SBW system normal operating mode (simply, an SBW operating mode). The applied feedback torque is important to reproduce a virtual steering reaction torque correlated with the actual vehicle driving state, taken in by the driver through steering wheel 1. Feedback actuator 2 is operated in response to a command signal from an electronic control unit 19, often abbreviated to "ECU" (hereinafter is referred to as "steering controller"). That is, the magnitude and the direction of steering reaction torque, applied to feedback actuator 2, are determined based on the command signal from steering controller 19.

Clutch device 3 is disposed between first and second column shafts 7 and 8. Second column shaft 8 is fixedly connected to the steering input side pulley 4a of cable back-up mechanism 4. In the shown embodiment, clutch device 3 is comprised of a friction clutch such as an electromagnetic clutch or an electromagnetic mechanical clutch. Engagement/disengagement operation of clutch device 3 is electronically controlled in response to a command signal from the steering controller.

Cable back-up mechanism 4 serves as a back-up system or a fail-safe system in presence of an SBW system failure. In absence of an SBW system failure, that is, when the SBW system is normally operating, in other words, during SBW control mode, the operating section or the steering input section (steering wheel 1) is mechanically separated from the steering output section (containing the two-split rack-and-pinion steering gear device). In presence of an SBW system failure, the operating mode of the SBW vehicle steering apparatus is switched from the SBW operating mode to a back-up operating mode (a fail-safe operating mode) by means of the steering controller. During the back-up operating mode, clutch device 3 is switched from the disengaged state to the engaged state, and thus steering wheel 1 (the steering input section) is mechanically linked through cable back-up mechanism 4 via the steering output section containing the variable-pitch dual rack arrangement (described later in detail), to steered road wheels, with clutch device 3 engaged. As clearly shown in FIG. 1, cable back-up mechanism 4 is disposed between second column shaft 8 and the pinion shaft pair 9, 9. Cable back-up mechanism 4 is comprised of the steering input side pulley 4a, steering output side pulleys 4b, 4b, first and second cables 4c and 4d, and a third cable 4e. The steering input side pulley 4a is cylindrical in shape and fixedly connected to second column shaft 8. The steering output side pulleys 4b, 4b are cylindrical in shape, and fixedly connected to the respective pinion shafts 9, 9. The steering input side pulley 4a and a first one of the steering output side pulleys 4b, 4b are connected each other by first cable 4c. Also, the steering input side pulley 4a and the second steering output side pulley 4b are connected each other by second cable 4d. Additionally, the steering output side pulleys 4b, 4b are connected each other by third cable 4e. In the shown embodiment, each of cables 4c, 4d, and 4e is comprised of a Bowden cable, which is constructed by an outer tube and an inner cable slidably accommodated in the outer tube. Each of steering actuators 5, 5 is provided in a middle of the associated one of pinion shafts 9, 9. In the shown embodiment, steering actuator 5 is comprised of a DC motor. Alternatively, an AC motor may be used as steering actuator 5. During the SBW operating mode (or during SBW control in absence of the SBW system failure), each of steering actuators 5, 5 receives a command signal from the steering controller, in such a manner as to properly drive left and right pinion shafts 9, 9, in response to the command signal. In the SBW vehicle steering apparatus shown in FIG. 1, the variable-pitch dual rack arrangement is used. Concretely, a steering rack shaft 10 is split into two movable rack shaft portions, namely a left movable rack shaft portion 10a and a right movable rack shaft portion 10b. Toothed portions 6a, 6a of variable racks 6, 6 are respectively formed on left and right movable rack shaft portions 10a and 10b, such that the outermost end of the toothed portion of each of left and right variable racks 6, 6 has the minimum gear pitch, and the innermost end of the toothed portion of each of left and right variable racks 6, 6 has the maximum gear pitch, and the gear pitch gradually variably decreases from the innermost end to the outermost end. That is, each of the left and right variable-pitch rack-and-pinion mechanisms includes (i) a variable-pitch rack gear portion 6a whose gear pitch gradually decreases from the innermost end to the outermost end, and (ii) a pinion gear portion 6b formed on the lower end of pinion shaft 9 and in meshed-engagement with the associated variable-pitch rack gear portion 6a. With the previously-discussed variable-pitch dual rack arrangement (6, 6), when left and right steered road wheels, linked to the respective outer ends of left and right movable rack shaft portions 10a and 10b, are steered, a rack-stroke difference between left and right rack strokes can be provided (see FIGS. 3 and 4). That is, the variable-pitch dual rack arrangement (variable racks 6, 6) serves as the steer angle converter that gives the rack-stroke difference between left and right rack strokes during steering operation. By the use of the variable-pitch dual rack arrangement of FIG. 1 that the gear pitch of variable-pitch rack gear portion 6a gradually decreases from the innermost end to the outermost end, the relationship between rack strokes of left and right movable rack shaft portions 10a and 10b for the same pinion-shaft rotary motion becomes asymmetrical, in other words, a differential rack stroke (a differential movement) between left and right movable rack shaft portions 10a and 10b is given or produced for the same pinion-shaft rotary motion.

Figure 2:
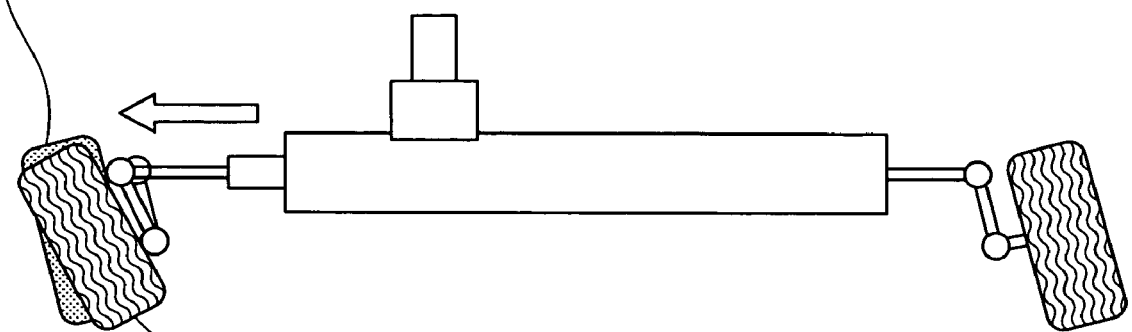
FIG. 2 is a comparative diagram explaining the difference between steer angles obtained by the steering apparatus of the embodiment capable of giving the differential rack stroke, and steer angles obtained by a general steering apparatus giving the same rack stroke at left and right rack-shaft ends.

FIG. 2 shows the difference between steer angles obtained by the vehicle steering apparatus of the embodiment using the variable-pitch dual rack arrangement and steer angles obtained by the general vehicle steering apparatus using the constant-pitch single rack arrangement. As can be seen from the comparative diagram of FIG. 2, with the constant-pitch single rack arrangement, when the right steered road wheel abuts its stopper, the left steered road wheel (see the left steered wheel marked by A in FIG. 2) is also stopped at the position, corresponding to the same steer angle but not identical to the actual limiting stop position of the left steered wheel. In other words, even when a slight steer-angle margin at the left steered wheel still exists and thus the actual limiting stop position of the left steered wheel is not yet reached, the left steered road wheel (see the left steered wheel marked by A in FIG. 2) is undesirably stopped by abutment between the right steered wheel and the stopper. In contrast to the above, with the variable-pitch dual rack arrangement of the embodiment of FIG. 1, by way of the use of left and right movable rack shaft portions 10a and 10b separated from each other, and the variable-pitch toothed portions of variable racks 6, 6, the SBW vehicle steering apparatus of the embodiment can provide a differential rack stroke between left and right rack strokes. As can be appreciated from comparison between the'steer angle of the left steered wheel marked by A in FIG. 2 and the steer angle of the left steered wheel marked by B in FIG. 2, in the steering apparatus of the embodiment using the variable-pitch dual rack arrangement, the steer angle of the left steered wheel having a relatively greater steer-angle margin than the right steered wheel can be further increased until the actual limiting stop position of the left steered wheel is reached (see the left steered wheel of the relatively increased steer angle, marked by B in FIG. 2). As a result of this, when the limiting stop position of the right steered wheel has been reached and thus the maximum allowable steer angle of the right steered wheel has been attained, the steer angle of the left steered wheel becomes greater than that of the right steered wheel. This permits the inner road wheel to follow a relatively shorter radius than the outer road wheel, and the circles on which the two steered wheels turn are geometrically approximately concentric. That is, their centers are at almost the same place. This means a reduction in the turning radius of the vehicle. Therefore, for automotive vehicles having the same layout and geometry in steering design, it is possible to effectively reduce the minimum turning radius.

Figure 3:
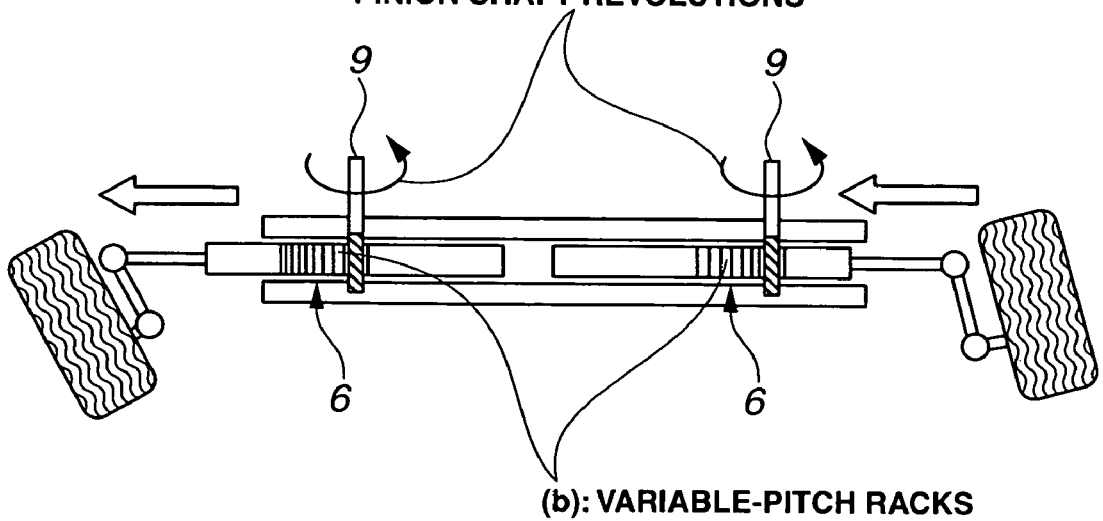
FIG. 3 is an explanatory view showing the operation of a pair of variable-pitch rack-and-pinion mechanisms provided in the steering apparatus of the embodiment to give the differential rack stroke.

As discussed above, in the variable-pitch dual rack arrangement of the vehicle steering apparatus of the embodiment shown in FIGS. 1-3, steering rack shaft 10 is split into two shaft portions, namely left and right movable rack shaft portions 10*a* and lob, and the variable-pitch toothed portions of variable racks 6, 6 are formed on the respective movable rack shaft portions 10*a* and 10*b*, such that the output motion (the rack stroke) of left movable rack shaft portion 10*a* based on input motion from left pinion shaft 9 is different from that of right movable rack shaft portion 10*b* based on input motion from right pinion shaft 9 having the same magnitude and the same rotational direction of input motion as left pinion shaft 9.

As is generally known, in case of a general two-split, independent rack-and-pinion system having a constant-pitch dual rack arrangement, in order to provide a differential rack stroke between left and right rack shaft portions separated from each other, the left-hand side rack-and-pinion mechanism and the right-hand-side rack-and-pinion mechanism have to be controlled independently of each other. In such a steering system, to ensure a differential rack stroke between the left and right racks, the number of revolutions of the left pinion shaft must be set to differ from that of the right pinion shaft.

On the other hand, in case of the variable-pitch dual rack arrangement used by the SBW vehicle steering apparatus of the embodiment of FIGS. 1-3, as best seen in FIG. 3, the variable-pitch toothed portions of variable racks 6, 6 are formed on the respective movable rack shaft portions 10*a* and 10*b*, it is possible to achieve a differential rack stroke by rotating two pinion shafts 9, 9 at the same speed. This eliminates the necessity of independent control for the left and right rack-and-pinion mechanisms, and also eliminates the necessity of a more complicated system. That is, by the use of the variable-pitch dual rack arrangement shown in FIGS. 1-3, it is possible to simplify the whole steering system configuration.

[Setting of Variable Racks]

Figure 4:
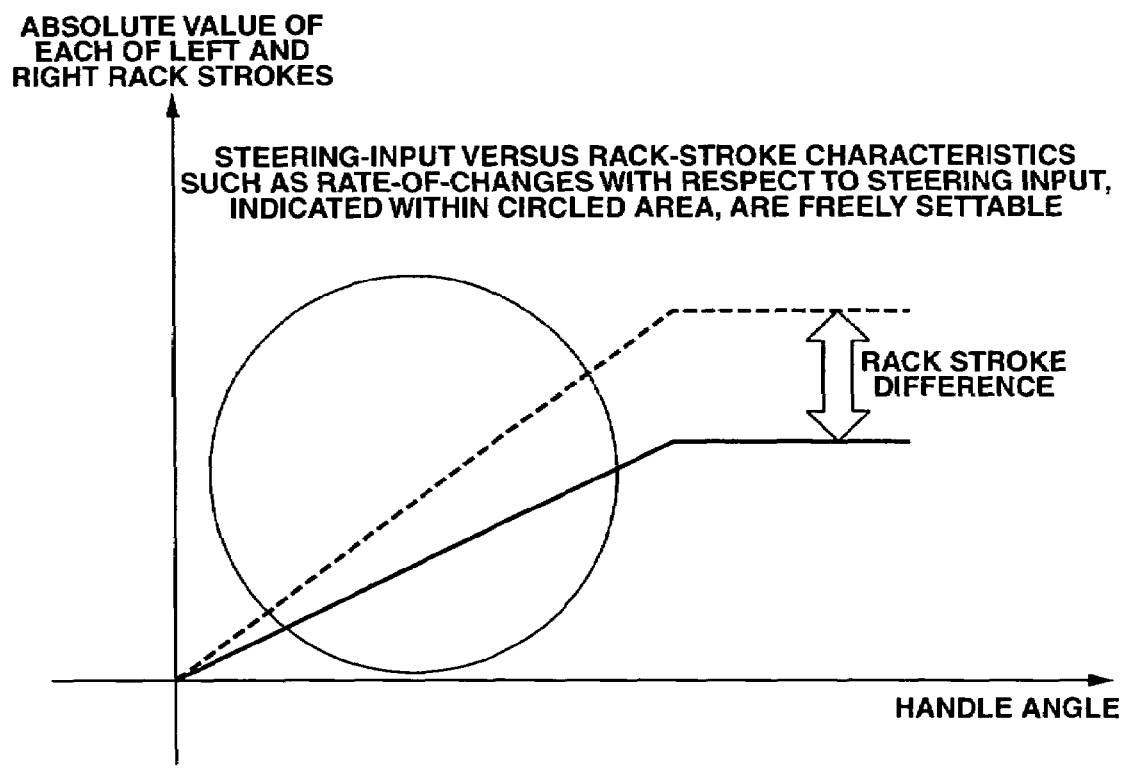
FIG. 4 is a characteristic diagram showing the relationship between a handle angle and a left-and-right rack stroke difference in the steering apparatus of the embodiment using the variable-pitch dual rack arrangement.

Referring now to FIG. 4, there is shown the characteristic diagram concerning the stroke difference between absolute values of left and right rack strokes for the same handle angle. Hereupon, the handle angle is regarded as to be equivalent to a steering input from steering wheel 1 or each steering actuator 5 to pinion shaft 9. In the characteristic diagram of FIG. 4, one rack stroke (corresponding to the right rack stroke of right movable rack shaft portion 10*b* associated with the right steered wheel in FIGS. 2 and 3 on a left turn, in other words, the rack stroke of one rack shaft portion, contracting and moving inside on turns) is indicated by the solid line, whereas the other rack stroke (corresponding to the left rack stroke of left movable rack shaft portion 10*a* associated with the left steered wheel in FIGS. 2 and 3 on a left turn, in other words, the rack stroke of the other rack shaft portion, extending and moving outside on turns) is indicated by the phantom line. According to the variable-pitch dual rack arrangement used by the SBW vehicle steering apparatus of the embodiment of FIGS. 1-3, by way of the use of left and right movable rack shaft portions 10*a* and 10*b* separated from each other, and the variable-pitch toothed portions of variable racks 6, 6, as can be seen from the characteristic diagram of FIG. 4, it is possible to provide a differential rack stroke between the left and right racks separated from each other, for the same handle angle (i.e., for the same pinion shaft movement). A rate of change (or a gradient) in the left rack stroke (the rack stroke of the outwardly-extending rack shaft portion) indicated by the phantom line in FIG. 4 with respect to the handle angle and a rate of change (or a gradient) in the right rack stroke (the rack stroke of the inwardly-contracting rack shaft portion) indicated by the solid line in FIG. 4 with respect to the handle angle (see the rack-stroke rate-of-changes with respect to the handle angle within the circled area of FIG. 4) can be freely set by machining variable-pitch rack gear portions 6*a*, 6*a* on left and right movable rack shaft portions 10*a* and 10*b* in a manner so as to provide desired steering-input versus differential rack-stroke characteristics. As described previously, in the embodiment shown in FIGS. 1-3, variable-pitch toothed portions of variable racks 6, 6 are respectively formed on left and right movable rack shaft portions 10*a* and 10*b*, such that the outermost end of the toothed portion of each individual variable rack 6 has the minimum gear pitch, and the innermost end of the toothed portion of each individual variable rack 6 has the maximum gear pitch, and the gear pitch gradually variably decreases from the innermost end to the outermost end. In order to provide an inverted handle-angle versus differential-rack-stroke characteristic opposite to the differential-rack-stroke characteristic of FIG. 4 showing how the left rack stroke (the rack stroke of the outwardly-extending rack shaft portion) is relatively greater than the right rack stroke (the rack stroke of the inwardly-contracting rack shaft portion) for the same handle angle, variable-pitch toothed portions of variable racks 6, 6 may be respectively machined on left and right movable rack shaft portions 10*a* and 10*b*, such that the outermost end of the toothed portion of each individual variable rack 6 has the maximum gear pitch, and the innermost end of the toothed portion of each individual variable rack 6 has the minimum gear pitch, and the gear pitch gradually variably increases from the innermost end to the outermost end.

[SBW System]

In the steer-by-wire (SBW) vehicle steering apparatus of the embodiment, cable back-up mechanism 4 is introduced as the mechanical back-up system (or the mechanical fail-safe system). Cable back-up mechanism 4 has some merits. That is, cables 4*c*, 4*d*, and 4*e* can be freely laid out and easily installed without interfering with the other car structures, while assuring the same steering function as a non-SBW-system equipped vehicle that a steering wheel is directly connected via a column shaft or a steering shaft to a rack-and-pinion steering gear box.

When the SBW system is normally operating, that is, in absence of the SBW system failure, in other words, during the SBW operating mode, clutch device 3 is disengaged. In presence of steering input, i.e., steering torque applied to steering wheel 1, the steering controller detects at least a steering wheel angle of steering wheel 1, and computes a command signal value to be output to each of left and right steering actuators 5, 5, based on the steering wheel angle detected. Thereafter, a driving torque corresponding to the computed command signal value is output from the left steering actuator 5 through the left pinion shaft 9 to the left variable rack 6. At the same time, the same magnitude of driving torque is output from the right steering actuator 5 through the right pinion shaft 9 to the right variable rack 6.

As discussed above, during the SBW operating mode, the steering input section (steering wheel 1) and the steering output section (the variable-pitch dual rack arrangement) are mechanically separated from each other, because of clutch device 3 disengaged. Thus, during the SBW operating mode, simultaneously with the SBW control, the steering controller executes steering reaction torque control for feedback actuator 2, so that feedback actuator 2 reproduces a virtual steering reaction torque based on the steering torque detected, thus providing the driver with a suitable natural steering feel in the feedback through steering wheel 1. In case of the cable back-up mechanism equipped SBW vehicle steering apparatus of the embodiment shown in FIGS. 1-3, the sole clutch device 3 is provided between the steering input section (steering wheel 1) and cable back-up mechanism 4. In case of the one clutch arrangement, during steering operation, cables 4c, 4d, and 4e and pulleys 4a, 4b, and 4b of cable back-up mechanism 4 are always moved and dragged in synchronism with movement of the steering output section linked to the steered wheels.

Conversely when the SBW system is malfunctioning, that is, in presence of the SBW system failure, the steering controller switches the SBW operating mode to the back-up operating mode. During the back-up operating mode, clutch device 3 is engaged, and thus steering input applied to steering wheel 1 by the driver is transmitted through first column shaft 7 and clutch device 3 to cable back-up mechanism 4, and further transmitted via left and right pinion shafts 9, 9 to the respective variable racks 6, 6. On the other hand, steering resistance input from the road surface to the left and right steered wheels is transmitted from the left and right variable racks to steering wheel 1, in reverse order of steering input torque transmission, thus providing the driver with a steering feel substantially corresponding to the steering resistance (the feedback torque) through the steering wheel.

As discussed above, irrespective of whether the SBW system is unfailing or failing, when steering wheel 1 is turned a required angle, the left and right steered wheels can be independently steered by a differential movement of left and right variable-pitch rack shaft portions 10a and 10b. In the SBW vehicle steering apparatus of the embodiment, steer angle characteristics (containing the relationship between the steering wheel movement and the left steered wheel movement from straight ahead and the relationship between the steering wheel movement and the right steered wheel movement from straight ahead), given during the SBW system operating mode, can be arbitrarily freely set (see FIG. 4). Additionally, even during the back-up operating mode, by virtue of the variable-pitch dual rack arrangement, it is possible to ensure the effectively reduced minimum turning radius.

In the steering apparatus of the embodiment shown in FIG. 1, two steering actuators 5, 5 are spaced apart from each other by a predetermined distance and installed in place. This is because each of cables 4c, 4d, and 4e used for the back-up system generally has a low rigidity, and therefore these two steering actuators 5, 5, spaced apart from each other, are provided to increase the rigidity.

The SBW vehicle steering apparatus of the embodiment of FIGS. 1-3 has the following effects (1)-(3).

(1) In the SBW vehicle steering apparatus which steering input to steering wheel 1 is transmitted directly or indirectly to steering rack shaft 10 and then the left and right steered wheels are steerable by way of the steering rack shaft movement occurring due to the steering input, steering rack shaft 10 is split into left and right movable rack shaft portions 10a and 10b. Additionally, the steer angle converter is provided to give a differential rack stroke between left and right rack strokes when left and right steered wheels are steered. By virtue of the differential rack stroke function of the steer angle converter during steering operation, it is possible to further reduce the minimum turning radius, for automotive vehicles having the same layout and geometry in steering design.

(2) The previously-discussed steer angle converter is comprised of left and right variable-pitch rack-and-pinion mechanisms (6a, 6b; 6a, 6b), each of which includes (i) variable-pitch rack 6 having variable-pitch rack gear portion 6a formed on the associated one of left and right movable rack shaft portions 10a and 10b and (ii) pinion gear portion 6b formed on the lower end of the associated one of pinion shafts 9, 9. Additionally, left and right variable-pitch rack gear portions 6a, 6a are formed and dimensioned to produce a differential rack stroke between rack strokes of left and right movable rack shaft portions 10a and 10b, for the same rotary motion of each of pinion shafts 9, 9. Therefore, in spite of the comparatively simple variable-pitch dual rack arrangement (left and right movable rack shaft portions 10a and 10b separated from each other and left and right variable racks 6, 6), it is possible to easily achieve a differential rack stroke between left and right rack strokes during steering operation.

(3) As a mechanical back-up system needed to mechanically couple the steering input section (containing steering wheel 1) and the steering output section (containing left and right movable rack shaft portions 10a and 10b) to each other for fail-safe or back-up purposes, cable back-up mechanism 4 having three cylindrical pulleys 4a, 4b and 4b is provided. Also provided is the sole clutch device 3, which serves as a part of the mechanical back-up system, and laid out between first and second column shafts 7 and 8 of the steering input section, and engaged during the back-up operating mode. Also provided in the steering output section are left and right steering actuators 5, 5 that drive the respective rack shaft portions 10a and 10b. During the SBW operating mode with clutch device 3 disengaged, it is possible to ensure a differential rack stroke between left and right rack strokes by way of the same command for left and right steering actuators 5, 5. Additionally, by means of left and right steering actuators 5, 5 spaced apart from each other, it is possible to enhance the rigidity of the steering system. During the back-up operating mode, which is initiated due to the SBW system failure, it is possible to produce the differential rack stroke between left and right rack strokes, by means of the steer angle converter, thus effectively reducing the minimum turning radius of the vehicle.

Figure 5:
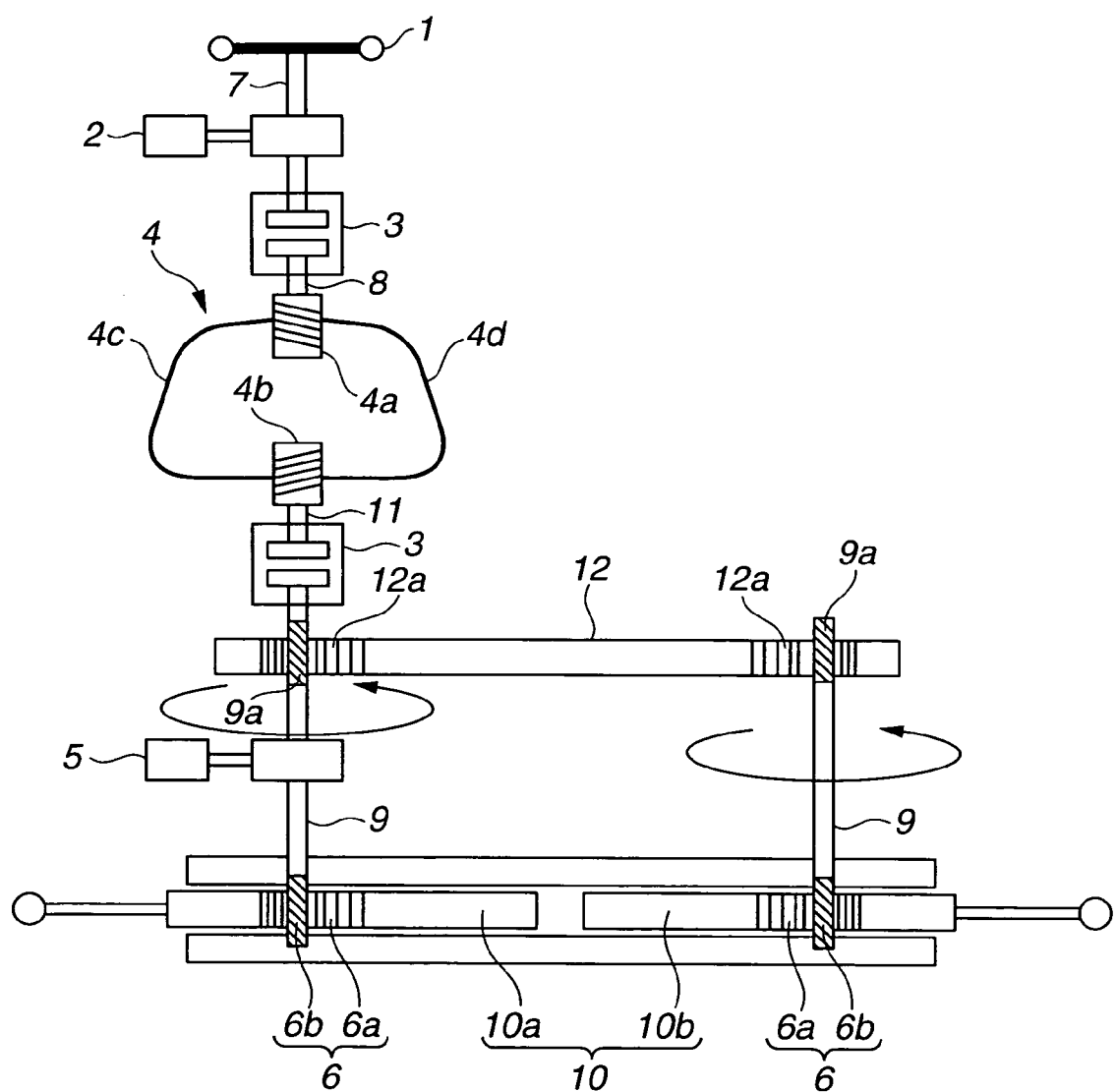
FIG. 5 is a system diagram illustrating a modification of a vehicle steering apparatus.

Referring now to FIG. 5, there is shown the first modification of the vehicle steering apparatus. To avoid the problem of reduced durability of cable back-up mechanism 4 owing to undesired synchronous movements of the cables and pulleys during movement of the steering output section with the single clutch arrangement as shown in FIG. 1, the first modification of FIG. 5 uses a dual clutch arrangement. In more detail, as clearly shown in FIG. 5, two clutch devices 3, 3 are provided in such a manner as to sandwich cable back-up mechanism 4 therebetween, and left and right movable rack shaft portions 10a and 10b are driven by means of the sole steering actuator 5. In the SBW vehicle steering apparatus of the first modification of FIG. 5, as a mechanical back-up system needed to mechanically couple the steering input section (containing steering wheel 1) to the steering output section (containing the variable-pitch dual rack arrangement including left and right movable rack shaft portions 10a and 10b each having variable rack 6), cable back-up mechanism 4 having two cylindrical pulleys, namely one steering input side pulley 4a and one steering output side pulley 4b, is provided. Clutch devices 3, 3 are respectively arranged in the steering input and output sections both sandwiching therebetween cable back-up mechanism 4. The one steering actuator 5 is provided in the steering output section for driving both of left and right movable rack shaft portions 10a and 10b. The lower steering output side clutch device 3 is interleaved between a pinion shaft 11 and the left pinion shaft 9. As shown in FIG. 5, pinion shaft 11 is fixedly connected at one end to the steering output side pulley 4b. A power-transmission mechanism, needed to simultaneously drive the right pinion shaft 9 in synchronism with rotation of the left pinion shaft 9 by means of the sole steering actuator 5 during steering operation in the SBW operating mode, is constructed by a movable connection shaft 12 formed at both ends with left and right rack gear portions 12a, 12a, and left and right pinion shafts 9, 9 having respective pinion gear portions 9a, 9a formed on the upper ends thereof and in meshed-engagement with the respective rack gear portions 12a, 12a of connection shaft 12. Although it is not clearly shown, in the steering apparatus of the first modification of FIG. 5 the teeth on each of left and right rack gear portions 12a, 12a of connection shaft 12 are the same size to provide a constant-pitch rack arrangement according to which, in presence of rotary input motion to the left pinion shaft, the right pinion shaft 9 can rotate at the same speed and in the same rotation direction in synchronism with rotation of the left pinion shaft 9. The other structure of the SBW vehicle steering apparatus of the first modification of FIG. 5 is identical to that of the embodiment of FIGS. 1-3. Thus, in explaining the first modification of FIG. 5, for the purpose of simplification of the disclosure, the same reference signs used to designate elements in the embodiment of FIGS. 1-3 will be applied to the corresponding elements used in the first modification, while detailed description of the same reference signs will be omitted because the above description thereon seems to be self-explanatory. The operation and merits of the SBW vehicle steering apparatus of the first modification of FIG. 5 are hereunder described in detail.

In the same manner as the steering apparatus of the embodiment of FIGS. 1-3, according to the SBW vehicle steering apparatus of the first modification of FIG. 5, irrespective of whether the steering system is operated in the SBW operating mode or in the back-up operating mode, it is possible to ensure the minimum turning radius. Additionally, during the SBW operating mode, cable back-up mechanism 4 is completely mechanically separated from both of the steering input and output sections by means of clutch devices 3, 3 both disengaged, thus preventing the cables and pulleys of cable back-up mechanism 4 from being undesirably moved and dragged in synchronism with movement of at least one of the steering input and output sections. This avoids the problem of cable wear, outer tube wear, and reduced durability of cable back-up mechanism 4. Furthermore, the upper ends of pinion shafts 9, 9 are mechanically linked to each other by way of high-rigidity connection shaft 12 instead of using the third cable 4e shown in FIG. 1. The use of high-rigidity connection shaft 12 eliminates the necessity of the dual steering actuator arrangement (5, 5) contributing to the enhanced steering-system rigidity. Thus, in the first modification of FIG. 5, only the left steering actuator 5 is used, but the right steering actuator 5 is omitted. In lieu thereof, to more enhance the safety and rigidity of the steering system and thus to provide a dual steering actuator system, the right steering actuator 5 may be further provided in the middle of the right pinion shaft, in addition to the left steering actuator 5 attached to the left pinion shaft.

The SBW vehicle steering apparatus of the first modification of FIG. 5 has the following effect (4), in addition to the effects (1)-(2) obtained by the steering apparatus of the embodiment of FIGS. 1-3.

(4) In the SBW vehicle steering apparatus of the first modification of FIG. 5, as a mechanical back-up system needed to mechanically couple the steering input section (containing steering wheel 1) and the steering output section (containing the variable-pitch dual rack arrangement including left and right movable rack shaft portions 10a and 10b) to each other for fail-safe or back-up purposes, cable back-up mechanism 4 having two cylindrical pulleys, that is, the steering input side pulley 4a and the steering output side pulley 4b, is provided. Two clutch devices 3, 3 are provided in the respective steering input and output sections, sandwiching therebetween cable back-up mechanism 4. Also provided in the middle of the one pinion shaft 9 of the steering output section is the sole steering actuator 5, which drives both of left and right movable rack shaft portions 10a and 10b (mechanically linked to each other by means of connection shaft 12 and the pinion shaft pair 9, 9) in synchronization with rotation of the one pinion shaft 9. During the SBW operating mode with clutch devices 3, 3 disengaged, it is possible to certainly effectively prevent the cables and pulleys of cable back-up mechanism 4 from being moved and dragged in synchronism with movement of at least one of the steering input and output sections, thus enhancing the durability of cable back-up mechanism 4. Additionally, the use of the single steering actuator 5 contributes to the simplified SBW vehicle steering system and reduced manufacturing costs.

Figure 6:
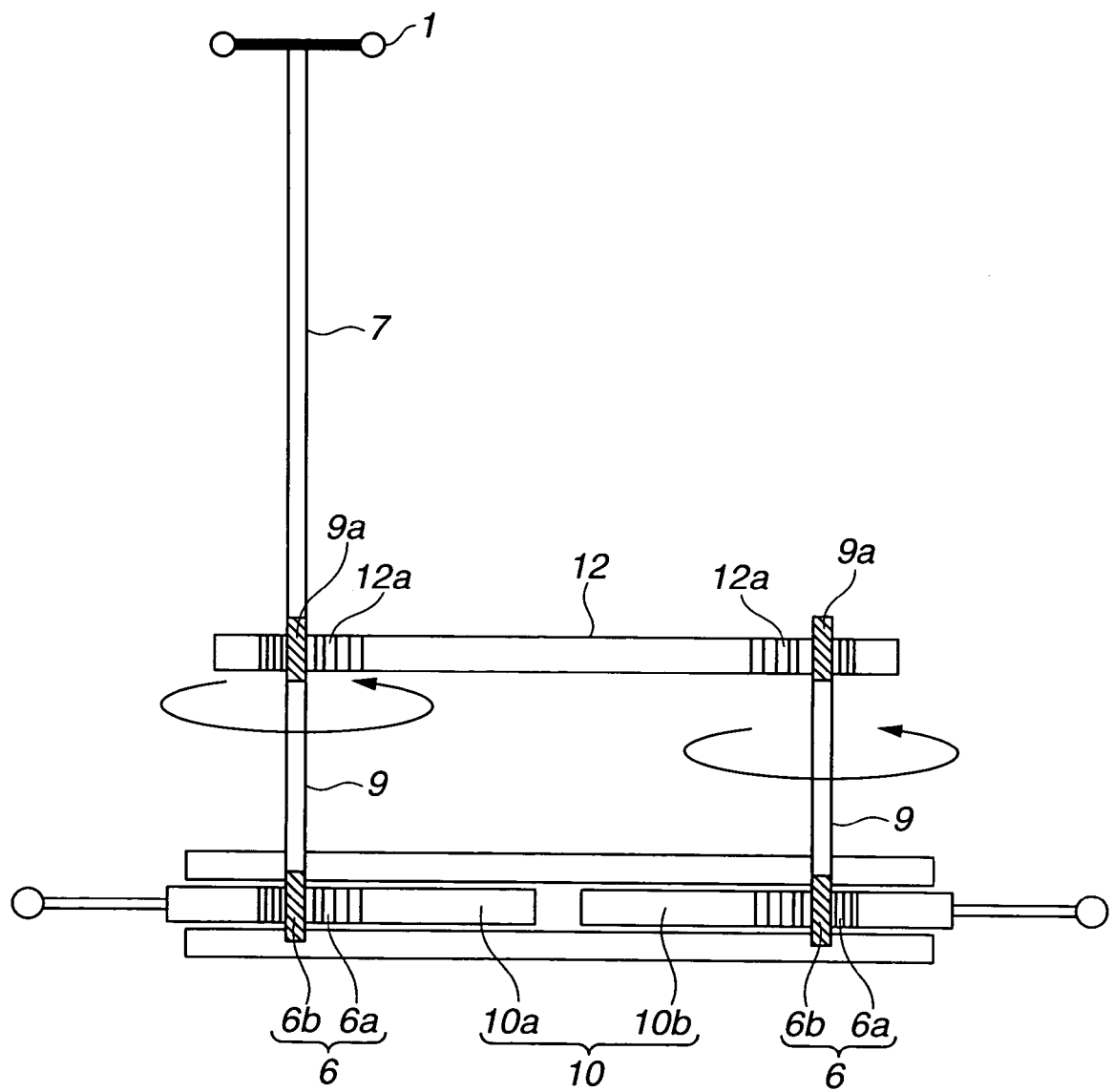
FIG. 6 is a system diagram illustrating another modification of a vehicle steering apparatus.

Referring now to FIG. 6, there is shown the second modification of the vehicle steering apparatus. As described previously, in the embodiment of FIGS. 1-3 and the first modification of FIG. 5, the variable-pitch dual rack arrangement, comprised of two variable-pitch racks 6, 6 separated from each other, is applied to or combined with the SBW vehicle steering apparatus. Alternatively, in the second modification of FIG. 6, the variable-pitch dual rack arrangement is applied to a general direct-coupled steering linkage type vehicle steering system using a sole rigid column shaft 7 through which the steering input section (steering wheel 1) is coupled directly to the steering output section linked to steered wheels. In the second modification of FIG. 6, the sole rigid column shaft 7 is used. The sole rigid column shaft 7 may be replaced by primary and secondary column shafts connected by a universal joint. More concretely, as shown in FIG. 6, in the steering apparatus of the second modification, column shaft 7, which is fixedly connected at its upper end to steering wheel 1, is formed integral with one pinion shaft 9 (the left pinion shaft in the second modification of FIG. 6). The one pinion shaft 9 (the left pinion shaft) is mechanically linked to the other pinion shaft 9 (the right pinion shaft) by connection shaft 12 having left and right constant-pitch rack gear portions 12a, 12a. Left and right pinion shafts 9, 9 have respective pinion gear portions 9a, 9a in meshed-engagement with the respective rack gear portions 12a, 12a of connection shaft 12. There is no necessity of feedback actuator 2 and there is a less necessity of steering actuator 5, because the steering apparatus of the second modification of FIG. 6 uses the direct-coupled steering linkage type, which enables permanent mechanical torque transmission between the steering input section (containing steering wheel 1) and the steering output section (containing left and right movable rack shaft portions 10a and 10b). In the same manner as the first modification of FIG. 5, in the direct-coupled steering linkage type vehicle steering apparatus of the second modification of FIG. 6 the teeth on each of left and right rack gear portions 12a, 12a of connection shaft 12 are the same size to provide a constant-pitch rack arrangement according to which, in presence of rotary input motion to the left pinion shaft 9, the right pinion shaft 9 can rotate at the same speed and in the same rotation direction in synchronism with rotation of left pinion shaft 9. The other structure of the direct-coupled steering linkage type vehicle steering apparatus of the second modification of FIG. 6 is identical to that of the embodiment of FIGS. 1-3. During steering operation, steering torque, applied to steering shaft 1 by the driver, flows through column shaft 7 via left pinion shaft 9 to left variable rack 6, and simultaneously flows through column shaft 7 and connection shaft 12 via right pinion shaft 9 to right variable rack 6. On the other hand, steering resistance input from the road surface to the left and right steered wheels is transmitted from the left and right variable racks via column shaft 7 to steering wheel 1, in reverse order of steering input torque transmission, thus providing the driver with a steering feel substantially corresponding to the steering resistance (the feedback torque) through the steering wheel. With the previously-noted steering apparatus of the second modification shown in FIG. 6, in which the variable-pitch dual rack arrangement (variable racks 6, 6) is combined with the direct-coupled steering linkage type vehicle steering system rather than the SBW vehicle steering system, the right pinion shaft 9 can rotate at the same speed and in the same rotation direction in synchronism with rotation of the left pinion shaft 9, in presence of steering input applied to steering wheel 1. As can be appreciated from the system diagram shown in FIG. 5 concerning the SBW vehicle steering apparatus of the first modification and the system diagram shown in FIG. 6 concerning the direct-coupled steering linkage type vehicle steering apparatus of the second modification, the previously-discussed variable-pitch dual rack arrangement can be applied to such a mechanism that the same rotary input motion of the same magnitude and the same sense is simultaneously transmitted t6 each of two pinion shafts 9, 9 associated with respective left and right rack shaft portions 10a and 10b separated from each other.

In contrast with the SBW vehicle steering apparatus of the embodiment of FIGS. 1-4 that can arbitrarily freely set steer angle characteristics (containing the relationship between the steering wheel movement and the left steered wheel movement from straight ahead and the relationship between the steering wheel movement and the right steered wheel movement from straight ahead), the direct-coupled steering linkage type vehicle steering apparatus of the second modification of FIG. 6 cannot freely set the steer angle characteristics, but simple in construction. With the more simplified steering apparatus of the second modification shown in FIG. 6, it is possible to simply realize the reduced minimum turning radius of the vehicle. In the steering apparatus of the second modification of FIG. 6, connection shaft 12 is used as a means for producing synchronous rotary motion between left and right pinion shafts 9, 9 in meshed-engagement with the respective variable-pitch rack gear portions 6a, 6a formed on left and right movable rack shaft portions 10a and 10b. Instead of using connection shaft 12, a wrapping connector, such as a cable, a chain, a belt or the like, may be used. For the purpose of providing a more simple steering system with the variable-pitch dual rack arrangement, as discussed above, the steering apparatus of the second modification of FIG. 6 is constructed without any steering actuator 5. In lieu thereof, to provide a steering assist torque or an assisting force being effective to reduce the amount of steering effort that the driver must apply to steering wheel 1, a steering actuator, serving as a steering power-assist mechanism, such as a motor-assist power-steering mechanism or a hydraulic-assist power-steering mechanism, may be added.

The comparatively simple direct-coupled steering linkage type vehicle steering apparatus of the second modification of FIG. 6 has the following effect (5), in addition to the effects (1)-(2) obtained by the steering apparatus of the embodiment of FIGS. 1-3.

(5) The vehicle steering apparatus of the second modification of FIG. 6 uses the direct-coupled steering linkage type in which column shaft 7, connected at the upper end to steering wheel 1, is formed integral with one of left and right pinion shafts 9, 9, and additionally the one pinion shaft (the left pinion shaft) is mechanically linked via connection shaft 12 having left and right rack gear portions 12a, 12a to the other pinion shaft (the right pinion shaft). As can be appreciated from the second modification shown in FIG. 6, that is, the combination of the variable-pitch dual rack arrangement (variable racks 6, 6) and the direct-coupled steering linkage type enabling permanent mechanical torque transmission between the steering input section (steering wheel 1) and the steering output section (left and right movable rack shaft portions 10a and 10b) and also enabling synchronous rotary motion between left and right pinion shafts 9, 9, in order to effectively reduce the minimum turning radius the variable-pitch dual rack arrangement can be easily applied to a general steering-shaft equipped steering system that steering input and output sections are coupled directly to each other via a steering column shaft.

Figure 7:
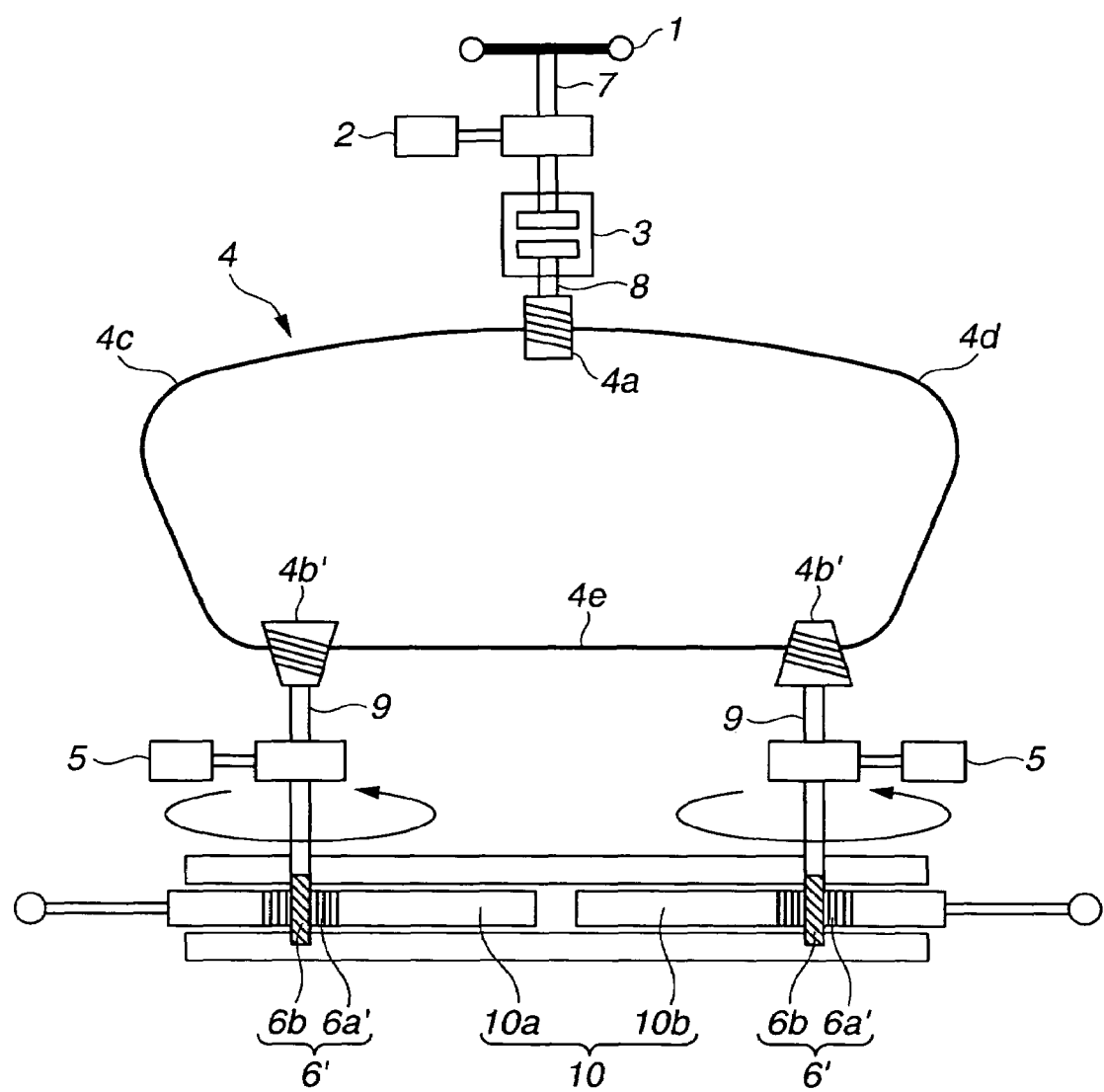
FIG. 7 is a system diagram illustrating another modification of a vehicle steering apparatus.

Referring now to FIG. 7, there is shown the third modification of the vehicle steering apparatus, somewhat modified from the SBW vehicle steering apparatus of the embodiment of FIGS. 1-3 using the variable-pitch dual rack arrangement. As a steer angle converter giving a differential rack stroke between left and right movable rack shaft portions 10a and 10b during steering operation, the SBW vehicle steering apparatus of the third modification of FIG. 7 uses a pair of frusto-conical or truncated-conical, steering output side taper pulleys 4b', 4b', instead of using two variable-pitch racks 6, 6.

That is, as shown in FIG. 7, the steer angle converter of the SBW vehicle steering apparatus of the third modification is comprised of left and right frusto-conical taper pulleys 4b', 4b' (constructing part of cable back-up mechanism 4 described later), which are fixedly connected to the upper ends of respective pinion shafts 9, 9. In the steering apparatus of the third modification of FIG. 7, the dual taper-pulley arrangement (serving as the rack stroke converter) is combined with a constant-pitch dual rack arrangement including left and right constant-pitch racks 6', 6', separated from each other. Cable back-up mechanism 4 of the third modification of FIG. 7 is comprised of the steering input side cylindrical pulley 4a, the steering output side taper pulleys 4b', 4b', and three cables 4c, 4d, and 4e. The taper-pulley equipped cable back-up mechanism 4 is constructed, so that the diameter of each of cables 4c and 4e wound on left taper pulley 4b, varies depending on the left rack stroke, while the diameter of each of cables 4d and 4e wound on right taper pulley 4b' varies depending on the right rack stroke. As appreciated, by the use of the constant-pitch dual rack arrangement shown in FIG. 7 that the teeth formed on a constant-pitch rack gear portion 6a' of each constant-pitch rack 6' are the same size, there is no differential rack stroke between rack strokes of left and right movable rack shaft portions 10a and 10b for the same pinion-shaft rotary motion. As hereunder described in detail, by way of the steer angle converter constructed by the dual taper-pulley arrangement having the two steering output side taper pulleys 4b', 4b, whose tapered directions are opposite to each other, the SBW vehicle steering apparatus of the third modification of FIG. 7 can provide the differential rack stroke by way of the differential movement of left and right pinion shafts 9, 9, in other words, the speed difference between left and right taper pulleys 4b', 4b' of cable back-up mechanism 4.

In more detail, the SBW vehicle steering apparatus of the third modification of FIG. 7 is different from that of the embodiment of FIGS. 1-3, in that the steering output side cylindrical pulleys 4b, 4b are replaced with two taper pulleys 4b', 4b' and the variable-pitch dual rack arrangement (variable racks 6, 6) is replaced with the constant-pitch dual rack arrangement (constant-pitch racks 6', 6'). The other structure of the SBW vehicle steering apparatus of the third modification of FIG. 7 is identical to that of the embodiment of FIGS. 1-3.

Figure 8:
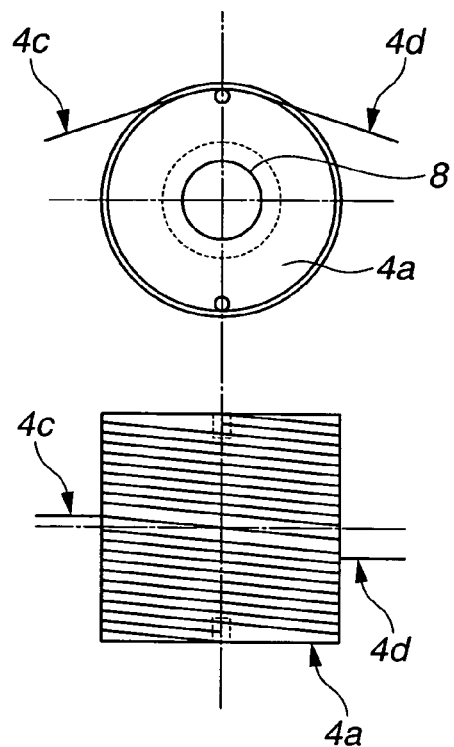
FIG. 8 is a detailed diagram showing a steering input side cylindrical pulley incorporated in the vehicle steering apparatus of the modification of FIG. 7.
Figure 9:
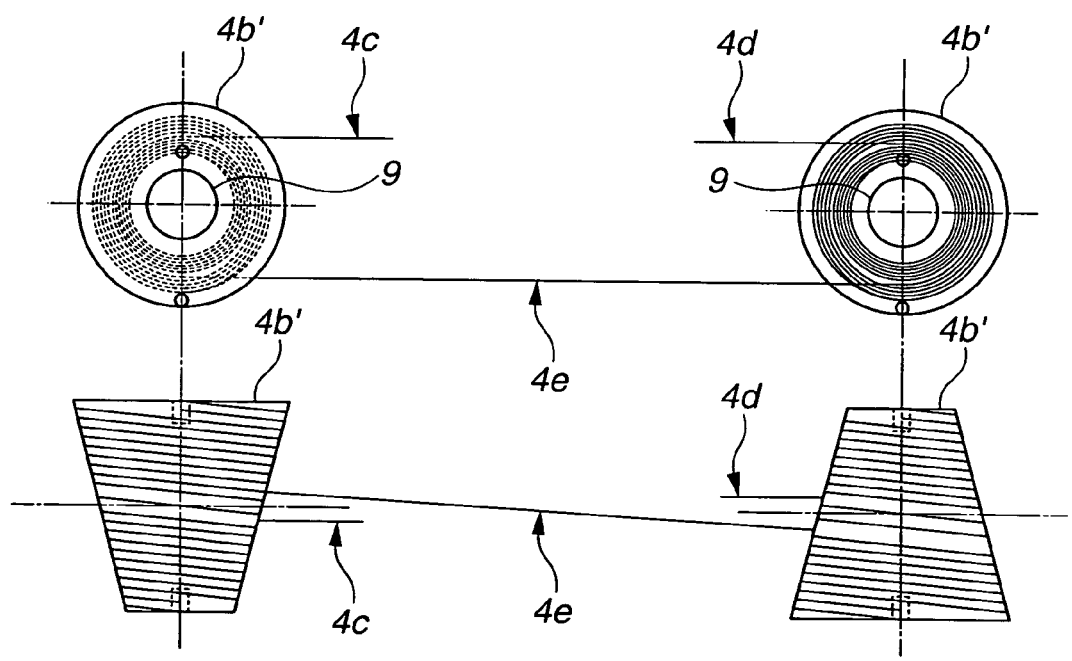
FIG. 9 is a detailed diagram showing a pair of steering output side taper pulleys incorporated in the vehicle steering apparatus of the modification of FIG. 7.
Figure 10:
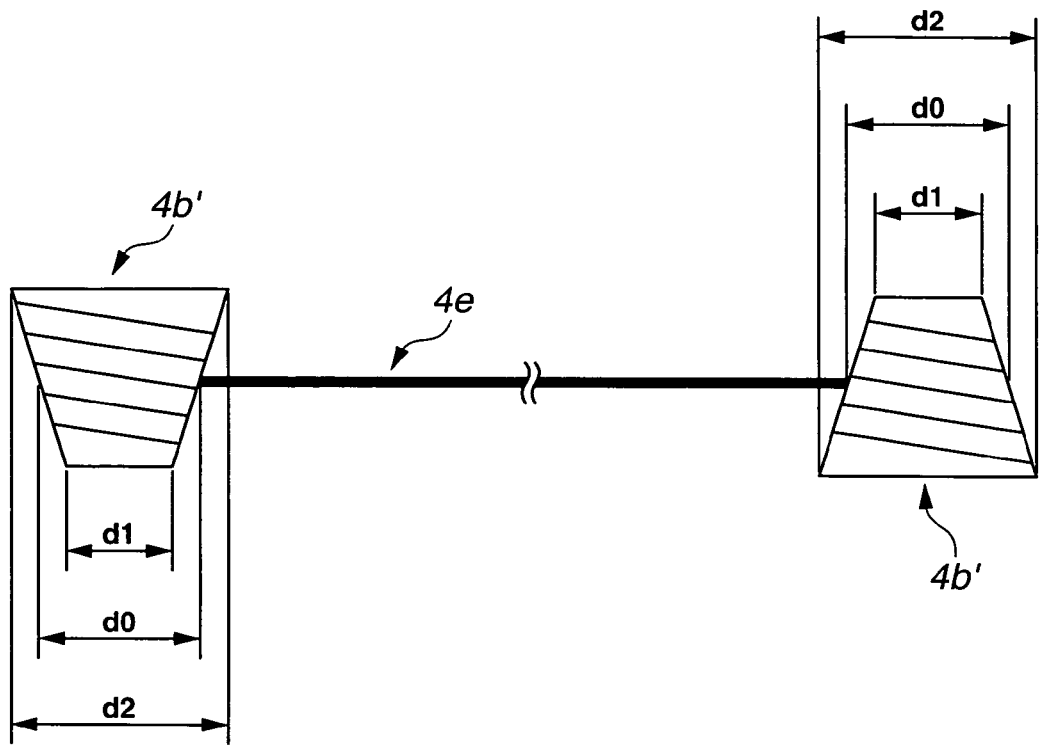
FIG. 10 is a diagram showing the relationship between settings of outside diameters of the two taper pulleys of the vehicle steering apparatus of the modification of FIG. 7.
Figure 11:
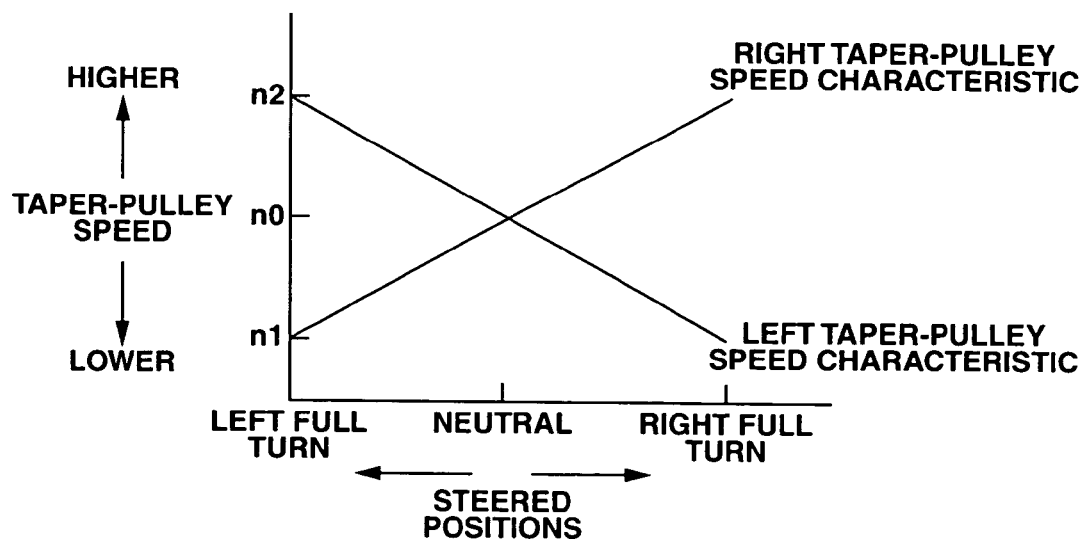
FIG. 11 is a characteristic diagram showing the relationship between settings of the number of revolutions of the two taper pulleys of the vehicle steering apparatus of the modification of FIG. 7.

As best seen in FIGS. 8 and 12, one end of first cable 4c is fixedly connected to the lower end of the steering input side cylindrical pulley 4a, whereas one end of second cable 4d is fixedly connected to the upper end of the steering input side cylindrical pulley 4a. As can be seen from the explanatory view of FIG. 12, first and second cables 4c and 4d are wound on spiral or helical cable grooves of pulley 4a just like opposite-hand threads. Concretely, in the top view of cylindrical pulley 4a, second cable 4d is wound on pulley 4a in the clockwise direction from the one second-cable end fixed onto the upper end of pulley 4a, while first cable 4c is wound on pulley 4a in the counterclockwise direction from the one fixed first-cable end fixed onto the lower end of pulley 4a. As shown in FIG. 9, the axes of taper pulleys 4b' and 4b' are parallel to each other, left and right taper pulleys 4b', 4b' are tapered in the opposite directions, and additionally the left-hand side taper pulley 4b' has the same shape and dimensions as the right-hand side taper pulley 4b'. As best shown in FIGS. 9 and 12, first cable 4c is wound on the lower-half taper pulley portion of left taper pulley 4b' so that the other cable end of first cable 4c is fixedly connected to the lower small-diameter end of left taper pulley 4b'. In a similar manner, second cable 4d is wound on the upper-half taper pulley portion of right taper pulley 4b' so that the other cable end of second cable 4d is fixedly connected to the upper small-diameter end of right taper pulley 4b'. On the other hand, regarding third cable 4e running between two taper pulleys 4b', 4b', one wound-up/wound-off cable portion of third cable 4e is wound on the upper-half taper pulley portion of left taper pulley 4b' so that one cable end of third cable 4e is fixedly connected to the upper large-diameter end of left taper pulley 4b', whereas the opposite wound-up/ wound-off cable portion of third cable 4e is wound on the lower-half taper pulley portion of right taper pulley 4b' so that the other cable end of third cable 4e is fixedly connected to the lower large-diameter end of right taper pulley 4b'. As shown in FIG. 10, assuming that left and right taper pulleys 4b', 4b' are horizontally cut in the same plane at the same axial level, measured from the lower small-diameter pulley end of left taper pulley 4b' or measured from the lower large-diameter pulley end of right taper pulley 4b', outside diameters of left and right taper pulleys 4b', 4b' are dimensioned so that the summed value of the diameters of left and right taper pulleys 4b', 4b' cut at the same axial level is constant. That is to say, assuming that the diameter of the uppermost large-diameter pulley section of left taper pulley 4b' is denoted by "d2", the intermediate middle-diameter pulley section of left taper pulley 4b' is denoted by "d0", and the diameter of the lowermost small-diameter pulley section of left taper pulley 4b' is denoted by "d1", the diameters of the uppermost small-diameter pulley section, the intermediate middle-diameter pulley section, and the lowermost large-diameter pulley section of right taper pulley 4b' are respectively denoted by "d1", "d0", and "d2". The relationship between diameters d1, d0, and d2 is represented by the inequality d1<d0<d2. In other words, the sum of the effective diameter of first cable 4c wound on left taper pulley 4b' associated with left constant-pitch rack 6' and the effective diameter of second cable 4d wound on right taper pulley 4b' associated with right constant-pitch rack 6' is constant. As shown in FIG. 11, with the dual taper-pulley arrangement of the third embodiment, constructed by left and right taper pulleys 4b', 4b' having the same shape and dimensions and tapered in the opposite axial directions, it is possible to provide the differential motion between left and right taper pulleys 4b', 4b', in other words, the rotational-speed difference between left and right pinion shafts 9, 9 whose upper ends are fixedly connected to respective central axes of taper pulleys 4b', 4b'.

Actually, in the steering apparatus of the third modification of FIG. 7, as appreciated from the pulley speed characteristic diagram of FIG. 11, speed characteristics of left and right taper pulleys 4b', 4b' are set so that the summed value of the speeds of left and right taper pulleys 4b', 4b' is constant irrespective of any steered positions. That is, assuming that the speed of left taper pulley 4b' is denoted by "n1", the speed of right taper pulley 4b, is denoted by "n2", and the same taper-pulley speed obtained at a neutral position, is denoted by "n0", the equation n1+n2=2×n0 is always satisfied irrespective of any steered positions, such as a right full-turn position, a left full-turn position, or a neutral position.

Referring to FIG. 12, there is shown the principle of operation related to differential movement of two taper pulleys 4b', 4b' of the dual taper pulley arrangement serving as the steer angle converter in the steering apparatus of the third modification of FIG. 7.

During a right-hand turn, as shown in FIG. 12, the steering input side cylindrical pulley 4a rotates clockwise a given angle corresponding to the steering wheel movement. With cylindrical pulley 4a rotating clockwise, one wound-up/wound-off cable portion of first cable 4c is wound off from the left-hand side taper pulley 4b', while the opposite wound-up/wound-off cable portion of first cable 4c is wound up on the steering input side cylindrical pulley 4a. As a result of this, the effective diameter of first cable 4c wound off from the left-hand side taper pulley 4b' tends to gradually reduce during winding-off operation of first cable 4c from the left-hand side taper pulley. On the other hand, the effective diameter of first cable 4c wound up on cylindrical pulley 4a is fixed to a constant pulley diameter, irrespective of winding-off or winding-up operations. Gradually reducing the effective diameter of first cable 4c means a speed increase of rotational speed of the left-hand side taper pulley 4b, . In contrast to the above, one wound-up/wound-off cable portion of second cable 4d is wound off from the steering input side cylindrical pulley 4a, while the opposite wound-up/wound-off cable portion of second cable 4d is wound up on the right-hand side taper pulley 4b'. As a result of this, the effective diameter of second cable 4d wound up on the right-hand side taper pulley 4b' tends to gradually increase during winding-up operation of second cable 4d on the right-hand side taper pulley. On the other hand, the effective diameter of second cable 4d wound off from cylindrical pulley 4a is fixed to the constant pulley diameter, irrespective of winding-off or winding-up operations. Gradually increasing the effective diameter of second cable 4d means a speed decrease of rotational speed of the right-hand side taper pulley 4b'. On the other hand, third cable 4e, running between left and right taper pulleys 4b', 4b', serves as a rotary motion linkage needed for mechanically linking rotary motions of two taper pulleys 4b', 4b', while always satisfying or maintaining the relative-speed relationship defined by the equation n1+n2=2×n0, irrespective of any steered positions. The explanatory view of FIG. 12 is provided to explain only the principle of operation of the dual taper-pulley arrangement equipped cable back-up mechanism 4 and the method to wind the cable on the associated pulleys of the cable back-up mechanism is an example, but it will be appreciated that the actual pulley-and-cable layout of cable back-up mechanism 4 can be properly modified. For instance, the pulley-and-cable layout of the back-up mechanism of the SBW vehicle steering apparatus of the third modification of FIG. 7 is actually designed to provide a first differential rack stroke characteristic as shown in FIG. 13B, in which the outwardly-extending rack shaft portion has a relatively greater rack stroke, in other words, the inwardly-extending rack shaft portion has a relatively smaller rack stroke. As may be appreciated, the differential rack stroke characteristic can be properly designed or changed by varying the pitch between the helical cable grooves, by inverting the two taper pulleys tapered in the opposite directions, by varying the winding-up and winding-off directions, and/or by varying the inclination angle of the tapered surface of each taper pulley with respect to its axis. For example, by inverting the two taper pulleys, it is possible to provide a second differential rack stroke characteristic (an inverted differential rack stroke characteristic) as shown in FIG. 13C, in which the inwardly-extending rack shaft portion has a relatively greater rack stroke, in other words, the outwardly-extending rack shaft portion has a relatively smaller rack stroke. Also, by varying the pitch between the helical cable grooves, it is possible to vary a rate of change in each rack stroke with respect to the handle angle.

With the previously-noted arrangement of the third modification shown in FIG. 7, that is, with the dual taper-pulley arrangement (taper pulleys 4b', 4b' tapered in the opposite directions) combined with the constant-pitch dual rack arrangement (constant-pitch racks 6', 6'), as clearly seen in FIG. 13B, on right or left turns, the rack stroke of a first one of left and right movable rack shaft portions 10a and 10b, extending and moving outside, becomes relatively greater than that of the second rack shaft portion, contracting and moving inside. Conversely assuming that left and right taper pulleys 4b', 4b' are both reversed in their axial directions, in other words, left and right taper pulleys 4b', 4b' are replaced with each other (see left and right taper pulleys 4b', 4b' shown in FIGS. 15 and 18 respectively showing the fifth and eighth modifications described later), such an SBW vehicle steering system having the reversed taper pulleys 4b', 4b' exhibits the inverted differential rack stroke characteristic shown in FIG. 13C that, on right or left turns, the rack stroke of the first movable rack shaft portion, extending and moving outside, becomes relatively smaller than that of the second rack shaft portion, contracting and moving inside. Suppose that the steering output side taper pulleys 4b', 4b' are replaced by cylindrical pulleys each similar to the steering input side cylindrical pulley 4a. In such a case, as shown in FIG. 13A, on left or right turns, the rack stroke of the first movable rack shaft portion, extending and moving outside, becomes equal to that of the second rack shaft portion, contracting and moving inside, so as to ensure a synchronous rack stroke between left and right racks without any differential movement of left and right racks.

The SBW vehicle steering apparatus of the third modification of FIG. 7 has the following effects (6)-(7), in addition to the effect (1) obtained by the steering apparatus of the embodiment of FIGS. 1-3.

(6) The steer angle converter is comprised of the dual taper-pulley arrangement including left and right frusto-conical taper pulleys 4b', 4b', which are fixedly connected to the upper ends of respective pinion shafts 9, 9, so that the effective diameters of first and second cables 4c and 4d wound on taper pulleys 4b', 4b' vary depending on the respective rack strokes of left and right rack-and-pinion mechanisms (the constant-pitch dual rack arrangement including left and right constant-pitch racks 6', 6', separated from each other), to enable the differential motion between the left and right pinion shafts. By the comparatively simple dual taper-pulley arrangement, obtained by simply changing each of left and right pulleys of the steering output side from a cylindrical shape to a frusto-conical shape, it is possible to provide the differential rack stroke between left and right movable rack shaft portions 10a and 10b by way of the differential motion of two pinion shafts 9, 9, produced by the dual taper-pulley arrangement (left and right taper pulleys 4b', 4b' tapered in the opposite directions, and having the same shape and dimensions).

(7) As a mechanical back-up system needed to mechanically couple the steering input section having steering wheel 1 and the steering output section having left and right movable rack shaft portions 10a and 10b to each other for fail-safe or back-up purposes, cable back-up mechanism 4 having one cylindrical pulley 4a of the steering input side and two frusto-conical taper pulleys 4b', 4b' of the steering output side is provided. Also provided is the sole clutch device 3 that is laid out between first and second column shafts 7 and 8 of the steering input section, and engaged during the back-up operating mode. Also provided in the steering output section are left and right steering actuators 5, 5 that drive the respective rack shaft portions 10a and 10b. Also provided are left and right constant-pitch rack-and-pinion mechanisms (the constant-pitch dual rack arrangement including constant-pitch racks 6', 6', whose rack gear portions 6a', 6a' are formed on the respective rack shaft portions 10a and 10b separated from each other) that there is no differential rack stroke between left and right movable rack shaft portions 10a and 10b for the same pinion-shaft rotary motion. Thus, during the back-up operating mode, which is initiated due to the SBW system failure and during which clutch device 3 is kept in the engaged state, it is possible to produce the differential rack stroke of the left and right racks, by means of the steer angle converter (the dual taper-pulley arrangement), thus effectively reducing the minimum turning radius of the vehicle.

Figure 14:
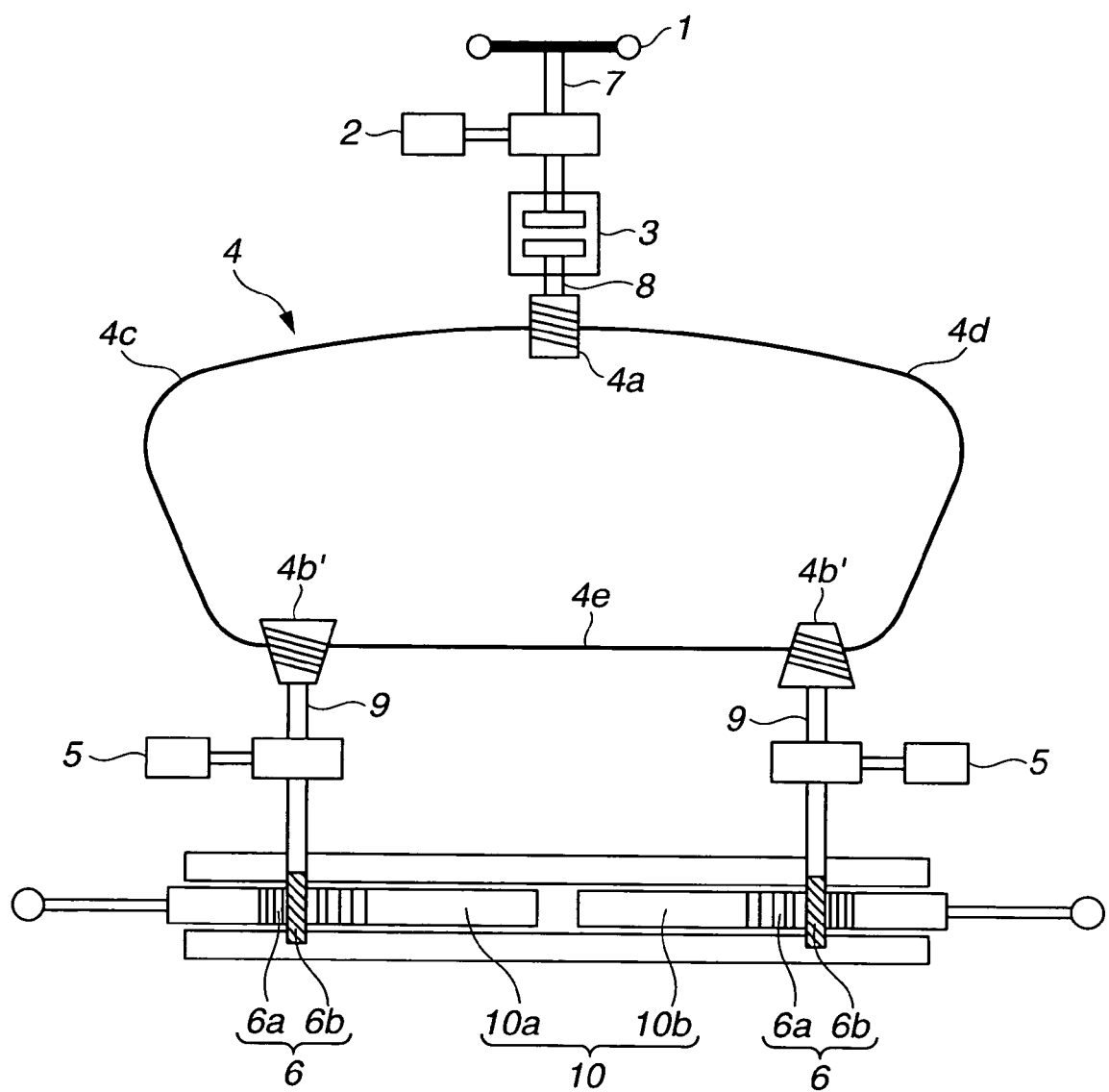
FIGS. 14-18 are system diagrams illustrating another modifications.

Referring now to FIG. 14, there is shown the fourth modification of the vehicle steering apparatus. In order to further increase the rack stroke of the first rack shaft portion, extending and moving outside, relatively in comparison with the rack stroke of the second rack shaft portion, contracting and moving inside, the variable-pitch dual rack arrangement (variable racks 6, 6) is combined with the dual taper-pulley arrangement (two taper pulleys 4b', 4b'), as hereunder described in detail. In the fourth modification of FIG. 14, clutch device 3 is comprised of a friction clutch such as an electromagnetic clutch or an electromagnetic mechanical clutch. In the SBW vehicle steering apparatus of the fourth modification of FIG. 14, as a mechanical back-up system needed to mechanically couple the steering input section having steering wheel 1 and the steering output section having left and right movable rack shaft portions 10*a* and 10*b* to each other for fail-safe or back-up purposes, cable back-up mechanism 4 having the one steering input side cylindrical pulley 4*a* and the two steering output side taper pulleys 4*b*', 4*b*', is provided. Also provided is the sole clutch device 3 that is laid out between first and second column shafts 7 and 8 of the steering input section, and engaged during the back-up operating mode. Also provided in the steering output section are left and right steering actuators 5, 5 that drive the respective rack shaft portions 10*a* and 10*b*. Toothed portions of variable racks 6, 6 are respectively formed on left and right movable rack shaft portions 10*a* and 10*b*, such that the outermost end of the toothed portion of each of left and right variable racks 6, 6 has the minimum gear pitch, and the innermost end of the toothed portion of each of left and right variable racks 6, 6 has the maximum gear pitch, and the gear pitch gradually variably decreases from the innermost end to the outermost end. That is, the fourth modification of FIG. 14 is slightly different from the third modification of FIG. 7, in that in the steering apparatus of the third modification of FIG. 7 the constant-pitch dual rack arrangement is combined with the dual taper-pulley arrangement, whereas in the steering apparatus of the fourth modification of FIG. 14 the variable-pitch dual rack arrangement is combined with the dual taper-pulley arrangement. The operation of the SBW vehicle steering apparatus of the fourth modification of FIG. 14 is hereunder described in detail.

By way of the use of the variable-pitch dual rack arrangement including variable racks 6, 6 each having variable-pitch rack gear portion 6*a* whose gear pitch gradually variably decreases from the innermost end to the outermost end, in the same manner as the steering apparatus of the embodiment of FIGS. 1-3, the rack stroke of a first one of left and right movable rack shaft portions 10*a* and 10*b*, extending and moving outside, becomes relatively greater, while the rack stroke of the second rack shaft portion, contracting and moving inside, becomes relatively smaller, thus enabling the differential rack stroke between the left and right racks. During the SBW operating mode with clutch device 3 disengaged, it is possible to provide the differential rack stroke function by way of the variable-pitch dual rack arrangement (variable racks 6, 6) of the steering apparatus of the fourth modification of FIG. 14.

On the other hand, during the back-up operating mode with clutch device 3 engaged, the differential motion function is achieved by the dual taper-pulley arrangement (left and right taper pulleys 4*b*', 4*b*') that provides the speed difference between left and right pinion shafts 9, 9 and consequently ensures the differential rack stroke function that the rack stroke of the first movable rack shaft portion, extending and moving outside, becomes relatively greater, while the rack stroke of the second rack shaft portion, contracting and moving inside, becomes relatively smaller. At the same time, the additional differential rack stroke function is achieved by the variable-pitch dual rack arrangement that provides the differential rack stroke between left and right rack strokes. Thus, by way of the multiplier action of the differential motion function (the differential rack stroke function) attained by the dual taper-pulley arrangement and the additional differential rack stroke function attained by the variable-pitch dual rack arrangement, the rack stroke of the first rack shaft portion, extending and moving outside, is further remarkably increased or multiplied. In other words, during the back-up operating mode, by way of the multiplier action of the two differential rack stroke functions, the rack stroke of the second rack shaft portion, contracting and moving inside, is further remarkably reduced.

The SBW vehicle steering apparatus of the fourth modification of FIG. 14 has the following effect (8), in addition to the effect (1) obtained by the steering apparatus of the embodiment of FIGS. 1-3 and the effect (6) obtained by the steering apparatus of the third modification of FIG. 7.

(8) As a mechanical back-up system needed to mechanically couple the steering input section having steering wheel 1 and the steering output section having left and right movable rack shaft portions 10*a* and 10*b* to each other for fail-safe or back-up purposes, cable back-up mechanism 4 having one cylindrical pulley 4*a* of the steering input side and two frusto-conical taper pulleys 4*b*', 4*b*' of the steering output side is provided. Also provided is the sole clutch device 3 that is laid out between first and second column shafts 7 and 8 of the steering input section, and engaged during the back-up operating mode. Also provided in the steering output section are left and right steering actuators 5, 5 that drive the respective rack shaft portions 10*a* and 10*b*. Also provided are left and right variable-pitch rack-and-pinion mechanisms (the variable-pitch dual rack arrangement including variable racks 6, 6, whose rack gear portions 6*a*, 6*a* are formed on the respective rack shaft portions 10*a* and 10*b* separated from each other) that there is a differential rack stroke between left and right movable rack shaft portions 10*a* and 10*b* for the same pinion-shaft rotary motion and additionally the rack gear pitch gradually variably decreases from the innermost end to the outermost end. In comparison with the SBW vehicle steering apparatus that either one of the variable-pitch dual rack arrangement and the dual taper pulley arrangement is used as the steer angle converter, the SBW vehicle steering apparatus of the fourth modification of FIG. 14 using both of the variable-pitch dual rack arrangement enabling the differential rack stroke characteristic shown in FIG. 4 and the dual taper-pulley arrangement enabling the differential rack stroke characteristic shown in FIG. 13B as the steer angle converter, the rack stroke of the first rack shaft portion extending and moving outside is further remarkably increased or multiplied. That is, there is a big rack stroke difference between the relatively great rack-stroke, outwardly-extending rack shaft portion and the relatively small rack-stroke, inwardly-contracting rack shaft portion.

Figure 15:
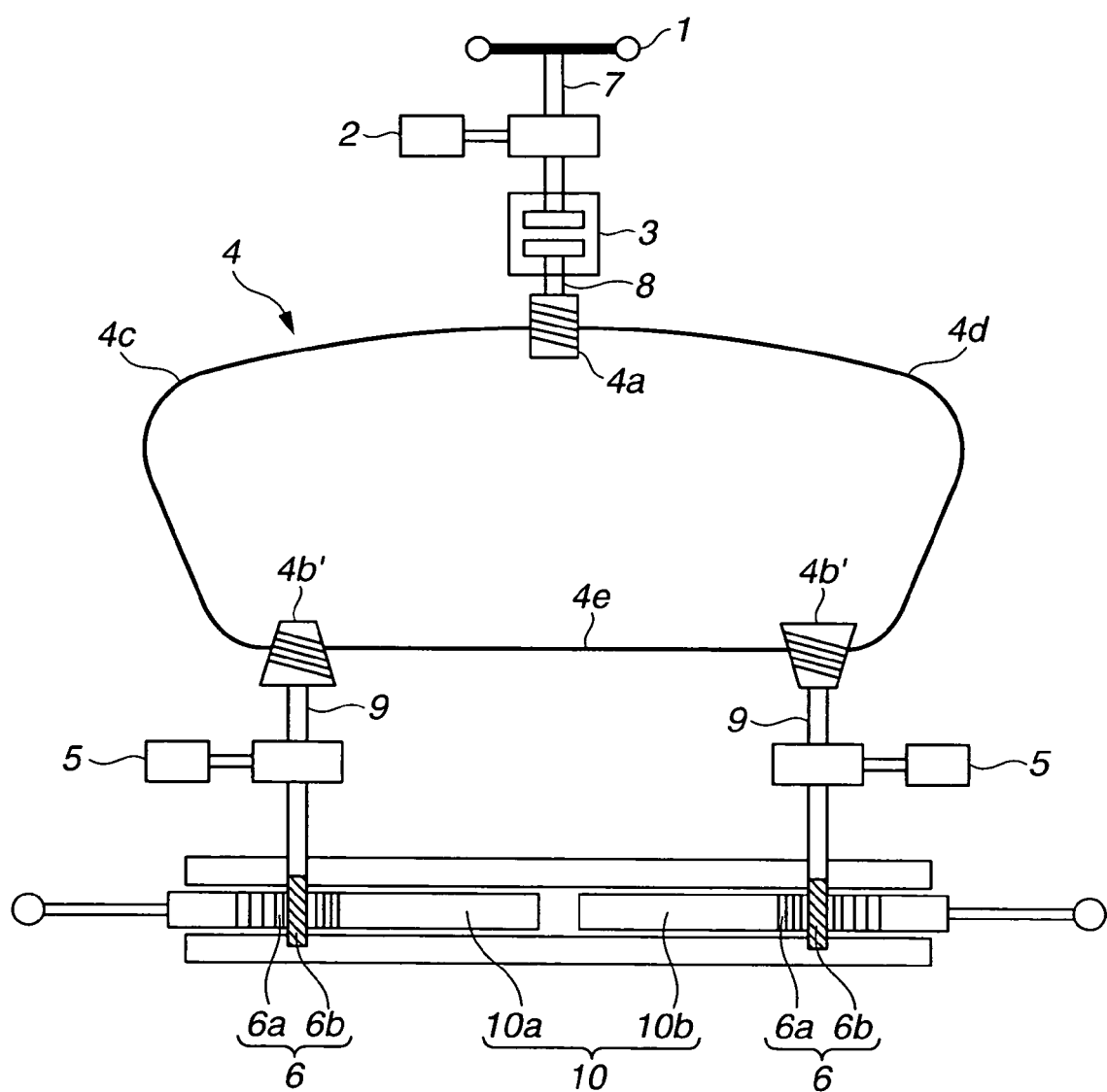

Referring now to FIG. 15, there is shown the fifth modification of the vehicle steering apparatus. In order to further increase the rack stroke of the second rack shaft portion, contracting and moving inside, relatively in comparison with the rack stroke of the first rack shaft portion, extending and moving outside, the variable-pitch dual rack arrangement (variable racks 6, 6) is combined with the dual taper-pulley arrangement (two taper pulleys 4*b*', 4*b*'), as hereunder described in detail. In the SBW vehicle steering apparatus of the fifth modification of FIG. 15, as a mechanical back-up system needed to mechanically couple the steering input section having steering wheel 1 and the steering output section having left and right movable rack shaft portions 10*a* and 10*b* to each other for fail-safe or back-up purposes, cable back-up mechanism 4 having the one steering input side cylindrical pulley 4*a* and the two steering output side taper pulleys 4*b*', 4*b*', is provided. Also provided is the sole clutch device 3 that is laid out between first and second column shafts 7 and 8 of the steering input section, and engaged during the back-up operating mode. Also provided in the steering output section are left and right steering actuators 5, 5 that drive the respective rack shaft portions 10*a* and 10*b*. In order to provide an inverted differential rack stroke characteristic opposite to the differential rack stroke characteristic produced by the variable-pitch dual rack arrangement of the steering apparatus of the fourth modification of FIG. 14, toothed portions of variable racks 6, 6 are respectively formed on left and right movable rack shaft portions 10*a* and 10*b*, such that the outermost end of the toothed portion of each of left and right variable racks 6, 6 has the maximum gear pitch, and the innermost end of the toothed portion of each of left and right variable racks 6, 6 has the minimum gear pitch, and the gear pitch gradually variably increases from the innermost end to the outermost end. Thus, in comparison with the variable-pitch dual rack arrangement of the steering apparatus of the fourth modification of FIG. 14 that the gear pitch gradually variably decreases from the innermost end to the outermost end, the variable-pitch dual rack arrangement of the steering apparatus of the fifth modification of FIG. 15 exhibits the inverted differential rack stroke characteristic that, on right or left turns, the rack stroke of the first movable rack shaft portion, extending and moving outside, becomes relatively smaller than that of the second rack shaft portion, contracting and moving inside. In comparison with the dual taper-pulley layout of cable back-up mechanism 4 of the fourth modification of FIG. 14, which enables the differential motion, that is, the differential rack stroke characteristic shown in FIG. 13B, two taper pulleys 4*b*', 4*b*' incorporated in the steering apparatus of the fifth modification of FIG. 15 are both reversed in their vertical directions so as to provide the inverted differential rack stroke characteristic shown in FIG. 13C that, on right or left turns, the rack stroke of the first movable rack shaft portion, extending and moving outside, becomes relatively smaller than that of the second rack shaft portion, contracting and moving inside. That is, the fifth modification of FIG. 15 is somewhat different from the fourth modification of FIG. 14, in that the dual taper-pulley arrangement of the steering apparatus of the fifth modification has the inverted differential motion, that is, the inverted differential rack stroke characteristic (see FIG. 13C) and additionally the variable-pitch dual rack arrangement of the steering apparatus of the fifth modification has the inverted differential rack stroke characteristic opposite to the differential rack stroke characteristic produced by the variable-pitch dual rack arrangement of the steering apparatus of the fourth modification. The operation of the SBW vehicle steering apparatus of the fifth modification of FIG. 15 is hereunder described in detail.

By way of the use of the variable-pitch dual rack arrangement including variable racks 6, 6 each having variable-pitch rack gear portion 6*a* whose gear pitch gradually variably increases from the innermost end to the outermost end, the rack stroke of a first one of left and right movable rack shaft portions 10*a* and 10*b*, extending and moving outside, becomes relatively smaller, while the rack stroke of the second rack shaft portion, contracting and moving inside, becomes relatively greater, thus enabling the inverted differential rack stroke characteristic (see FIG. 13C). During the SBW operating mode with clutch device 3 disengaged, it is possible to provide the inverted differential rack stroke function by way of the variable-pitch dual rack arrangement (variable racks 6, 6) of the steering apparatus of the fifth modification of FIG. 15.

During the back-up operating mode with clutch device 3 engaged, the differential motion function is achieved by the dual taper-pulley arrangement (left and right taper pulleys 4*b*', 4*b*') that provides the speed difference between left and right pinion shafts 9, 9 and consequently ensures the inverted differential rack stroke function that the rack stroke of the first movable rack shaft portion, extending and moving outside, becomes relatively smaller, while the rack stroke of the second rack shaft portion, contracting and moving inside, becomes relatively greater. At the same time, the additional inverted differential rack stroke function is achieved by the variable-pitch dual rack arrangement. Thus, by way of the multiplier action of the inverted differential rack stroke function attained by the dual taper pulley arrangement and the additional inverted differential rack stroke function attained by the variable-pitch dual rack arrangement, the rack stroke of the second rack shaft portion, contracting and moving inside, is further remarkably increased or multiplied. In other words, during the back-up operating mode, by way of the multiplier action of the two inverted differential rack stroke functions, the rack stroke of the first rack shaft portion, extending and moving outside, is further remarkably reduced.

The SBW vehicle steering apparatus of the fifth modification of FIG. 15 has the following effect (9), in addition to the effect (1) obtained by the steering apparatus of the embodiment of FIGS. 1-3 and the effect (6) obtained by the steering apparatus of the third modification of FIG. 7.

(9) As a mechanical back-up system needed to mechanically couple the steering input section having steering wheel 1 and the steering output section having left and right movable rack shaft portions 10*a* and 10*b* to each other for fail-safe or back-up purposes, cable back-up mechanism 4 having one cylindrical pulley 4*a* of the steering input side and two frusto-conical taper pulleys 4*b*', 4*b*' of the steering output side is provided. Also provided is the sole clutch device 3 that is laid out between first and second column shafts 7 and 8 of the steering input section, and engaged during the back-up operating mode. Also provided in the steering output section are left and right steering actuators 5, 5 that drive the respective rack shaft portions 10*a* and 10*b*. Also provided are left and right variable-pitch rack-and-pinion mechanisms (the variable-pitch dual rack arrangement including variable racks 6, 6, whose rack gear portions 6*a*, 6*a* are formed on the respective rack shaft portions 10*a* and 10*b* separated from each other) that there is a differential rack stroke between left and right movable rack shaft portions 10*a* and 10*b* for the same pinion-shaft rotary motion and additionally the rack gear pitch gradually variably increases from the innermost end to the outermost end. In comparison with the SBW vehicle steering apparatus that either one of the variable-pitch dual rack arrangement and the dual taper-pulley arrangement is used as the steer angle converter, the SBW vehicle steering apparatus of the fifth modification of FIG. 15 using both of the variable-pitch dual rack arrangement enabling the inverted differential rack stroke characteristic opposite to the characteristic shown in FIG. 4 and the dual taper-pulley arrangement, enabling the inverted differential rack stroke characteristic shown in FIG. 13C as the steer angle converter, the rack stroke of the second rack shaft portion contracting and moving inside is further remarkably increased or multiplied. That is, there is a big rack stroke difference between the relatively great rack-stroke, inwardly-contracting rack shaft portion and the relatively small rack-stroke, outwardly-extending rack shaft portion.

Figure 16:
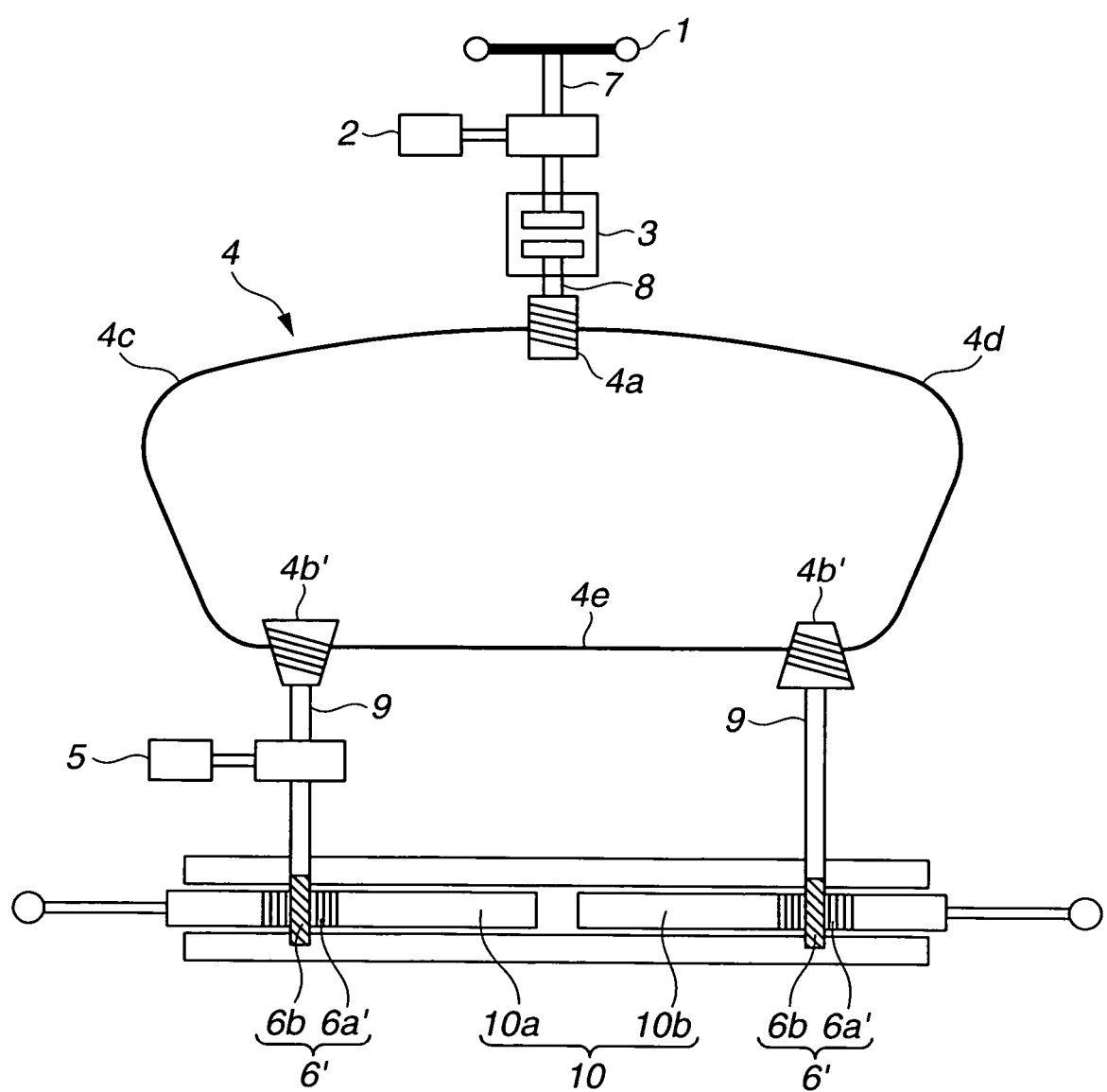

Referring now to FIG. 16, there is shown the sixth modification of the vehicle steering apparatus. In order to simplify the SBW vehicle steering apparatus, the steering apparatus of the sixth modification of FIG. 16 is somewhat modified from the third modification of FIG. 7. Concretely, the steering apparatus of the sixth modification of FIG. 16 is somewhat different from that of the third modification of FIG. 7, in that the single steering actuator system (5) is used rather than the dual steering actuator system (5, 5). As can be appreciated from comparison between the system diagrams shown in FIGS. 7 and 16, the right steering actuator of two steering actuators 5, 5, is eliminated in case of the steering apparatus of the sixth modification of FIG. 16. In the SBW vehicle steering apparatus of the sixth modification of FIG. 16, as a mechanical back-up system needed to mechanically couple the steering input section having steering wheel 1 and the steering output section having left and right movable rack shaft portions 10a and 10b to each other for fail-safe or back-up purposes, cable back-up mechanism 4 having the one steering input side cylindrical pulley 4a and the two steering output side taper pulleys 4b', 4b', is provided. Also provided is the sole clutch device 3 that is laid out between first and second column shafts 7 and 8 of the steering input section, and engaged during the back-up operating mode. Also provided in the steering output section is the sole steering actuator 5 that drives both of left and right rack shaft portions 10a and 10b. Toothed portions of constant-pitch racks 6', 6' are respectively formed on left and right movable rack shaft portions 10a and 10b, in such a manner that there is no differential rack stroke between rack strokes of left and right movable rack shaft portions 10a and 10b for the same pinion-shaft rotary motion. The operation of the SBW vehicle steering apparatus of the sixth modification of FIG. 16 is hereunder described briefly.

During a turn when steering wheel 1 is turned clockwise or counterclockwise with clutch device 3 disengaged, the left steering actuator 5, provided in the middle of the left pinion shaft, is driven in accordance with the SBW operating mode. Thus, the left pinion shaft 9 is driven directly by the sole steering actuator 5, while the right pinion shaft 9 is also driven by the same steering actuator 5 via the left-hand side taper pulley 4b', the third cable 4e, and the right-hand side taper pulley 4b'. In other words, part of steering torque, produced by the sole steering actuator 5, is applied from steering actuator 5 to the left pinion shaft 9, while the remaining torque is applied from steering actuator 5 through the left-hand side taper pulley 4b', the third cable 4e, and the right-hand side taper pulley 4b' to the left pinion shaft 9.

The SBW vehicle steering apparatus of the sixth modification of FIG. 16 has the following effect (10), in addition to the effect (1) obtained by the steering apparatus of the embodiment of FIGS. 1-3 and the effect (6) obtained by the steering apparatus of the third modification of FIG. 7.

(10) As a mechanical back-up system needed to mechanically couple the steering input section having steering wheel 1 and the steering output section having left and right movable rack shaft portions 10a and 10b to each other for fail-safe or back-up purposes, cable back-up mechanism 4 having one cylindrical pulley 4a of the steering input side and two frusto-conical taper pulleys 4b', 4b' of the steering output side is provided. Also provided is the sole clutch device 3 that is laid out between first and second column shafts 7 and 8 of the steering input section, and engaged during the back-up operating mode. Also provided in the steering output section is the sole steering actuator 5 that drives both of left and right rack shaft portions 10a and 10b. Toothed portions of constant-pitch racks 6', 6' are respectively formed on left and right movable rack shaft portions 10a and 10b, in such a manner that there is no differential rack stroke between left and right movable rack shaft portions 10a and 10b for the same pinion-shaft rotary motion. Thus, with the SBW vehicle steering apparatus of the sixth modification of FIG. 16, simplified and modified from the steering apparatus of the third modification of FIG. 7, it is possible to drive both of left and right movable rack shaft portions 10a and 10b by means of only the one steering actuator 5.

Figure 17:
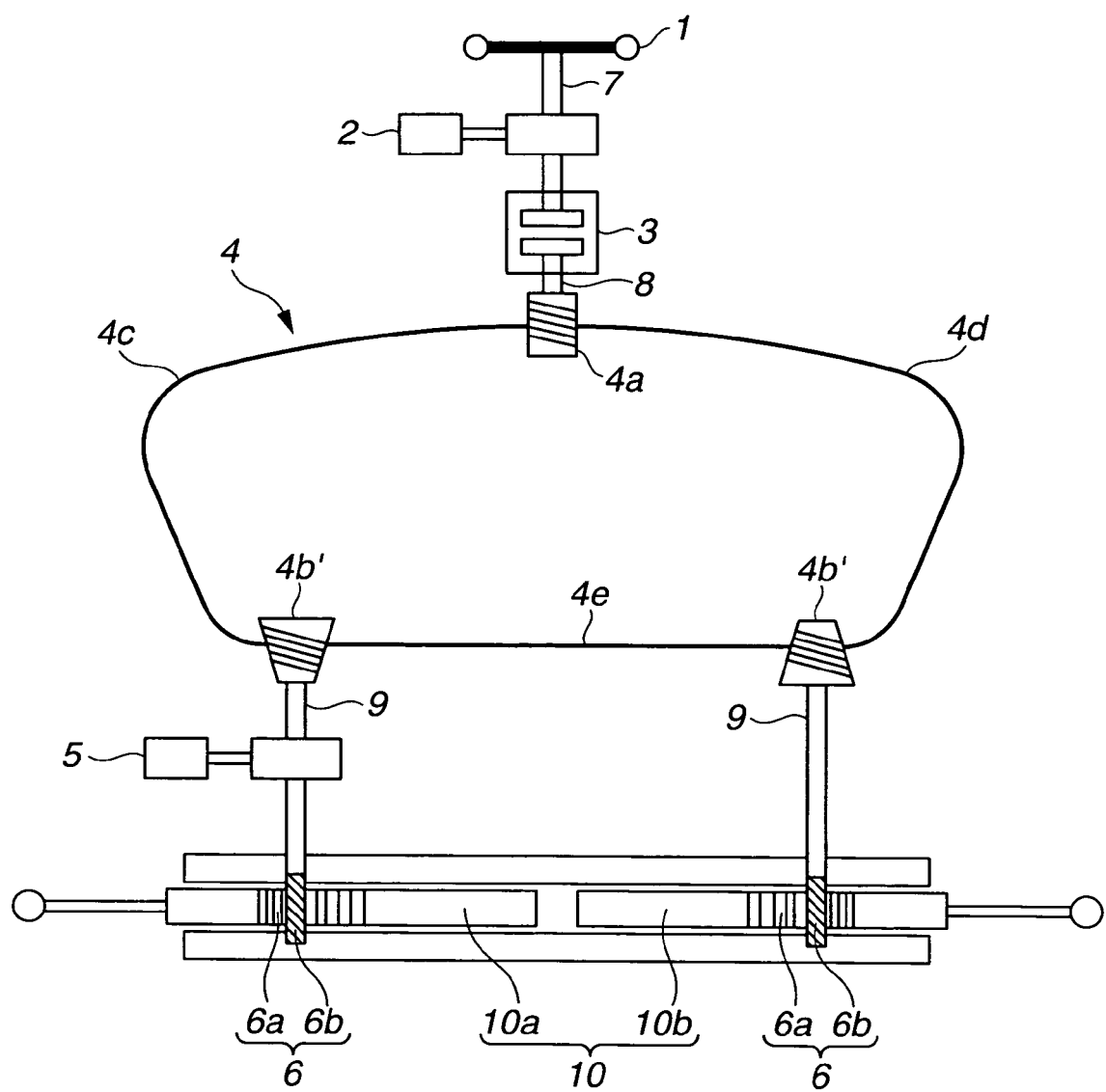

Referring now to FIG. 17, there is shown the seventh modification of the vehicle steering apparatus. In order to simplify the SBW vehicle steering apparatus, the steering apparatus of the seventh modification of FIG. 17 is somewhat modified from the fourth modification of FIG. 14. Concretely, the steering apparatus of the seventh modification of FIG. 17 is somewhat different from that of the fourth modification of FIG. 14, in that the single steering actuator system (5) is used rather than the dual steering actuator system (5, 5). As can be appreciated from comparison between the system diagrams shown in FIGS. 14 and 17, the right steering actuator of two steering actuators 5, 5; is eliminated in case of the steering apparatus of the seventh modification of FIG. 17. In the SBW vehicle steering apparatus of the seventh modification of FIG. 17, as a mechanical back-up system needed to mechanically couple the steering input section having steering wheel 1 and the steering output section having left and right movable rack shaft portions 10a and 10b to each other for fail-safe or back-up purposes, cable back-up mechanism 4 having the one steering input side cylindrical pulley 4a and the two steering output side taper pulleys 4b', 4b', is provided. Also provided is the sole clutch device 3 that is laid out between first and second column shafts 7 and 8 of the steering input section, and engaged during the back-up operating mode. Also provided in the steering output section is the sole steering actuator 5 that drives both of left and right rack shaft portions 10a and 10b. Toothed portions of variable-pitch racks 6, 6 are respectively formed on left and right movable rack shaft portions 10a and 10b, such that there is a differential rack stroke between left and right movable rack shaft portions 10a and 10b for the same pinion-shaft rotary motion, and that the gear pitch gradually variably decreases from the innermost end to the outermost end. The basic operation of the SBW vehicle steering apparatus of the seventh modification of FIG. 17 is similar to that of the fourth modification of FIG. 14. Regarding the steering torque flow, the steering apparatus of the seventh modification of FIG. 17 is identical to the steering torque flow achieved by the sixth modification of FIG. 16. That is, during a turn when steering wheel 1 is turned clockwise or counterclockwise with clutch device 3 disengaged, the left steering actuator 5, provided in the middle of the left pinion shaft, is driven in accordance with the SBW operating mode. Thus, steering torque, produced by the sole steering actuator 5, flows from steering actuator 5 to the left pinion shaft 9, and also flows from steering actuator 5 through the left-hand side taper pulley 4b', the third cable 4e, and the right-hand side taper pulley 4b' to the left pinion shaft 9.

The SBW vehicle steering apparatus of the seventh modification of FIG. 17 has the following effect (11), in addition to the effect (1) obtained by the steering apparatus of the embodiment of FIGS. 1-3 and the effect (6) obtained by the steering apparatus of the third modification of FIG. 7.

(11) As a mechanical back-up system needed to mechanically couple the steering input section having steering wheel 1 and the steering output section having left and right movable rack shaft portions 10a and 10b to each other for fail-safe or back-up purposes, cable back-up mechanism 4 having one cylindrical pulley 4a of the steering input side and two frusto-conical taper pulleys 4b', 4b' of the steering output side is provided. Also provided is the sole clutch device 3 that is laid out between first and second column shafts 7 and 8 of the steering input section, and engaged during the back-up operating mode. Also provided in the steering output section is the sole steering actuator 5 that drives both of left and right rack shaft portions 10a and 10b. Toothed portions of variable-pitch racks 6, 6 are respectively formed on left and right movable rack shaft portions 10a and 10b, such that there is a differential rack stroke between left and right movable rack shaft portions 10a and 10b for the same pinion-shaft rotary motion, and that the gear pitch gradually variably decreases from the innermost end to the outermost end. Thus, with the SBW vehicle steering apparatus of the seventh modification of FIG. 17, simplified and modified from the steering apparatus of the fourth modification of FIG. 14, it is possible to drive both of left and right movable rack shaft portions 10a and 10b by means of only the one steering actuator 5.

Figure 18:
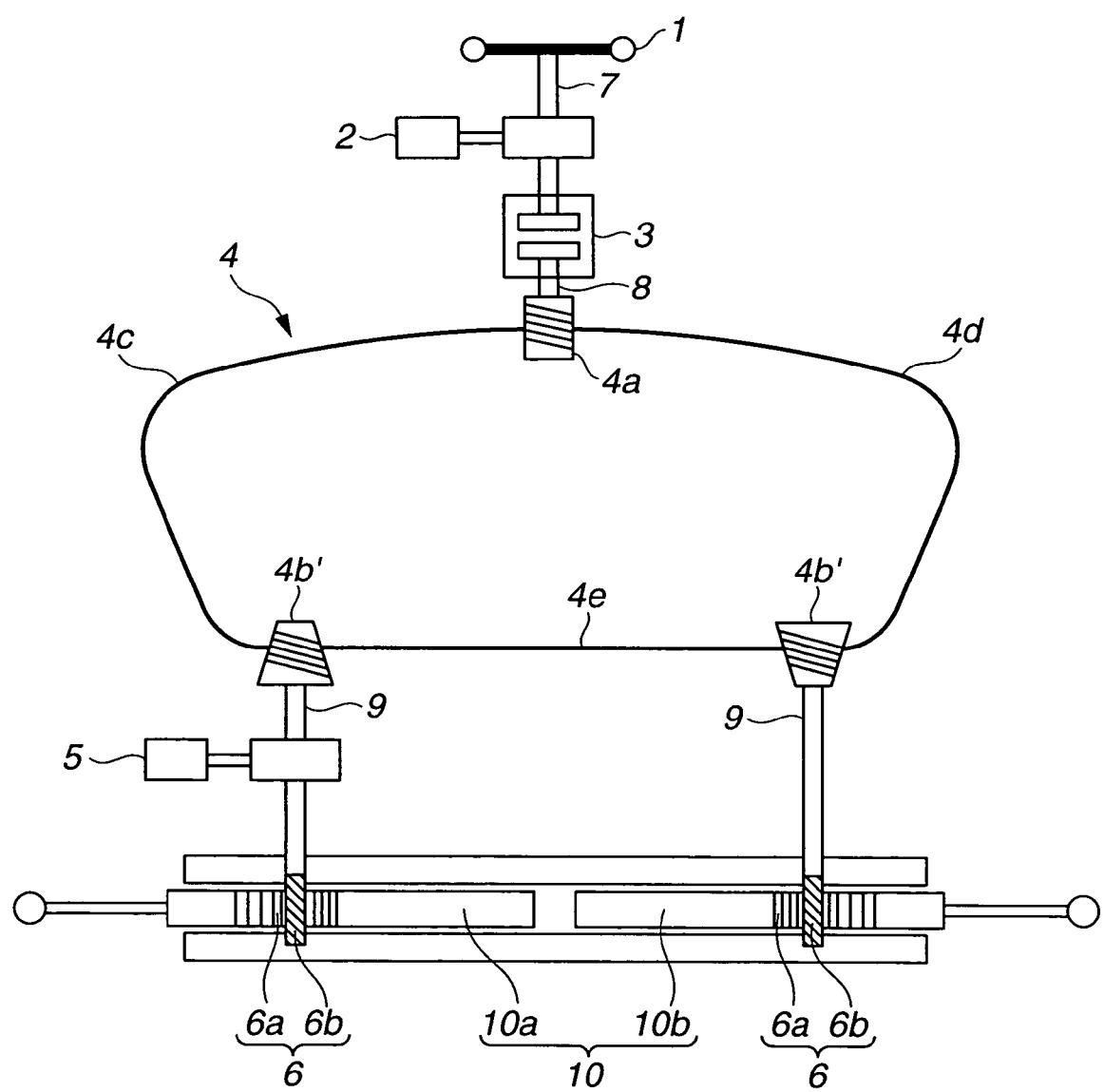

Referring now to FIG. 18, there is shown the eighth modification of the vehicle steering apparatus. In order to simplify the SBW vehicle steering system, the steering apparatus of the eighth modification of FIG. 18 is somewhat modified from the fifth modification of FIG. 15. Concretely, the steering apparatus of the eighth modification of FIG. 18 is somewhat different from that of the fifth modification of FIG. 15, in that the single steering actuator system (5) is used rather than the dual steering actuator system (5, 5). As can be appreciated from comparison between the system diagrams shown in FIG. 15 and 18, the right steering actuator of two steering actuators 5, 5, is eliminated in case of the steering apparatus of the eighth modification of FIG. 18. In the SBW vehicle steering apparatus of the eighth modification of FIG. 18, as a mechanical back-up system needed to mechanically couple the steering input section having steering wheel 1 and the steering output section having left and right movable rack shaft portions 10a and 10b to each other for fail-safe or back-up purposes, cable back-up mechanism 4 having the one steering input side cylindrical pulley 4a and the two steering output side taper pulleys 4b', 4b', is provided. Also provided is the sole clutch device 3 that is laid out between first and second column shafts 7 and 8 of the steering input section, and engaged during the back-up operating mode. Also provided in the steering output section is the sole steering actuator 5 that drive both of left and right rack shaft portions 10a and 10b. Toothed portions of variable racks 6, 6 are respectively formed on left and right movable rack shaft portions 10a and 10b, such that the outermost end of the toothed portion of each of left and right variable racks 6, 6 has the maximum gear pitch, and the innermost end of the toothed portion of each of left and right variable racks 6, 6 has the minimum gear pitch, and the gear pitch gradually variably increases from the innermost end to the outermost end, thus giving the inverted differential rack stroke characteristic that, on right or left turns, the rack stroke of the first movable rack shaft portion, extending and moving outside, becomes relatively smaller than that of the second rack shaft portion, contracting and moving inside. Additionally, two taper pulleys 4b', 4b' incorporated in the steering apparatus of the eighth modification of FIG. 18 are both reversed in their vertical directions, to provide the inverted differential rack stroke characteristic shown in FIG. 13C that, on right or left turns, the rack stroke of the first movable rack shaft portion, extending and moving outside, becomes relatively smaller than that of the second rack shaft portion, contracting and moving inside. The basic operation of the SBW vehicle steering apparatus of the eighth modification of FIG. 18 is similar to that of the fifth modification of FIG. 15. Regarding the steering torque flow, the steering apparatus of the eighth modification of FIG. 18 is identical to the steering torque flow achieved by the sixth and seventh modifications of FIGS. 16-17. Detailed description of the steering torque flow attained by the steering apparatus of the eighth modification of FIG. 18 will be omitted because the above description thereon seems to be self-explanatory.

The SBW vehicle steering apparatus of the eighth modification of FIG. 18 has the following effect (12), in addition to the effect (1) obtained by the steering apparatus of the embodiment of FIGS. 1-3 and the effect (6) obtained by the steering apparatus of the third modification of FIG. 7.

(12) As a mechanical back-up system needed to mechanically couple the steering input section having steering wheel 1 and the steering output section having left and right movable rack shaft portions 10a and 10b to each other for fail-safe or back-up purposes, cable back-up mechanism 4 having one cylindrical pulley 4a of the steering input side and two frusto-conical taper pulleys 4b', 4b' of the steering output side is provided. Also provided is the sole clutch device 3 that is laid out between first and second column shafts 7 and 8 of the steering input section, and engaged during the back-up operating mode. Also provided in the steering output section is the sole steering actuator 5 that drives both of left and right rack shaft portions 10a and 10b. Also provided are left and right variable-pitch rack-and-pinion mechanisms (the variable-pitch dual rack arrangement including variable racks 6, 6, whose rack gear portions 6a, 6a are formed on the respective rack shaft portions 10a and 10b separated from each other) that there is a differential rack stroke between left and right movable rack shaft portions 10a and 10b for the same pinion-shaft rotary motion and additionally the rack gear pitch gradually variably increases from the innermost end to the outermost end. In comparison with the SBW vehicle steering apparatus that either one of the variable-pitch dual rack arrangement and the dual taper-pulley arrangement is used as the steer angle converter, the SBW vehicle steering apparatus of the eighth modification of FIG. 18 using both of the variable-pitch dual rack arrangement enabling the inverted differential rack stroke characteristic opposite to the characteristic shown in FIG. 4 and the dual taper-pulley arrangement enabling the inverted differential rack stroke characteristic shown in FIG. 13C as the steer angle converter, the rack stroke of the second rack shaft portion contracting and moving inside is further remarkably increased or multiplied. That is, there is a big rack stroke difference between the relatively great rack-stroke, inwardly-contracting rack shaft portion and the relatively small rack-stroke, outwardly-extending rack shaft portion. Additionally, with the SBW vehicle steering apparatus of the eighth modification of FIG. 18, simplified and modified from the steering apparatus of the fifth modification of FIG. 15, it is possible to drive both of left and right movable rack shaft portions 10a and 10b by means of only the one steering actuator 5.

In the previously-described embodiment (FIGS. 1-3) and modifications (FIGS. 5-18), at least one of the variable-pitch dual rack arrangement (two-split variable racks 6, 6) and the dual taper-pulley arrangement (two taper pulleys 4b', 4b' tapered in the opposite directions) is used as a steer angle converter. Another type of differential mechanisms enabling a differential movement (or a differential rack stroke)

between left and right movable rack shaft portions separated from each other may be used as a steer angle converter. In the previously-described embodiment (FIGS. 1-3) and modifications (FIGS. 5-18), the steer angle converter, constructed by at least one of the variable-pitch dual rack arrangement (two-split variable racks 6, 6) and the dual taper-pulley arrangement (two taper pulleys 4b', 4b, tapered in the opposite directions) is applied to the steer-by-wire (SBW) type or the direct-coupled steering linkage type. Alternatively, the steer angle converter may be applied to another type of steering systems, such as a four-wheel steering (4WS) system or a steering system equipped with a variable steering ratio mechanism.

Referring now to FIGS. 19, 22, and 25-28, there are shown further modifications each employing the SBW system and the cable back-up mechanism. The basic construction of the steering apparatus of each of the modifications of FIGS. 19, 22, and 25-28 is similar to that of the embodiment of FIG. 1. Thus, in explaining the steering apparatus of each of the modifications of FIGS. 19, 22, and 25-28, for the purpose of simplification of the disclosure, the same reference signs used to designate elements in the embodiment of FIG. 1 will be applied to the corresponding elements used in the steering apparatus of each of the modifications of FIGS. 19, 22, and 25-28, while detailed description of the same reference signs will be omitted because the above description thereon seems to be self-explanatory. In the steering apparatus of each of the modifications of FIGS. 19, 22, and 25-28, the character "L" is added to indicate component parts arranged in the left-hand side of the vehicle, while the character "R" is added to indicate component parts arranged in the right-hand side of the vehicle.

Figure 19:
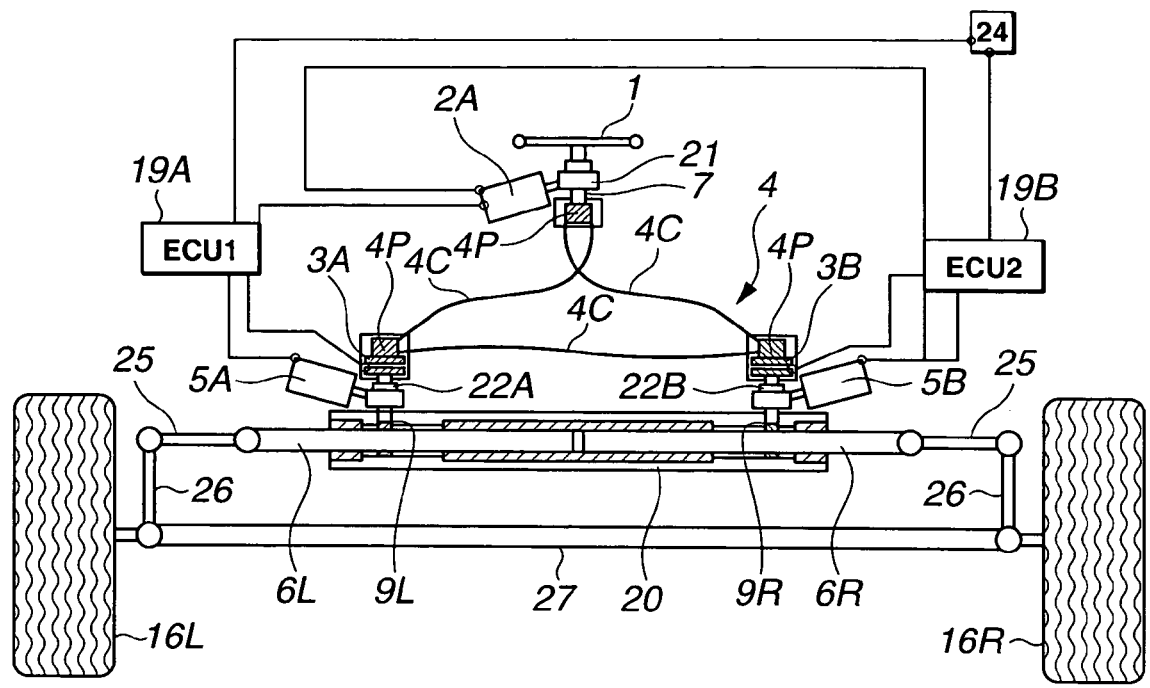
FIG. 19 is a detailed system diagram illustrating another modification of an SBW vehicle steering apparatus having a cable back-up mechanism.

In the SBW vehicle steering apparatus of the ninth modification shown in FIG. 19, as a mechanical back-up mechanism needed to mechanically couple the steering input section having steering wheel 1 and the steering output section having two-split left and right racks 6L, 6R to each other for fail-safe or back-up purposes, cable back-up mechanism 4 having three pulleys 4P, namely one steering input side cylindrical pulley and two steering output side cylindrical pulleys, and Bowden cables 4C linking these three pulleys to each other, is provided. Left and right racks 6L, 6R are slidably arranged in a steering rack tube 20, so that left and right racks 6L and 6R are movable independently of each other. A first clutch device 3A is provided in the middle of the left pinion shaft 9 and disposed between the steering output side left pulley of cable back-up mechanism 4 and the first steering actuator (the left steering actuator) 5A. A second clutch device 3B is provided in the middle of the right pinion shaft 9 and disposed between the steering output side right pulley of cable back-up mechanism 4 and the second steering actuator (the right steering actuator) 5B. A first feedback actuator 2A is attached to column shaft 7. A steering wheel angle sensor (or a handle angle senor) 21 is also attached to column shaft 7 for detecting a steering wheel angle (a handle angle OH) corresponding to the steering wheel movement (steering input applied to steering wheel 1). A left steer angle sensor 22A is attached to left pinion shaft 9L for detecting a steer angle θS of the left steered wheel 16L by sensing the number of revolutions of left pinion shaft 9L, whereas a right steer angle sensor 22B is attached to right pinion shaft 9R for detecting a steer angle of the right steered wheel 16R by sensing the number of revolutions of right pinion shaft 9R. As a rotational angle sensor, that is, steering wheel angle sensor 21, left steer angle sensor 22A, and right steer angle sensor 22B, a resolver is applicable to detect a rotational position of column shaft 7, a rotational position of left pinion shaft 9L, or a rotational position of right pinion shaft 9R. Instead of using the resolver, a rotary encoder may be used as a rotational angle sensor. Also provided is a vehicle speed sensor 24. Vehicle speed sensor 24 tells each of steering controllers 19A and 19B at what speed the vehicle is moving and generates a vehicle speed indicative signal. As described hereunder, feedback actuator 2A, first and second steering actuators 5A and 5B, and first and second clutch devices 3A and 3B are controlled by first and second steering controllers 19A (ECU1) and 19B (ECU2). Each of the first and second steering controllers 19A and 19B generally comprises a microcomputer. The first and second steering controllers 19A and 19B are the same in construction. Each of the steering controllers includes an input/output interface (I/O), memories (RAM, ROM), and a microprocessor or a central processing unit (CPU). The input/output interface (I/O) of the steering controller receives input information from various engine/vehicle sensors, namely steering wheel angle sensor 21, left and right steer angle sensors 22A and 22B, and vehicle speed sensor 24. Within the steering controller, the central processing unit (CPU) allows the access by the I/O interface of input informational data signals from the previously-discussed sensors. The CPU of the steering controller is responsible for carrying the vehicle-steering-system control program stored in memories and is capable of performing necessary arithmetic and logic operations. Computational results, that is, calculated output signals are relayed through the output interface circuitry of the steering controller to output stages, namely the associated clutch device and actuators. In the SBW vehicle steering apparatus of the ninth modification of FIG. 19, the first steering controller 19A is assigned to control the first steering actuator 5A and first clutch device 3A. The second steering controller 19B is assigned to control the second steering actuator 5B and second clutch device 3B. The first and second steering controllers 19A and 19B are both assigned to control feedback actuator 2A. In the ninth modification of FIG. 19, each of steering actuators 5A and 5B and feedback actuator 2A is comprised of a one-rotor one-stator motor.

Figure 23:
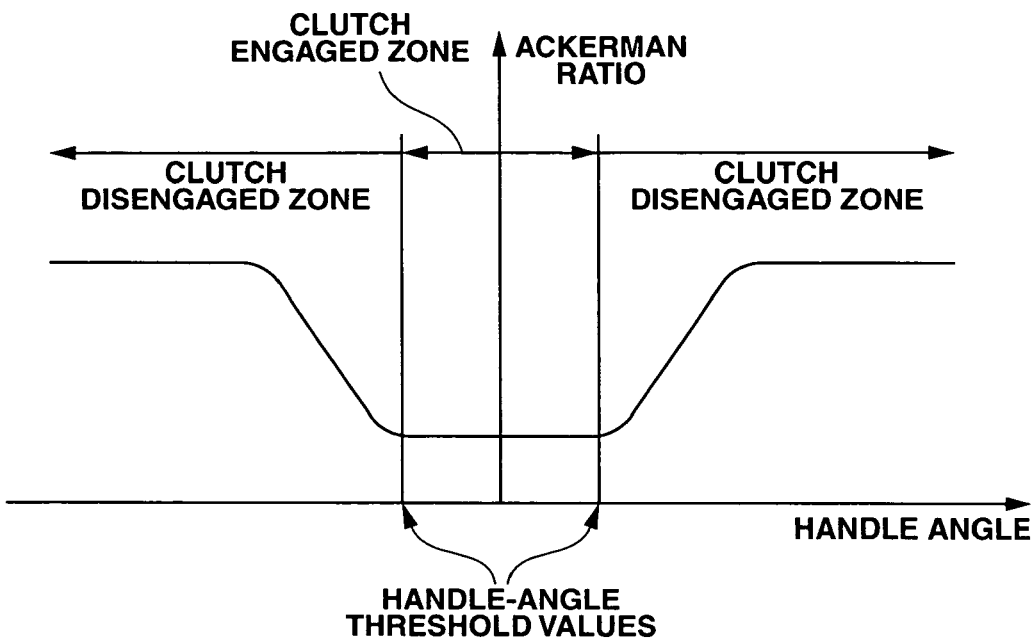
FIG. 23 is a predetermined handle-angle versus Ackerman ratio characteristic diagram.

As can be seen from the predetermined handle-angle versus Ackerman ratio characteristic diagram shown in FIG. 23, the first and second steering controllers 19A and 19B operate to engage the respective clutch devices 3A and 3B when the detected value of handle angle detected by steering wheel angle sensor 21 is within a predetermined small handle-angle range or a predetermined small clockwise/anticlockwise steering wheel movement in which the handle angle is less than or equal to a predetermined upper threshold value and greater than or equal to a predetermined lower threshold value whose absolute value is equal to that of the upper threshold value. With left and right clutch devices 3A and 3B engaged, a synchronous movement of left and right racks 6L and 6R is achieved with no differential rack stroke of the left and right racks, as if the left and right racks are mechanically linked to each other. Conversely when the handle angle is within a predetermined large handle-angle range or a predetermined large clockwise/anticlockwise steering wheel movement in which the handle angle is greater than the predetermined upper threshold value or less than the predetermined lower threshold value, steering controllers 19A and 19B operate to disengage the respective clutch devices 3A and 3B. With left and right clutch devices 3A and 3B disengaged, left and right steering actuators 5A and 5B are controlled independently of each other by the respective steering controllers 19A and 19B in such a manner as to permit a differential movement (or a differential rack stroke) between left and right racks 6L and 6R, thus ensuring a suitable Ackerman ratio (or a suitable Ackerman angle).

Figure 24:
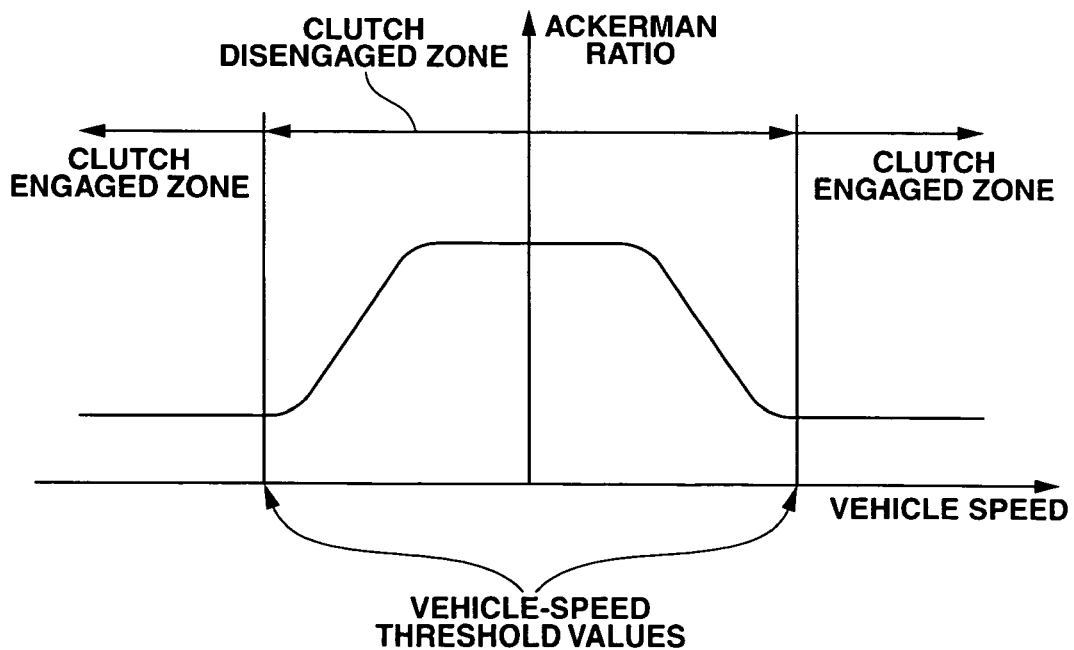
FIG. 24 is a predetermined vehicle-speed versus Ackerman ratio characteristic diagram.

As can be seen from the predetermined vehicle-speed versus Ackerman ratio characteristic diagram shown in FIG. 24, the first and second steering controllers 19A and 19B operate to engage the respective clutch devices 3A and 3B when the detected value of vehicle speed detected by vehicle speed sensor 24 is within a predetermined high vehicle-speed range in which the vehicle speed is higher than a predetermined upper threshold value (corresponding to a predetermined positive threshold value during forward vehicle driving) or less than a predetermined lower threshold value (corresponding to a predetermined negative threshold value during backward vehicle driving) whose absolute value is equal to that of the upper threshold value. With left and right clutch devices 3A and 3B engaged, a synchronous movement of left and right racks 6L and 6R is achieved without any differential rack stroke of the left and right racks, as if left and right racks are mechanically linked to each other. Conversely when the vehicle speed is within a predetermined low vehicle-speed range in which the vehicle speed is less than or equal to the predetermined upper threshold value and greater than or equal to the predetermined lower threshold value, steering controllers 19A and 19B operate to disengage the respective clutch devices 3A and 3B. With left and right clutch devices 3A and 3B disengaged, left and right steering actuators 5A and 5B are controlled independently of each other by the respective steering controllers 19A and 19B in such a manner as to permit a differential movement (or a differential rack stroke) between left and right racks 6L and 6R, thus ensuring a suitable Ackerman ratio (or a suitable Ackerman angle).

As seen from the steering linkage layout shown in FIG. 19, in the steering linkage of the ninth modification of FIG. 19, the relative installation positions between a left tie rod 25 and a left knuckle arm 26 and between a right tie rod 25 and a left knuckle arm 26 are determined so as to enhance a link efficiency. That is, the left tie rod 25, pin-connected to the outermost end of the left rack, and the left knuckle arm 26, pin-connected to the left end of a front axle 27, are laid out at a substantially right angle and pin-connected to each other. In a similar manner, the right tie rod 13, pin-connected to the outermost end of the right rack, and the right knuckle arm 26, pin-connected to the right end of front axle 27, are laid out at a substantially right angle and pin-connected to each other.

[Reconciled Link Efficiency and Ackerman Ratio]

Figure 20:
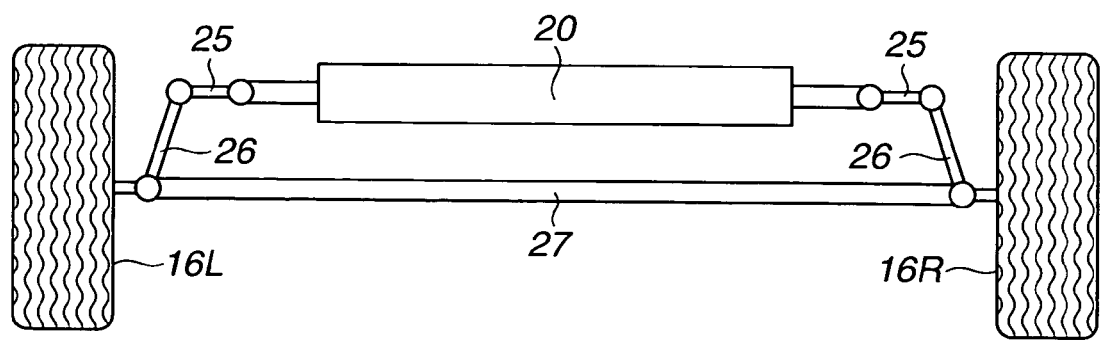
FIG. 20 is an explanatory diagram showing a steering linkage in which a higher priority is put on an Ackerman ratio rather than a linkage efficiency.

In a general cable steering column system in which Bowden cables are used instead of using a steering shaft and a steering rack-and-pinion steering gear device is comprised of a sole rigid steering rack shaft, suppose that, as shown in FIG. 20, the relative installation positions between the left tie rod 25 and the left knuckle arm 26 and between the right tie rod 25 and the right knuckle arm 26 are determined so as to ensure an Ackerman ratio or an Ackerman steer angle δ (=L/R), which is represented as only a ratio L/R of a wheelbase L to a radius R of turn, and correlates with the minimum radius of turn of the vehicle. In such a case, the link efficiency of the steering linkage is also univocally determined by the relative installation-position relationship between the tie rods and steering knuckle arms, based on the Ackerman steer angle δ (=L/R). The link efficiency can be adjusted within layout limits by changing the suspension geometry. However, owing to the layout limits it is difficult to satisfactorily enhance the link efficiency by way of only the suspension geometry. The steering linkage of a comparatively low link efficiency requires a large-size steering actuator.

Figure 21:
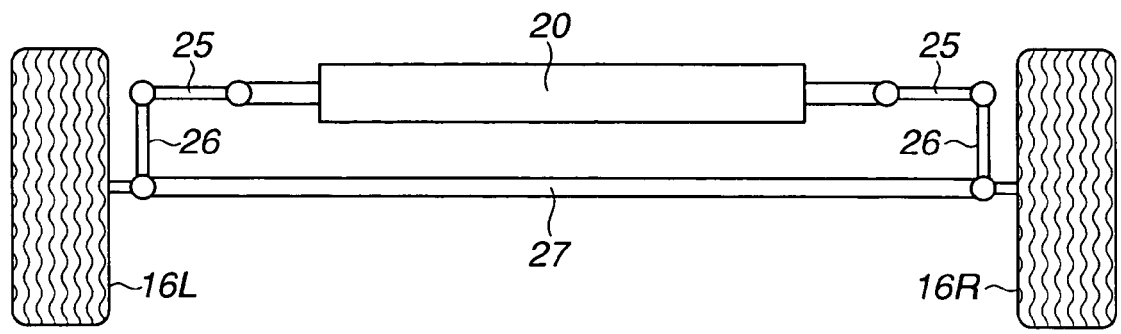
FIG. 21 is an explanatory diagram showing a steering linkage in which a higher priority is put on a linkage efficiency rather than an Ackerman ratio.

In contrast to the above, in a general cable steering column system in which Bowden cables are used instead of using a steering shaft and a steering rack-and-pinion steering gear device is comprised of a sole rigid steering rack shaft, suppose that, as shown in FIG. 21, the proper relative installation-position relationship between the tie rods and steering knuckle arms is determined to provide a higher link efficiency. In such a case, it is difficult to provide the required Ackerman ratio.

On the other hand, in the SBW vehicle steering apparatus of the ninth modification of FIG. 19, under a condition where the first and second clutch devices 3A and 3B are engaged responsively to the respective command signals from steering controllers 19A and 19B, a synchronous movement of left and right racks 6L and 6R is achieved without any differential rack stroke, as if left and right racks 6L and 6R are mechanically linked to each other just like a sole rigid steering rack shaft, and additionally the SBW vehicle steering apparatus of the ninth modification of FIG. 19 functions as a cable steering column system. Conversely under a condition where the first and second clutch devices 3A and 3B are disengaged responsively to the respective command signals from steering controllers 19A and 19B, left and right racks 6L and 6R are controlled independently of each other by the respective steering actuators 5A and 5B that drive the respective pinion shafts 9A and 9B. Thus, even when the steering linkage layout, that is, the relative installation-position relationship between the tie rods and steering knuckles, is determined to put a higher priority on the link efficiency rather than the Ackerman ratio L/R, it is possible to provide a great steering-angle difference between steer angles of left and right steered wheels by way of the differential rack stroke produced by the independent control of left and right racks 6L and 6R. As discussed above, by virtue of the differential rack stroke produced by the independent control of left and right racks 6L and 6R, it is possible to reconcile and to balance two contradictory requirements, that is, enhanced link efficiency and required Ackerman ratio L/R.

[Cable Back-up Mechanism]

As discussed above, with clutch devices 3A and 3B both engaged, a synchronous movement of left and right racks 6L and 6R is achieved without any differential rack stroke, as if left and right racks 6L and 6R are mechanically linked to each other just like a sole rigid steering rack shaft, and additionally the SBW vehicle steering apparatus of the ninth modification of FIG. 19 functions as a cable steering column system. Under this condition (with clutch devices 3A and 3B engaged), steering torque input into steering wheel 1, is transmitted through cable back-up mechanism 4 via left and right racks 6L and 6R to left and right steered wheels 16L and 16R.

Figure 22:
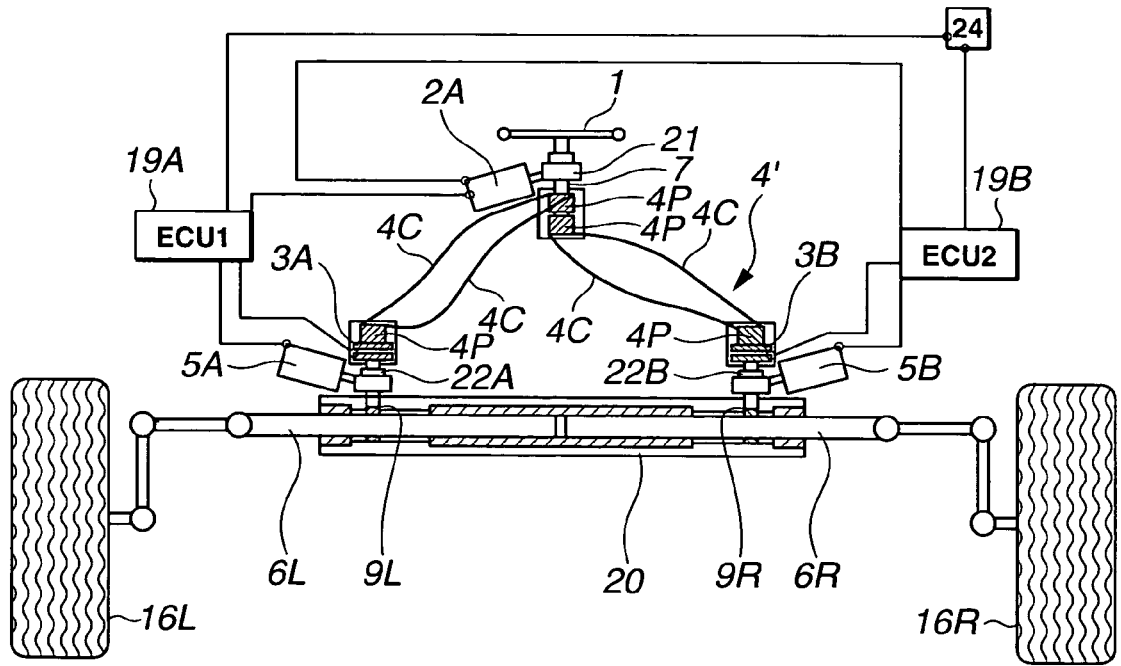
FIG. 22 is a detailed system diagram illustrating another modification.

For torque transmission, cable back-up mechanism 4 shown in FIG. 19 is comprised of three pulleys 4P, a first Bowden cable 4C linking the steering input side pulley and the steering output side left pulley, a second Bowden cable 4C linking the steering input side pulley and the steering output side right pulley, and a third Bowden cable 4C running between the steering output side left and right pulleys and serving as a motion linkage needed for mechanically linking rotary motions of the left and right pulleys. Alternatively, as shown in FIG. 22, for torque transmission, cable back-up mechanism 4 may be comprised of four pulleys 4P, two Bowden cables 4C running between the steering input side first pulley and the steering output side left pulley, and two Bowden cables 4C running between the steering input side second pulley and the steering output side right pulley. The construction of three-pulley equipped cable back-up mechanism 4 incorporated in the SBW vehicle steering apparatus of the ninth modification of FIG. 19 is superior to the four-pulley equipped cable back-up mechanism 4 incorporated in the SBW vehicle steering apparatus of the tenth modification of FIG. 22, in reduced manufacturing costs and simple construction.

[Steer-angle Control for Steered Wheels]

When the handle angle detected by steering wheel angle sensor 21 is within the predetermined small handle-angle range of the predetermined handle-angle versus Ackerman ratio characteristic diagram shown in FIG. 23, it is unnecessary to provide a great steer-angle difference between left and right steered wheels 16L and 16R, in other words, a great differential rack stroke of left and right steering racks 6L and 6R. Thus, in the predetermined small handle-angle range, clutch devices 3A and 3B are engaged so that a synchronous movement of left and right racks 6L and 6R is achieved without any differential rack stroke, as if left and right racks 6L and 6R are mechanically linked to each other just like a sole rigid steering rack shaft, and additionally the SBW vehicle steering apparatus of the ninth modification of FIG. 19 functions as a cable steering column system, while ensuring steering torque transmission from steering wheel 1 through cable back-up mechanism 4 via left and right racks 6L and 6R to left and right steered wheels 16L and 16R.

Conversely when the handle angle is within the predetermined large handle-angle range of the predetermined handle-angle versus Ackerman ratio characteristic diagram shown in FIG. 23, it is necessary to provide a great steer-angle difference between left and right steered wheels 16L and 16R, in other words, a great differential rack stroke of left and right steering racks 6L and 6R. Thus, in the predetermined large handle-angle range, clutch devices 3A and 3B are disengaged so that steering wheel 1 is mechanically separated from each of left and right racks 6L and 6R, and the left and right racks are controlled independently of each other through the respective steering actuators 5A and 5B so as to provide a great steer-angle difference between left and right steered wheels 16L and 16R, and consequently to ensure a suitable Ackerman ratio by way of the independent control of the left and right steering actuators.

When the vehicle speed detected by vehicle speed sensor 24 is within the predetermined high vehicle-speed range of the predetermined vehicle-speed versus Ackerman ratio characteristic diagram shown in FIG. 24, it is unnecessary to provide a great steer-angle difference between left and right steered wheels 16L and 16R, in other words, a great differential rack stroke of left and right steering racks 6L and 6R. Thus, in the predetermined high vehicle-speed range, clutch devices 3A and 3B are engaged so that a synchronous movement of left and right racks 6L and 6R is achieved without any differential rack stroke, as if left and right racks 6L and 6R are mechanically linked to each other just like a sole rigid steering rack shaft, and additionally the SBW vehicle steering apparatus of the ninth modification of FIG. 19 functions as a cable steering column system, while ensuring steering torque transmission from steering wheel 1 through cable back-up mechanism 4 via left and right racks 6L and 6R to left and right steered wheels 16L and 16R.

Conversely when the vehicle speed is within the predetermined low vehicle-speed range of the predetermined vehicle-speed versus Ackerman ratio characteristic diagram shown in FIG. 24, it is necessary to provide a great steer-angle difference between left and right steered wheels 16L and 16R, in other words, a great differential rack stroke of left and right steering racks 6L and 6R. Thus, in the predetermined low vehicle-speed range, clutch devices 3A and 3B are disengaged so that steering wheel 1 is mechanically separated from each of left and right racks 6L and 6R, and the left and right racks are controlled independently of each other through the respective steering actuators 5A and 5B so as to provide a great steer-angle difference between left and right steered wheels 16L and 16R, and consequently to ensure a suitable Ackerman ratio by way of the independent control of the left and right steering actuators.

In the SBW vehicle steering apparatus of the ninth modification of FIG. 19, the first and second steering controllers 19A and 19B, the first and second steering actuators 5A and 5B, and the two-split racks 6L and 6R cooperate with each other to provide a steer angle converter capable of giving a differential rack stroke of left and right racks 6L and 6R when left and right steered wheels are steered. By virtue of the differential rack stroke function of the steer angle converter during steering operation, it is possible to balance two contradictory requirements, that is, enhanced link efficiency and required Ackerman ratio L/R. As appreciated, the first steer angle converter, comprised of the first and second steering controllers 19A and 19B, the first and second steering actuators 5A and 5B, and the two-split racks 6L and 6R, can be further combined with a second steer angle converter constructed by a variable-pitch dual rack arrangement comprised of left and right variable racks 6L and 6R. In such a case, it is possible to provide a more wide-range variable differential rack stroke characteristic, and whereby it is possible to more effectively balance two contradictory requirements, that is, enhanced link efficiency and required Ackerman ratio L/R.

The SBW vehicle steering apparatus of the ninth modification of FIG. 19 has the following effects (13)-(16).

(13) In the SBW vehicle steering apparatus in which steering input to steering wheel 1 is transmitted directly via cable back-up mechanism 4 during the back-up operating mode to the steering rack shaft or transmitted indirectly to the steering rack shaft during the SBW operating mode and then the left and right steered wheels are steerable by way of the steering rack shaft movement occurring due to the steering input, the steering rack shaft is split into left and right movable racks 6L and 6R. Cable back-up mechanism 4 is constructed as a mechanical back-up mechanism having three pulleys 4P, namely one steering input side cylindrical pulley attached to column shaft 7 and two steering output side cylindrical pulleys fixedly connected to upper ends of left and right pinion shafts 9L and 9R in meshed-engagement with the respective racks 6L and 6R, and Bowden cables 4C linking these three pulleys to each other. The first steering actuator 5A is provided in the middle of left pinion shaft 9L for driving left pinion shaft 9L and thus producing the left rack stroke, while the second steering actuator 5B is provided in the middle of right pinion shaft 9R for driving right pinion shaft 9R and thus producing the right rack stroke. The first clutch device 3A is provided in the middle of left pinion shaft 9L and disposed between the steering output side left pulley of cable back-up mechanism 4 and the first steering actuator 5A, the second clutch device 3B is provided in the middle of right pinion shaft 9R and disposed between the steering output side right pulley of cable back-up mechanism 4 and the second steering actuator 5B. By independently controlling the first and second steering actuators 5A and 5B associated with the respective racks 6L and 6R via left and right pinion shafts 9L and 9R with clutch devices 3A and 3B disengaged, it is possible to provide the steer-angle difference between left and right steered wheels 16L and 16R by way of the differential rack stroke of left and right racks 6L and 6R, thus reconciling and balancing two contradictory requirements, that is, enhanced link efficiency and required Ackerman ratio L/R.

(14) Steering wheel angle sensor (or handle angle senor) 21 is attached to column shaft 7 for detecting a steering wheel angle (a handle angle). When the handle angle detected by steering wheel angle sensor 21 is within the predetermined small handle-angle range, clutch devices 3A and 3B are engaged so that a synchronous movement of left and right racks 6L and 6R is achieved with no differential rack stroke, as if left and right racks 6L and 6R are mechanically linked to each other just like a sole rigid steering rack shaft. Conversely when the handle angle is within the predetermined large handle-angle range, clutch devices 3A and 3B are disengaged so that steering wheel 1 is mechanically separated from each of left and right racks 6L and 6R, and the left and right racks are controlled independently of each other through the respective steering actuators 5A and 5B so as to provide a great steer-angle difference between left and right steered wheels 16L and 16R, and consequently to ensure a suitable Ackerman ratio by way of the independent control of the first and second steering actuators 5A and 5B. Also provided are the first and second steering controllers 19A and 19B for the previously-noted independent control for the first and second steering actuators 5A and 5B. Therefore, it is possible to reconcile and balance two contradictory requirements, that is, a high link efficiency in the predetermined small handle-angle range and a high Ackerman ratio in the predetermined large handle-angle range.

(15) Vehicle speed sensor 24 is provided for detecting vehicle speed. When the vehicle speed detected by vehicle speed sensor 24 is within the predetermined high vehicle-speed range, clutch devices 3A and 3B are engaged so that a synchronous movement of left and right racks 6L and 6R is achieved with no differential rack stroke, as if left and right racks 6L and 6R are mechanically linked to each other just like a sole rigid steering rack shaft. Conversely when the vehicle speed is within the predetermined low vehicle-speed range, clutch devices 3A and 3B are disengaged so that steering wheel 1 is mechanically separated from each of left and right racks 6L and 6R, and the left and right racks are controlled independently of each other through the respective steering actuators 5A and 5B so as to provide a great steer-angle difference between left and right steered wheels 16L and 16R, and consequently to ensure a suitable Ackerman ratio by way of the independent control of the left and right steering actuators. Also provided are the first and second steering controllers 19A and 19B for the previously-noted independent control for the first and second steering actuators 5A and 5B. Therefore, it is possible to reconcile and balance two contradictory requirements, that is, a high link efficiency during high-speed turns and a high Ackerman ratio during low-speed turns.

(16) The first clutch device 3A is provided in the middle of left pinion shaft 9L and disposed between the steering output side left pulley of cable back-up mechanism 4 and the first steering actuator 5A, whereas the second clutch device 3B is provided in the middle of right pinion shaft 9R and disposed between the steering output side right pulley of cable back-up mechanism 4 and the second steering actuator 5B. Thus, during the SBW operating mode with clutch devices 3A and 3B disengaged, it is possible to certainly effectively prevent the cables and pulleys of cable back-up mechanism 4 from being moved and dragged in synchronism with movement of the steering output section (the two-split steering rack shaft). Therefore it is possible to more accurately control the steering linkage portion linked to left rack 6L and the steering linkage portion linked to right rack 6R independently of each other by means of the respective steering actuators 5A and 5B during the SBW operating mode with clutch devices 3A and 3B disengaged.

Figure 25:
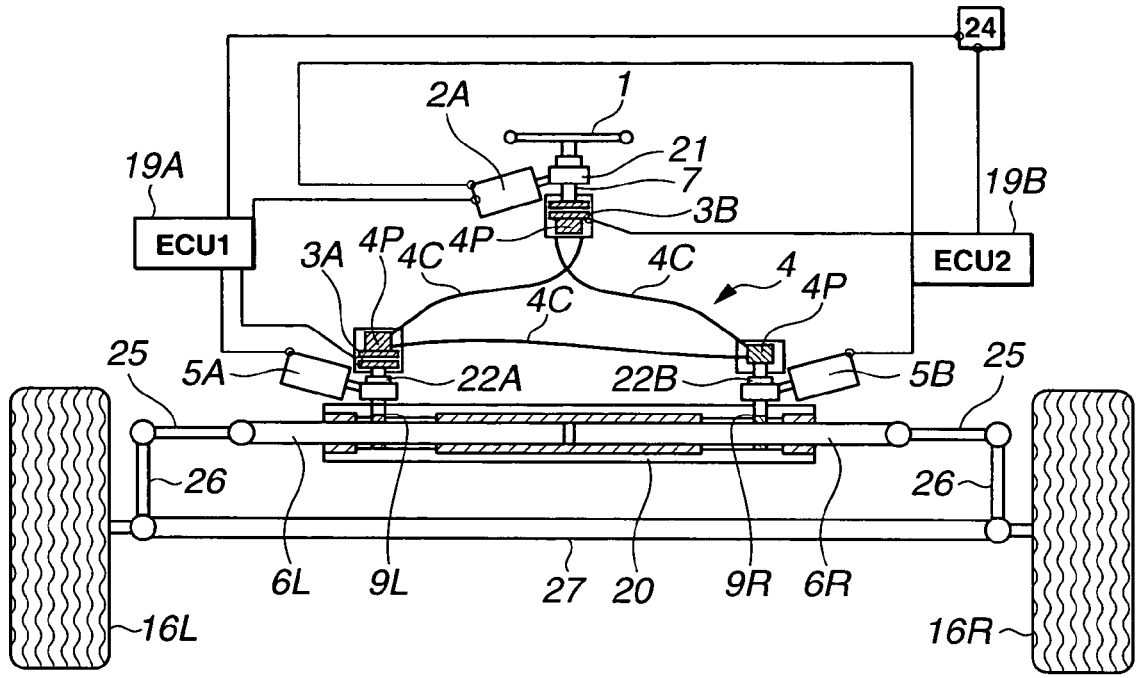
FIGS. 25-28 are detailed system diagrams illustrating another modifications.

Referring now to FIG. 25, there is shown the eleventh modification of the SBW vehicle steering apparatus. In the SBW vehicle steering apparatus of the eleventh modification of FIG. 25, the installation positions of the first and second clutch devices 3A and 3B are somewhat modified from the steering apparatus of the ninth modification of FIG. 19. As shown in FIG. 25, the first clutch device 3A is provided in the middle of one of left and right pinion shafts 9L, 9R and disposed between the steering output side pulley (the left pulley) fixedly connected to the upper end of the one pinion shaft and the first steering actuator 5A. The second clutch device 3B is provided in the middle of column shaft 7 and disposed between the steering input side pulley of cable back-up mechanism 4 and the steering input section (steering wheel 1). The other structure of the SBW vehicle steering apparatus of the eleventh modification of FIG. 5 is identical to that of the ninth modification of FIG. 19. The steering apparatus of the eleventh modification of FIG. 25 operates as follows.

When steering wheel 1 is turned under a condition where the first and second clutches 3A and 3B are both disengaged responsively to the respective command signals from steering controllers 19A and 19B, the cables and pulleys of cable back-up mechanism 4 are moved and dragged by only the right steered wheel 16R. Under this condition, it is possible to prevent the cables and pulleys of cable back-up mechanism 4 from being moved and dragged in synchronism with rotary motion of the steering input section (steering wheel 1), thus avoiding the driver's steering feel from being deteriorated owing to friction drag or frictional resistance between the outer tube and the inner cable of Bowden cable 4C.

The SBW vehicle steering apparatus of the eleventh modification of FIG. 25 has the following effect (17) in addition to the effects (13)-(16) obtained by the steering apparatus of the ninth modification of FIG. 19.

(17) The first clutch device 3A is provided in the middle of one of left and right pinion shafts 9L, 9R and disposed between the steering output side pulley (the left pulley) fixedly connected to the upper end of the one pinion shaft and the first steering actuator 5A. The second clutch device 3B is provided in the middle of column shaft 7 and disposed between the steering input side pulley of cable back-up mechanism 4 and the steering input section (steering wheel 1). Thus, during steering operation with clutch devices 3A and 3B disengaged, it is possible to provide a good steering feel.

Figure 26:
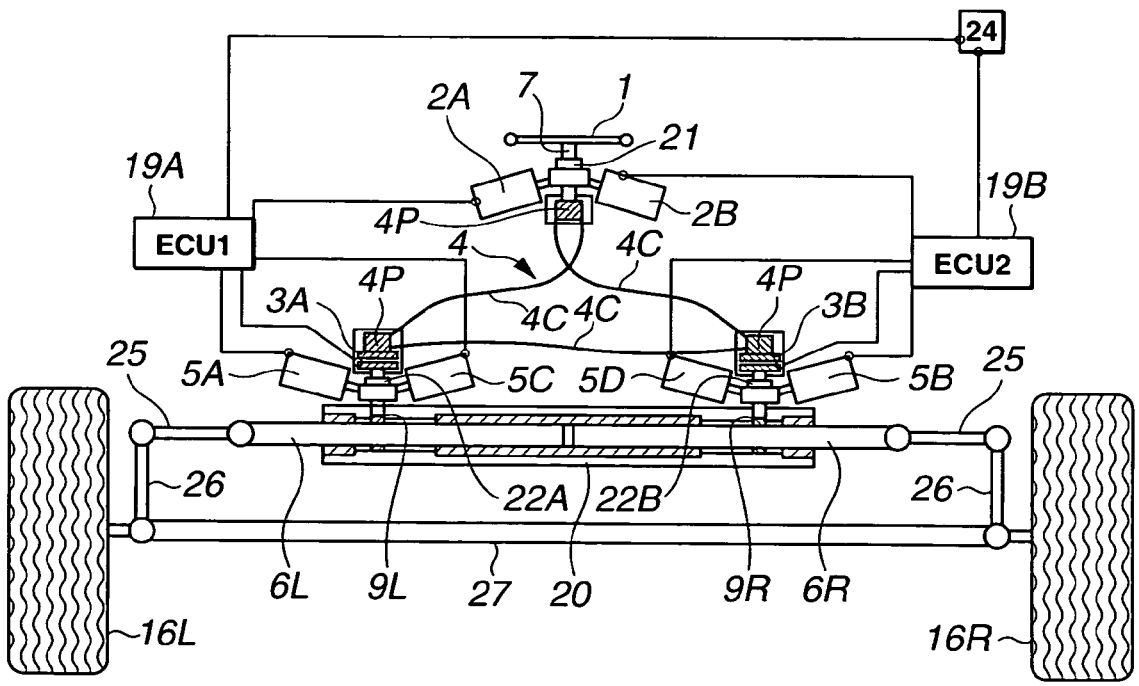

Referring now to FIG. 26, there is shown the twelfth modification of the SBW vehicle steering apparatus. In the SBW vehicle steering apparatus of the twelfth modification of FIG. 26, a first pair of steering actuators 5A and 5C are used for the rack stroke of left rack 6L, while a second pair of steering actuators 5B and 5D are used for the rack stroke of right rack 6R. Concretely, as shown in FIG. 26, the first pair of steering actuators 5A and 5C are provided in the middle of left pinion shaft 9L, whereas the second pair of steering actuators 5B and 5D are provided in the middle of right pinion shaft 9R. In the steering apparatus of the twelfth modification of FIG. 26, the two steering actuators for each individual rack are provided. In lieu thereof, two or more steering actuators for each individual rack may be provided.

One pair of feedback actuators 2A and 2B are provided in the middle of column shaft 7. When either one of steering actuators 5A, 5B, 5C, and 5D is failed or when either one of the first steering actuator pair (5A, 5C) and either one of the second steering actuator pair (5B, 5D) are failed during SBW operating mode in which clutch devices 3A and 3B are disengaged, the first and second steering controllers 19A and 19B operate to continuously execute the SBW operating mode by means of the normally-operating steering actuators except the failed actuators, until neutral positions of left and right racks 6L and 6R are reached. And then, immediately when the rack neutral positions has been reached, the first and second steering controllers 19A and 19B switches from the SBW operating mode to the back-up operating mode (or the fail-safe operating mode) by engaging clutch devices 3A and 3B. In the steering apparatus of the twelfth modification of FIG. 26, the first steering controller 19A is assigned to control the first feedback actuator 2A, the first clutch device 3A, and the first pair of steering actuators (5A, 5C). The second steering controller 19B is assigned to control the second feedback actuator 2B, the second clutch device 3B, and the second pair of steering actuators (5B, 5D). That is, the SBW vehicle steering apparatus of the twelfth modification of FIG. 26 ensures the dual feedback-actuator and steering-actuator control system (simply, the dual actuator control system). The other structure of the twelfth modification of FIG. 26 is identical to that of the ninth modification of FIG. 19. The steering apparatus of the twelfth modification of FIG. 26 operates as follows.

The SBW vehicle steering apparatus of the twelfth modification of FIG. 26 uses the dual feedback actuator system, the dual steering actuator system for each individual rack, and the dual actuator control system. Thus, even when either one of steering actuators 5A, 5B, 5C, and 5D is failed or even when either one of the first steering actuator pair (5A, 5C) and either one of the second steering actuator pair (5B, 5D) are failed during SBW operating mode in which clutch devices 3A and 3B are disengaged, the SBW operating mode can be continuously executed by means of the normally-operating steering actuators except the failed actuators, until predetermined neutral positions of left and right racks 6L and 6R are reached. Therefore, it is unnecessary to rapidly engage clutch devices 3A and 3B immediately when the SBW system failure occurs. After the SBW system failure (the actuator failure) occurs, the first and second steering controllers 19A and 19B operates to continuously execute the SBW operating mode until the predetermined rack neutral positions, substantially corresponding to zero average steer angle of the steered wheel pair (16L, 16R), are reached. Immediately when the predetermined rack neutral positions has been reached, the first and second steering controllers 19A and 19B switches from the SBW operating mode to the back-up operating mode (or the fail-safe operating mode) by engaging clutch devices 3A and 3B, and whereby a synchronous movement of left and right racks 6L and 6R is achieved with no differential rack stroke, as if two racks 6L and 6R are mechanically linked to each other just like a sole rigid steering rack shaft, and additionally the SBW vehicle steering apparatus of the twelfth modification of FIG. 26 functions as a cable steering column system. Suppose that clutch devices 3A and 3B are engaged immediately when either one of steering actuators 5A-5D has been failed, there is an increased tendency for undesirable toe-angle changes of left and right steered wheels 16L and 16R to occur near the predetermined rack neutral positions.

The SBW vehicle steering apparatus of the twelfth modification of FIG. 26 has the following effects (18)-(19) in addition to the effects (13)-(16) obtained by the steering apparatus of the ninth modification of FIG. 19.

(18) In order to construct the dual steering actuator system for each individual rack, the first pair of steering actuators 5A and 5C are provided in the middle of left pinion shaft 9L, whereas the second pair of steering actuators 5B and 5D are provided in the middle of right pinion shaft 9R. Thus, even when either one of steering actuators 5A-5D is failed or even when either one of the first steering actuator pair (5A, 5C) and either one of the second steering actuator pair (5B, 5D) are failed during SBW operating mode, it is possible to maintain the steer-angle control function.

(19) When either one of a first group of steering actuators (two or more steering actuators 5A, 5C) attached to left pinion shaft 9L and a second group of steering actuators (two or more steering actuators 5B, 5D) attached to right pinion shaft 9R, or when either one of the first group of steering actuators and either one of the second group of steering actuators are failed during SBW operating mode in which clutch devices 3A and 3B are disengaged, the first and second steering controllers 19A and 19B operate to continuously execute the SBW operating mode by means of the normally-operating steering actuators except the failed actuators, until predetermined neutral positions of left and right racks 6L and 6R are reached. And then, immediately when the predetermined rack neutral positions has been reached, the first and second steering controllers 19A and 19B switches to the back-up operating mode (or the fail-safe operating mode) by engaging clutch devices 3A and 3B. Thus, it is possible to prevent undesirable toe-angle-changes of left and right steered wheels 16L and 16R from occurring near the predetermined rack neutral positions, by inhibiting mode-switching from the SBW operating mode to the back-up operating mode until the predetermined rack neutral positions are reached.

Figure 27:
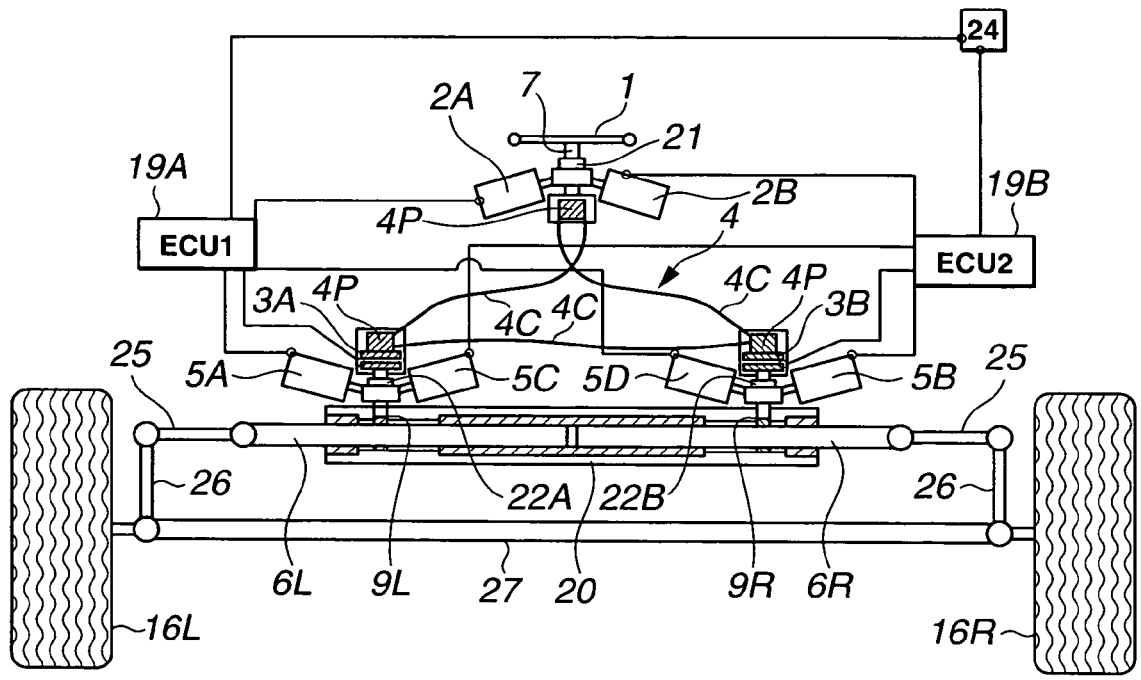

Referring now to FIG. 27, there is shown the thirteenth modification of the SBW vehicle steering apparatus. As described later, the steering apparatus of the thirteenth modification of FIG. 27 can continuously execute the actuator control in accordance with the SBW operating mode even when either one of the first and second steering controllers is failed or either one of steering-actuator driving circuits of the first and second steering controllers is failed under a condition where the SBW vehicle steering apparatus is operating in the SBW operating mode with clutch devices 3A and 3B disengaged. As shown in FIG. 27, the steering apparatus of the thirteenth modification of FIG. 27 uses the dual actuator control system including the first and second steering controllers 19A and 19B, and also uses a so-called diagonal-split layout of command-signal circuits or driving-signal circuits of the first and second steering controllers 19A and 19B, in other words, an X-split layout. The first steering controller 19A is assigned to control the first steering actuator 5A attached to left pinion shaft 9L to drive left rack 6L and the fourth steering actuator 5D attached to right pinion shaft 9R to drive right rack 6R. On the other hand, the second steering controller 19B is assigned to control the second steering actuator 5B attached to right pinion shaft 9R to drive right rack 6R and the third steering actuator 5C attached to left pinion shaft 9L to drive left rack 6L. The other structure of the thirteenth modification of FIG.

27 is identical to that of the twelfth modification of FIG. 26. The steering apparatus of the thirteenth modification of FIG. 27 operates as follows.

The dual actuator control system of the SBW vehicle steering apparatus of the thirteenth modification of FIG. 27, uses a diagonal-split layout (X-split layout) of command-signal circuits or driving signal circuits of the first and second steering controllers 19A and 19B, in which the output interface of the first steering controller 19A is connected via a steering-actuator driving circuit to the first steering actuator 5A attached to left pinion shaft 9L and also connected via a steering-actuator driving circuit to the fourth steering actuator 5D attached to right pinion shaft 9R, and the output interface of the second steering controller 19B is connected via a steering-actuator driving circuit to the second steering actuator 5B attached to right pinion shaft 9R and also connected via a steering-actuator driving circuit to the third steering actuator 5C attached to left pinion shaft 9L. For the purpose of simplification of the disclosure, the driving circuits are omitted. By the use of such a diagonal-split layout (X-split layout) of command-signal circuits of the first and second steering controllers 19A and 19B, even when either one of the first and second steering controllers is failed or either one of steering-actuator driving circuits of the first and second steering controllers is failed during the SBW operating mode with clutch devices 3A and 3B disengaged, it is unnecessary to rapidly engage clutch devices 3A and 3B immediately when the SBW system failure occurs, thus enabling subsequent executions of the SBW operating mode (the actuator control) in which the steering input section (steering wheel 1) is mechanically separated from the steering output section (containing the two-split, left and right racks 6L and 6R).

The SBW vehicle steering apparatus of the thirteenth modification of FIG. 27 has the following effect (20) in addition to the effects (13)-(16) obtained by the steering apparatus of the ninth modification of FIG. 19.

(20) The dual actuator control system of the SBW vehicle steering apparatus uses a diagonal-split layout (X-split layout) of command-signal circuits of the first and second steering controllers 19A and 19B, in which the first steering controller 19A is connected to the first steering actuator 5A attached to left pinion shaft 9L and the fourth steering actuator SD attached to right pinion shaft 9R, and the second steering controller 19B is connected to the second steering actuator 5B attached to right pinion shaft 9R and the third steering actuator SC attached to left pinion shaft 9L. Even when either one of the first and second steering controllers is failed or either one of steering-actuator driving circuits of the first and second steering controllers is failed during the SBW operating mode with clutch devices 3A and 3B disengaged, it is possible to continuously execute the actuator control (the SBW operating mode) in which the steering input section (steering wheel 1) is mechanically separated from the steering output section (containing the two-split, left and right racks 6L and 6R).

Figure 28:
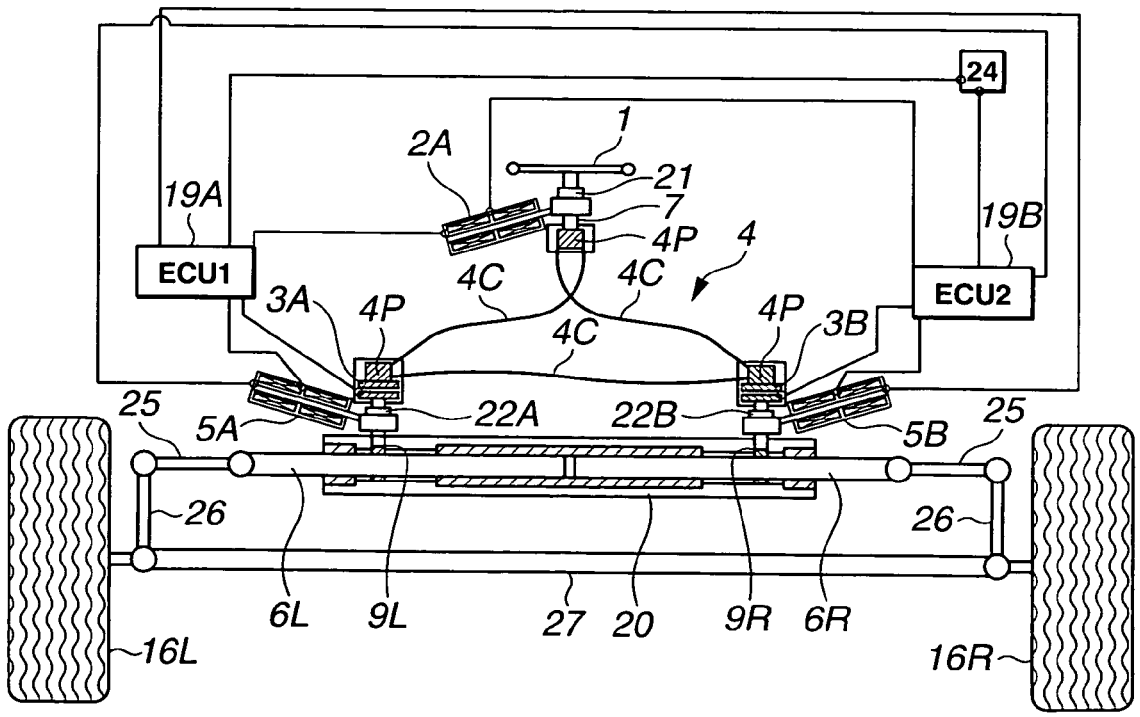

Referring now to FIG. 28, there is shown the fourteenth modification of the SBW vehicle steering apparatus. As described later, the steering apparatus of the fourteenth modification of FIG. 28 uses a steering actuator unit appearing to be a sole steering actuator in appearance but providing a dual steering actuator function. As shown in FIG. 28, each of the first and second steering actuator units 5A and 5B, attached to the respective pinion shafts 9L and 9R, is comprised of a one-rotor two-stator motor that a single rotor can be driven by two stators. As can be seen from the system diagram of FIG. 28, the steering apparatus of the fourteenth modification of FIG. 28 uses a feedback actuator unit appearing to be a sole feedback actuator in appearance but providing a dual feedback actuator function. That is, the feedback actuator unit 2A, attached to column shaft 7, is also comprised of a one-rotor two-stator motor that a single rotor can be driven by two stators. The other structure of the fourteenth modification of FIG. 28 is identical to that of the ninth modification of FIG. 19. The steering apparatus of the fourteenth modification of FIG. 28 operates as follows.

In the steering apparatus of the fourteenth modification of FIG. 28, as a steering actuator and as a feedback actuator, a one-rotor two-stator motor is used. In comparison with two one-rotor one-stator motors each having a rotor driven by a single stator, the one-rotor two-stator motor capable of providing a dual actuator function is simple in construction and is superior in the reduced number of motor parts, reduced number of component parts interconnecting the motor shaft and pinion shaft 9, reduced total manufacturing costs of steering systems, and inexpensive dual actuator system of reduced motor-torque loss.

The SBW vehicle steering apparatus of the fourteenth modification of FIG. 28 has the following effect (21) in addition to the effects (13)-(16) obtained by the steering apparatus of the ninth modification of FIG. 19.

(21) As a dual steering actuator system for each of left and right pinion shafts 9L and 9R, a one-rotor two-stator motor is used, thus realizing a simple, inexpensive, lightweight, and downsized dual actuator system of reduced motor-torque loss.

Figure 29:
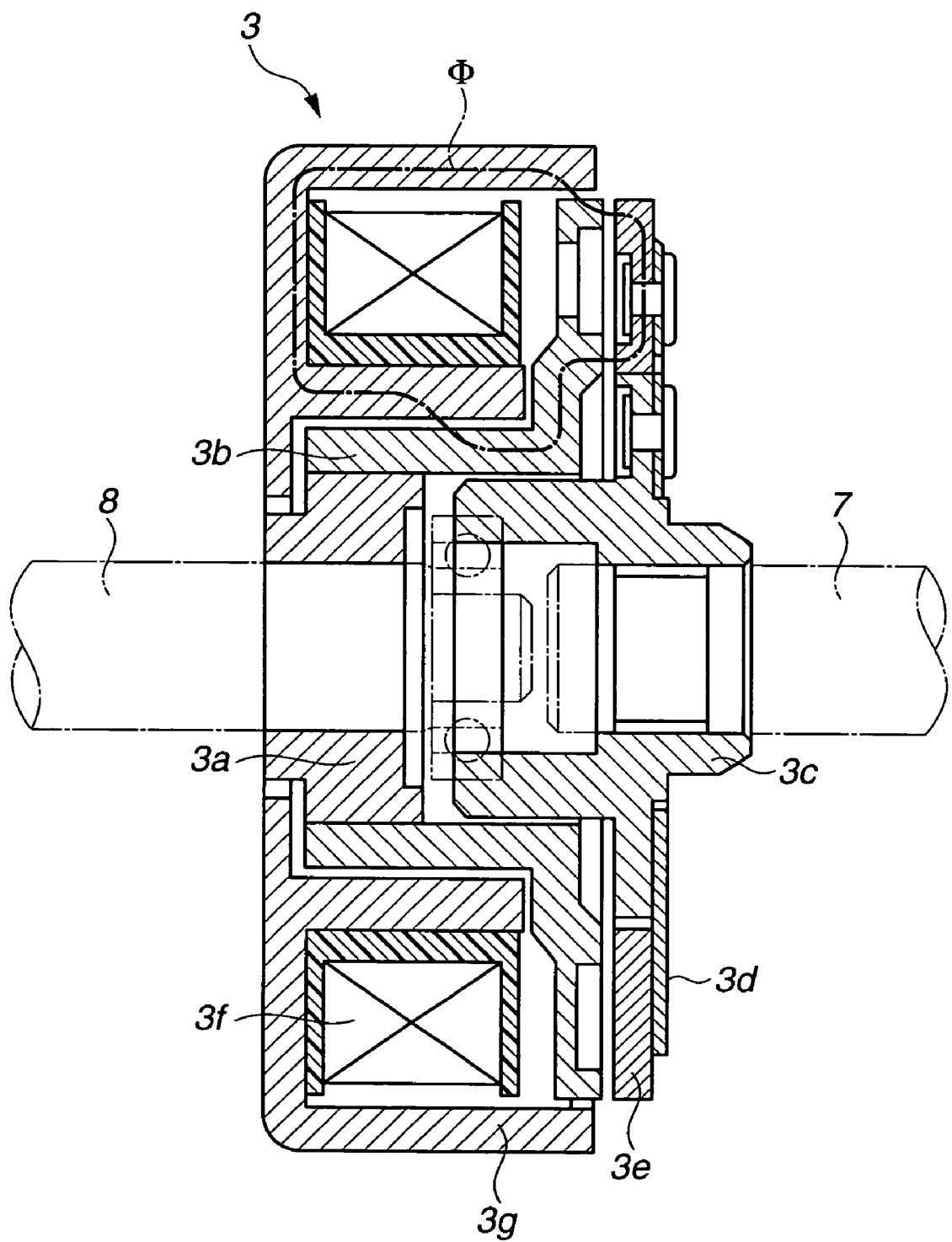
FIG. 29 is a longitudinal cross-sectional view showing an electromagnetic clutch, which is applicable as a clutch device needed to engage or disengage a back-up function of a back-up system.

Referring now to FIG. 29, there is shown the detailed structure of an electromagnetic clutch, which is applicable as a friction clutch of clutch device 3 needed to engage (enable) or disengage (disable) a back-up function of cable back-up mechanism 4 of each of the SBW vehicle steering apparatus of the embodiment shown in FIG. 1, and the modifications shown in FIGS. 5, 7, 14-18. As clearly shown in FIG. 29, the electromagnetic clutch constructing the friction clutch device functions to transmit steering torque by way of friction torque. Returning to FIGS. 1, 7, 14-18, the sole friction clutch device 3 (or the first friction clutch 3) is provided between the steering input section (steering wheel 1) and cable back-up mechanism 4, exactly disposed between the first and second column shafts 7 and 8. Note that a limitation transmitted torque or a critical transmitted torque, above which the friction clutch device starts to slip in a clutch engaged state, is set to be lower than a predetermined yield torque at which a yield point of cable back-up mechanism 4 is reached. The friction clutch device, comprised of the electromagnetic clutch, is kept in its engagement state under a condition where the ignition switch is turned OFF. When the ignition switch is turned ON, the clutch control section of the processor of steering controller 19 generates a command signal to the electromagnetic clutch to disengage the same. Thereafter, while the processor determines that the SBW vehicle steering system is operating normally, the clutch control section keeps the electromagnetic clutch disengaged. In contrast to the above, in presence of an SBW system failure, the clutch control section operates to engage the electromagnetic clutch so as to switch from the SBW operating mode to the back-up operating mode.

As can be seen from the longitudinal cross section of FIG. 29 showing the electromagnetic clutch, which is applicable as a friction clutch of clutch device 3, electromagnetic clutch 3 is comprised of a boss 3*a*, a flanged rotor 3*b*, a flanged armature hub 3*c*, a substantially annular-shaped leaf spring or a substantially annular-shaped disk spring 3*d*, an armature 3*e*, an electromagnetic coil 3*f*, and a yoke 3*g*, Boss 3*a* is fixedly connected to the second column shaft 8. Flanged rotor 3*b* is fitted to the outer periphery of boss 3*a* and mounted on the second column shaft 8 via boss 3*a*. Flanged armature hub 3*c* is coaxially arranged with respect to the axis of flanged rotor 3*b* (in other words, the axis of the second column shaft 8) and splined to the first column shaft 7. Substantially annular-shaped leaf spring 3*d* is riveted or pin-connected at its inner peripheral base portion to the flanged portion of armature hub 3*c*. Substantially annular-shaped leaf spring 3*d* has a plurality of bridged portions radially-outward extending from the leaf-spring inner peripheral base portion. Armature 3*e* is fixedly connected to the flanged portion of armature hub 3*c* via leaf spring 3*d*, and laid out outside of the outer periphery of the flanged portion of armature hub 3*c*. Actually, armature 3*e* is riveted or pin-connected to the free end of the outer periphery of leaf spring 3*d*, Electromagnetic coil 3*f* is arranged on the outer circumference of rotor 3*b*. Yoke 3*g* is provided to accommodate electromagnetic coil 3*f* and supported by a column housing or a yoke mounting holder (not shown). The left-hand side wall surface of armature 5*e* and the attraction surface (the right-hand side wall surface) of the flanged portion of rotor 3*b* are arranged to be opposed to each other. With the previously-discussed arrangement of the electromagnetic clutch, when an exciting current is applied to electromagnetic coil 3*f*, a magnetic flux $\Phi$ is produced. By way of the attraction force arising from magnetic flux $\Phi$ produced, armature 5*e* is attracted against the spring bias of leaf spring 3*d* toward the attraction surface (the right-hand side wall surface) of the flanged portion of rotor 3*b*, and thus the left-hand side wall surface of armature 5*e* is brought into contact with the attraction surface (the right-hand side wall surface) of flanged rotor 3*b*. Under the attracted condition, the first and second column shafts (clutch input and output shafts) 7 and 8 are coupled with each other to permit torque transmission. Conversely when there is no application of exciting current to electromagnetic coil 3*f* and thus there is no magnetic flux $\Phi$ produced, armature 5*e* is spaced apart from the attraction surface (the right-hand side wall surface) of the flanged portion of rotor 3*b* by the spring bias of leaf spring 3*d*. As is generally known, the transmitted torque capacity of the electromagnetic clutch is arbitrarily easily settable to a desired suitable torque capacity by varying or adjusting the magnitude of magnetic flux D produced by electromagnetic coil 3*f*, in other words, the magnitude of attraction force.

Figure 30:
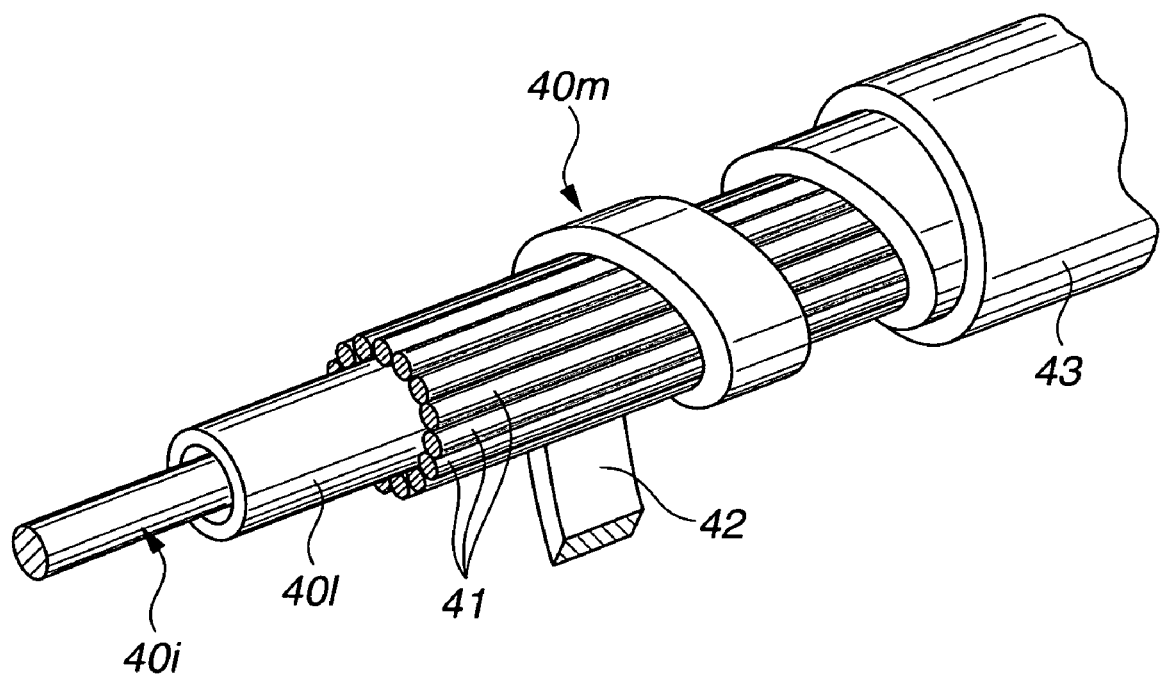
FIG. 30 is a perspective view showing the detailed structure of a Bowden cable, which is applicable to a cable back-up mechanism.

Referring now to FIG. 30, there is shown the detailed structure of the Bowden cable (4*c*, 4*d*, 4*d*, 4C). As clearly shown in FIG. 30, the Bowden cable is mainly comprised of an inner cable 40*i* and an outer tube 40*m*. Outer tube 40*m* is comprised of a liner 401, a plurality of metal wires 41, a strip-shaped or band-shaped or ribbon-shaped metal material 42, and a tubular coating or covering material 43. Liner 401 has annular in cross section and is made of a low-friction, synthetic-resin pipe material. Metal wires 41 are equidistant-arranged in the circumferential direction of liner 401 and installed on the outer peripheral wall surface of liner 401, and in contact with each other such that the outer peripheries of the two adjacent metal wires are in line-contact with each other in their longitudinal directions. Ribbon-shaped metal material 42 is helically wound on the outer periphery of the substantially cylindrical metal wire array constructed by the plural metal wires 41 with a predetermined tightening torque. Tubular covering material 43 is provided to cover the outer periphery of the helically-wound ribbon-shaped metal material 42. On the other hand, inner cable 40*i* is slidably inserted into or slidably disposed in the liner 401 of outer tube 40*m*. Although it is not clearly shown in FIG. 30, inner cable 40*i* is formed of a stranded wire cable made of stranded wires, such as stranded stainless-steel wires or stranded aluminum wires. As can be appreciated from the above, the plurality of metal wires 41, constructing part of the outer tube, act to support and withstand a tensile load acting in the axial direction or the longitudinal direction of the outer tube, thus effectively preventing an undesirable extensional deformation of the outer tube from occurring. The helically-wound ribbon-shaped metal material 42 serves to effectively suppress the circumferentially-equidistant arranged metal wires 41 from becoming apart from each other, under a condition where inner cable 40*i* has been laid out in a curved state of inner cable 40*i*. Additionally, helically winding ribbon-shaped metal material 42 on the outer periphery of the substantially cylindrical metal wire array constructed by metal wires 41 with the predetermined tightening torque, permits proper curvature movement of the outer tube, that is, the proper flexibility of the outer tube.

As discussed above, in the SBW vehicle steering apparatus of the shown embodiment, a limitation transmitted torque or a critical transmitted torque, above which clutch device 3 starts to slip under the clutch engaged state and thus an undesirable slippage of clutch device 3 begins to develop, is set to be lower-than a predetermined yield torque at which a yield point of cable back-up mechanism 4 is reached. In other words, a predetermined transmitted torque capacity of clutch device 3 is set to be lower than a lower one of an axial yielding point (or a proof stress or an axial yield strength) of inner cable 40*i* and an axial yielding point (or a proof stress or an axial yield strength) of outer tube 40*m*. Hereunder described are the merits of the SBW vehicle steering apparatus of the shown embodiment employing clutch device 3 having the previously-noted predetermined torque capacity and provided between the steering input section (steering wheel 1) and cable back-up mechanism 4, and the demerits of the SBW vehicle steering apparatus employing clutch device 3 provided between the steering output section (the rack-and-pinion gear) and cable back-up mechanism 4.

As is generally known, the maximum cable stroke of cable back-up mechanism 4 is finite. In case of the SBW vehicle steering apparatus employing clutch device 3 provided between the steering output section (the rack-and-pinion gear) and cable back-up mechanism 4, assuming that undesired clutch slipping occurs owing to excessively transmitted torque (excessive external force) in presence of rotary movement of steering wheel 1 after clutch device 3 has been engaged to initiate the back-up operating mode, there is a tendency for the steer angle in one of steered directions to decrease undesirably due to the finite cable stroke of cable back-up mechanism 4 and clutch slipping. In other words, in presence of clutch slippage between the steering output section and cable back-up mechanism 4, there is a lack of the cable stroke of cable back-up mechanism 4 with respect to the steering rack stroke correlated with the steer angle. Thus, it is impossible to give a satisfactory steer angle in the one steered direction owing to clutch slipping. To avoid this, the maximum cable stroke of cable back-up mechanism 4 must be set to a comparatively longer cable stroke, taking into account an additional cable stroke enough to absorb a clutch slippage occurring excessive steering input. In order to realize such a comparatively longer cable stroke, the transmitted torque capacity of clutch device 3 must be set to a comparatively high level. This leads to another problem of large-sized clutch device 3. Additionally, increasing the transmitted torque capacity, that is, increasing the critical transmitted torque means the deteriorated durability of the Bowden cable of cable-back-up mechanism 4. In the installation design of clutch device 3 provided between the steering output section and cable back-up mechanism 4 (see FIG. 19), irrespective of whether clutch device 3 is engaged or disengaged, the cables and pulleys of cable back-up mechanism 4 are always moved and dragged in synchronism with rotary motion of steering wheel 1. In such a case, there is an increased tendency for the inner cable 40i and outer tube 40m in sliding-contact with each other, to undesirably wear rapidly, thus remarkably deteriorating the durability of cable back-up mechanism 4. Additionally, during the continuous winding-up and winding-off operations in synchronism with rotation of steering wheel 1, friction between inner cable 40i and outer tube 40m means friction resistance to any movement of the steering wheel, that is, increased steering effort, thus deteriorating a steering feel.

In contrast, in case of the SBW vehicle steering apparatus of the shown embodiment employing clutch device 3 having the previously-noted predetermined torque capacity and provided between the steering input section (steering wheel 1) and cable back-up mechanism 4 (see FIG. 1), even in presence of clutch slippage between the steering input section (steering wheel 1) and cable back-up mechanism 4, the proper relative phase between the steering output section (the rack-and-pinion gear) and cable back-up mechanism 4 can be maintained and thus there is no lack of the cable stroke of cable back-up mechanism 4 with respect to the steering rack stroke correlated with the steer angle. The installation design of clutch device 3 provided between the steering input section (steering wheel 1) and cable back-up mechanism 4 eliminates the problem of a lack in steer angle of each steered wheel, occurring due to clutch slipping.

During application of a tensile load to inner cable 40i, outer tube 40m tends to be subjected to a compressive load. Conversely during application of a compressive load to inner cable 40i, outer tube 40m tends to be subjected to a tensile load. As appreciated, under a condition where the Bowden cable is curvedly arranged or laid out, a tensile load is exerted on the outer curved portion of outer tube 40m, while a compressive load is exerted on the inner curved portion of outer tube 40m. In presence of simultaneous application of two sorts of tensile loads discussed above or in presence of simultaneous application of two sorts of compressive loads discussed above, there is a tendency for ribbon-shaped metal material 42 to be greatly deformed and stressed. Such a great deformation of ribbon-shaped metal material 42 causes a rapidly curved or rapidly bent or undesirably kinked portion of outer tube 40m, thereby preventing or inhibiting smooth sliding motion of inner cable 40i in liner 401 of the outer tube.

As discussed above, in case of the SBW vehicle steering apparatus of the shown embodiment employing clutch device 3 having the previously-noted predetermined torque capacity and provided between the steering input section (steering wheel 1) and cable back-up mechanism 4 (see FIG. 1), the predetermined transmitted torque capacity of clutch device 3 is set to be lower than a lower one of an axial yielding point (a proof stress) of inner cable 40i and an axial yielding point (a proof stress) of outer tube 40m. By virtue of setting of the predetermined transmitted torque capacity of clutch device 3 lower than the lower one of the axial yielding point of inner cable 40i and the axial yielding point of outer tube 40m, it is possible to avoid a permanent deformation of inner cable 40i from being generated during the back-up operating mode with clutch device 3 engaged, thus insuring smooth sliding motion of inner cable 40i in the outer-tube liner. Additionally, in case of the installation design of clutch device 3 provided between the steering input section (steering wheel 1) and cable back-up mechanism 4, during the SBW operating mode with clutch device 3 disengaged, it is possible to prevent the cables and pulleys of cable back-up mechanism 4 from being moved and dragged in synchronism with rotary motion of steering wheel 1, thereby avoiding the durability of cable back-up mechanism 4 from being deteriorated and also avoiding the driver's steering feel from being deteriorated owing to friction drag or frictional resistance between the outer tube 40m and inner cable 40i of the Bowden cable.

Returning to FIG. 5, there is shown the dual clutch arrangement concerning two clutch devices 3, 3 both needed to engage or disengage a back-up function of cable back-up mechanism 4 of the SBW vehicle steering apparatus. As shown in FIG. 5, the first clutch device 3 is provided between the steering input section (steering wheel 1) and cable back-up mechanism 4, exactly disposed between the first and second column shafts 7 and 8. On the other hand, the second clutch device 3 is provided between the steering output section (the rack-and-pinion mechanisms respectively linked to the steered wheels) and cable back-up mechanism 4. Note that, in the previously-noted dual clutch arrangement (3, 3) shown in FIG. 5, a first limitation transmitted torque, above which the first friction clutch device starts to slip in a clutch engaged state in which the first and second friction clutch devices 3, 3 are both engaged, is set to be lower than a second limitation transmitted torque, above which the second friction clutch device starts to slip in the clutch engaged state. More concretely, a predetermined transmitted torque capacity of the second friction clutch device is set to be higher than the summed value of a predetermined transmitted torque capacity of the first friction clutch device and a torque value corresponding to frictional resistance between inner cable 40i and outer tube 40m of the Bowden cable of cable back-up mechanism 4. Additionally, the predetermined transmitted torque capacity of the first friction clutch device is set to be lower than a lower one of an axial yielding point (or a proof stress or an axial yield strength) of inner cable 40i and an axial yielding point (or a proof stress or an axial yield strength) of outer tube 40m. The construction of the second friction clutch device, provided between the steering output section (the rack-and-pinion mechanisms respectively linked to the steered wheels) and cable back-up mechanism 4, is exactly the same as that described for the first friction clutch device 3, provided between the steering input section (steering wheel 1) and cable back-up mechanism 4. The previously-discussed dual clutch arrangement (see FIG. 5) has the following merits.

In presence of application of excessively transmitted torque (excessive external force) to the steering system during the back-up operating mode with the first and second friction clutch devices 3, 3 both engaged, the first friction clutch device starts to slip before the second friction clutch device starts to slip, because of setting of the first limitation transmitted torque of the first friction clutch device lower than the second limitation transmitted torque of the second friction clutch device. Such setting of the first limitation transmitted torque lower than the second limitation transmitted torque functions to prevent clutch slippage of the second friction clutch device provided between the steering output section and cable back-up mechanism 4 during the back-up operating mode. Thus, even in presence of clutch slippage of the first friction clutch device, the proper relative phase between the steering output section (the rack-and-pinion gear) and cable back-up mechanism 4 can be maintained and thus there is no lack of the cable stroke of cable back-up mechanism 4 with respect to the steering rack stroke correlated with the steer angle. Conversely during the SBW operating mode with the first and second friction clutch devices disengaged, cable back-up mechanism 4 is mechanically completely separated from both of the steering input section (steering wheel 1) and the steering output section (the rack-and-pinion mechanisms linked to the respective steered wheels), and thus kept stationary. Therefore, during the SBW operating mode, it is possible to certainly effectively prevent the cables and pulleys of cable back-up mechanism 4 from being moved and dragged in synchronism with movement of at least one of the steering input and output sections, thus enhancing the durability of cable back-up mechanism 4.

Figure 31A:
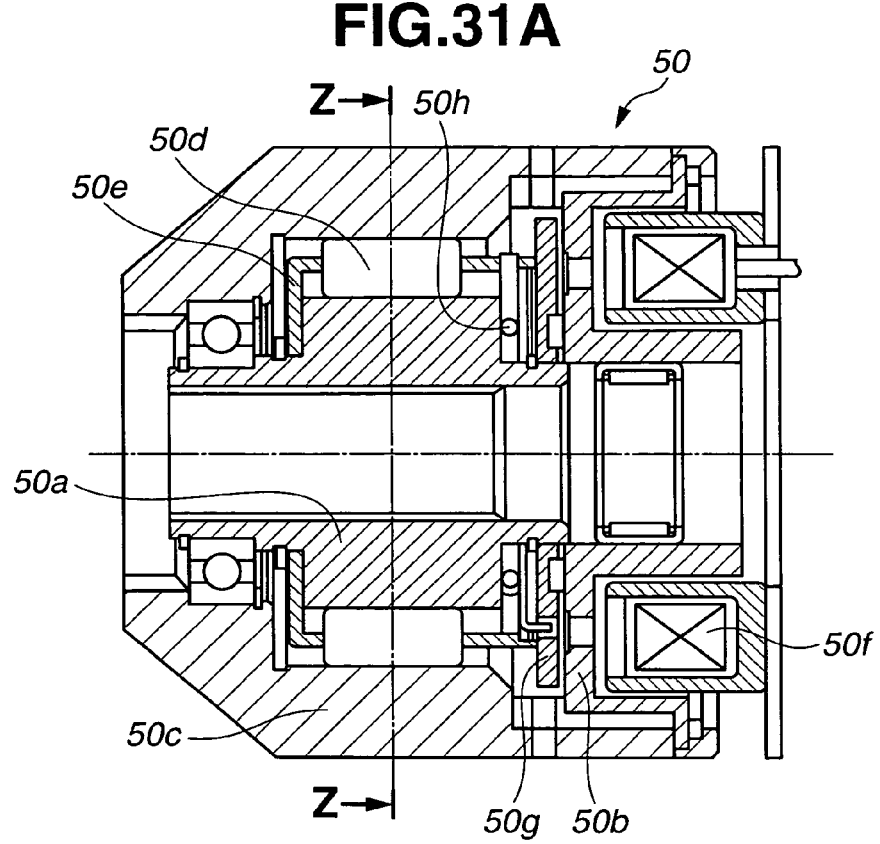
FIG. 31A is a longitudinal cross-sectional view showing an electromagnetic mechanical clutch, which is applicable as a clutch device needed to engage or disengage a back-up function of a back-up system.
Figure 31B:
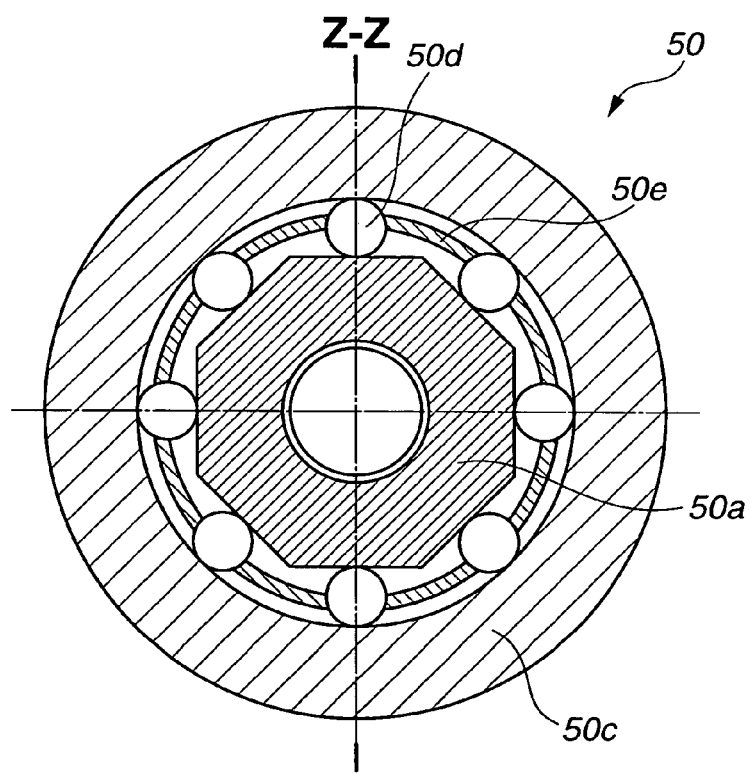
FIG. 31B is a lateral cross section of the electromagnetic mechanical clutch, taken along the lines Z-Z of FIG. 31A.

Referring now to FIGS. 31A and 31B, there is shown the detailed structure of an electromagnetic mechanical clutch 50 applicable as a friction clutch of clutch device 3 instead of using the electromagnetic clutch shown in FIG. 29. As shown in FIGS. 31A-31B, the electromagnetic mechanical clutch 50, constructing the friction clutch device, is a combined clutch unit of an electromagnet and a two-way roller clutch. In such an electromagnetic mechanical clutch 50, it is possible to easily switch between a roller-clutch driving state (a roller-clutch power-transmission state or a roller-clutch interlock state) and a roller-clutch free-rotation state, by way of ON-OFF control for an exciting current applied to the electromagnet. As clearly shown in FIG. 31A, electromagnetic mechanical clutch 50 is comprised of an inner race 50a, a rotor 50b, an outer race 50c, a plurality of rollers 50d, a cage 50e, an electromagnetic coil 50f, an armature 50g, and a switch spring 50h. Inner race 50a is splined to a clutch output shaft (the second column shaft 8) and has a polygonal outer peripheral wall surface (an octagonal outer peripheral wall surface). Rotor 50b is coaxially arranged with respect to the axis of inner race 50a and fixedly connected to a clutch input shaft (the first column shaft 7). Outer race 50c is arranged to cover the outer periphery of inner race 50a, and has a substantially cylindrical inner peripheral wall surface, and is engageable with rotor 50b. Rollers 50d are interleaved between inner and outer races 50a and 50c. Cage 50e retains rollers 50d while permitting rotation of each roller 50d about its rotation axis, so that rollers 50d are circumferentially equidistant-spaced from each other at regular intervals. Electromagnetic coil 50f is accommodated in an annular space of rotor 50b. Armature 50g and rotor 50b are axially opposed to each other. Switch spring 50h is interleaved between armature 50g and cage 50e. With the previously-discussed arrangement of electromagnetic mechanical clutch 50, when an exciting current is applied to electromagnetic coil 50f, armature 50g is brought into contact with the attraction surface of rotor 50b and thus cage 50e is constrained, and as a result electromagnetic mechanical clutch 50 is switched from the roller-clutch free-rotation state to the roller-clutch driving state (the roller-clutch interlock state) so as to permit power transmission from the clutch input shaft to the clutch output shaft and vice versa. In presence of a transition from the exciting-current application state to a state that there is no application of an exciting current to electromagnetic coil 50f, during power transmission (during torque transmission), armature 50g is brought out of contact with the attraction surface of rotor 50b and thus cage 50e is unconstrained, and as a result electromagnetic mechanical clutch 50 is naturally switched to the roller-clutch free-rotation state at a time when there is a less torque transmitted via the mechanical clutch. In this manner, switching between the roller-clutch driving state (the roller-clutch interlock state) and the roller-clutch free-rotation state is very smooth. In comparison with the same-sized electromagnetic clutch, the electromagnetic mechanical clutch has a relatively high transmitted torque capacity. That is, by the use of the electromagnetic mechanical clutch, it is possible to compactly design the friction clutch device, while ensuring a required torque capacity. As discussed above, in the shown embodiment, either the electromagnetic clutch or the electromagnetic mechanical clutch is used as a friction clutch of clutch device 3 needed to enable or disable a back-up function of cable back-up mechanism 4. In lieu thereof, another type of clutches may be used as clutch device 3 needed to enable or disable a back-up function of cable back-up mechanism 4. For instance, a dog clutch may be used as clutch device 3.

Referring now to FIGS. 32, 39, and 44-46, there are shown still further modifications each employing the SBW system, the cable back-up mechanism, the dual actuator system, the dual sensor system, and the dual controller system. For the purpose of simplification of the disclosure, the cable back-up mechanism equipped SBW vehicle steering apparatus of each of the modifications of FIGS. 32, 39, and 44-46 is exemplified in a single rack arrangement comprised of a constant-pitch, sole rigid steering rack shaft. In lieu thereof, the cable back-up mechanism equipped SBW vehicle steering apparatus of each of the modifications of FIGS. 32, 39, and 44-46 can be applied to and combined with the two-split variable-pitch rack-and-pinion arrangement (serving as the steer angle converter). Also, for the purpose of simplification of the disclosure, the cable back-up mechanism equipped SBW vehicle steering apparatus of each of the modifications of FIGS. 32, 39, and 44-46 uses a dual actuator system, a dual sensor system, and a dual controller system for fail-safe purposes. In lieu thereof, in order to highly enhance the fail-safe performance, the cable back-up mechanism equipped SBW vehicle steering apparatus of each of the modifications of FIGS. 32, 39, and 44-46 may use a multiple actuator system further high-graded from the dual actuator system, a multiple sensor system further high-graded from the dual sensor system, and a multiple controller system further high-graded from the dual controller system. The basic construction of the steering apparatus of each of the modifications of FIGS. 32, 39, and 44-46 is similar to that of each of the modifications of FIGS. 19, 22, and 25-28. In explaining the steering apparatus of each of the modifications of FIGS. 32, 39, and 44-46, for the purpose of simplification of the disclosure, the same reference signs used to designate elements in the modifications FIGS. 19, 22, and 25-28 will be applied to the corresponding elements used in the steering apparatus of each of the modifications of FIGS. 32, 39, and 44-46, while detailed description of the same reference signs will be omitted because the above description thereon seems to be self-explanatory.

Figure 32:
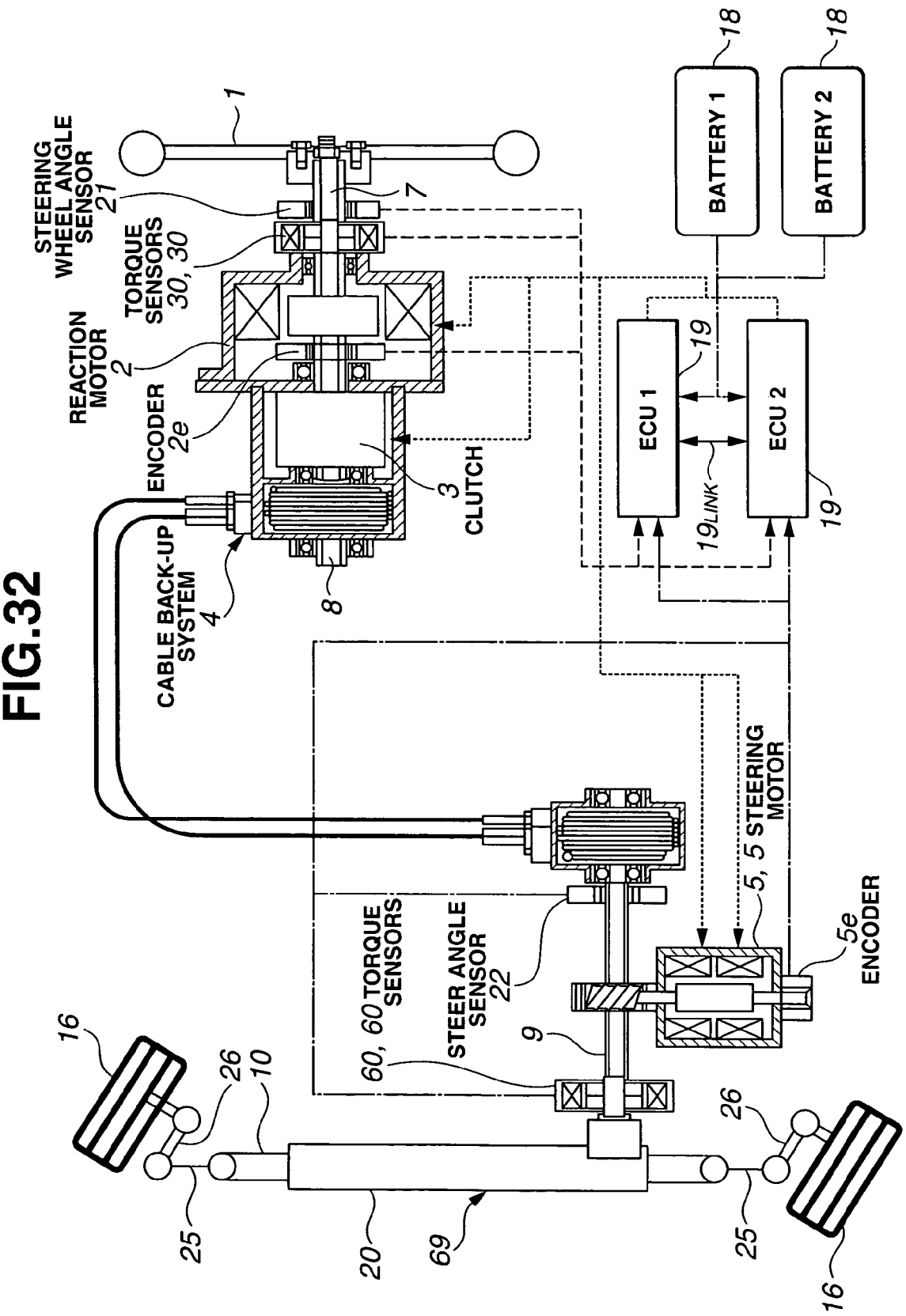
FIG. 32 is a detailed system diagram illustrating another modification of an SBW vehicle steering apparatus having a cable back-up mechanism, a dual actuator system, a dual sensor system, and a dual controller system.

As hereunder described in detail, the SBW vehicle steering apparatus of the fifteenth modification shown in FIG. 32 has the dual torque sensor system (30, 30; 60, 60), the dual actuator system (5, 5), and the dual controller system (19, 19). As shown in FIG. 32, the SBW vehicle steering apparatus of the fifteenth modification is comprised of a reaction control system, a back-up system, a steering output system, and a steering control unit (a steering controller). The reaction control system is comprised of steering wheel angle sensor (handle angle sensor) 21, an encoder 2e, a pair of torque sensors 30, 30, a Hall IC 2h, and feedback actuator 2 (a reaction motor). Steering wheel angle sensor (handle angle sensor) 21 is attached to the first column shaft 7, which connects cable back-up mechanism 4 to steering wheel 1. As clearly shown in FIG. 32, steering wheel angle sensor 21 is disposed between steering wheel 1 and the torque sensor pair (30, 30), in such a manner as to be able to detect the steering wheel angle (the handle angle) corresponding to the steering wheel movement without being affected by a torsion angle of a torsion bar TB constructing part of the dual torque sensor system (30, 30). In the steering apparatus of FIG. 32, an absolute-valued angular resolver (simply, an absolute resolver) is used as steering wheel angle sensor 21. The SBW vehicle steering apparatus of the fifteenth modification of FIG. 32 uses the dual torque sensor system for the reaction control system or the steering input system or the steering input section. The torque sensor pair (30, 30) is provided between steering wheel angle sensor 21 and feedback actuator (reaction motor) 2, for detecting a steering input torque applied to steering wheel 1. The dual torque sensor system is constructed by the first torque sensor 30A and the second torque sensor 30B.

Figure 33:
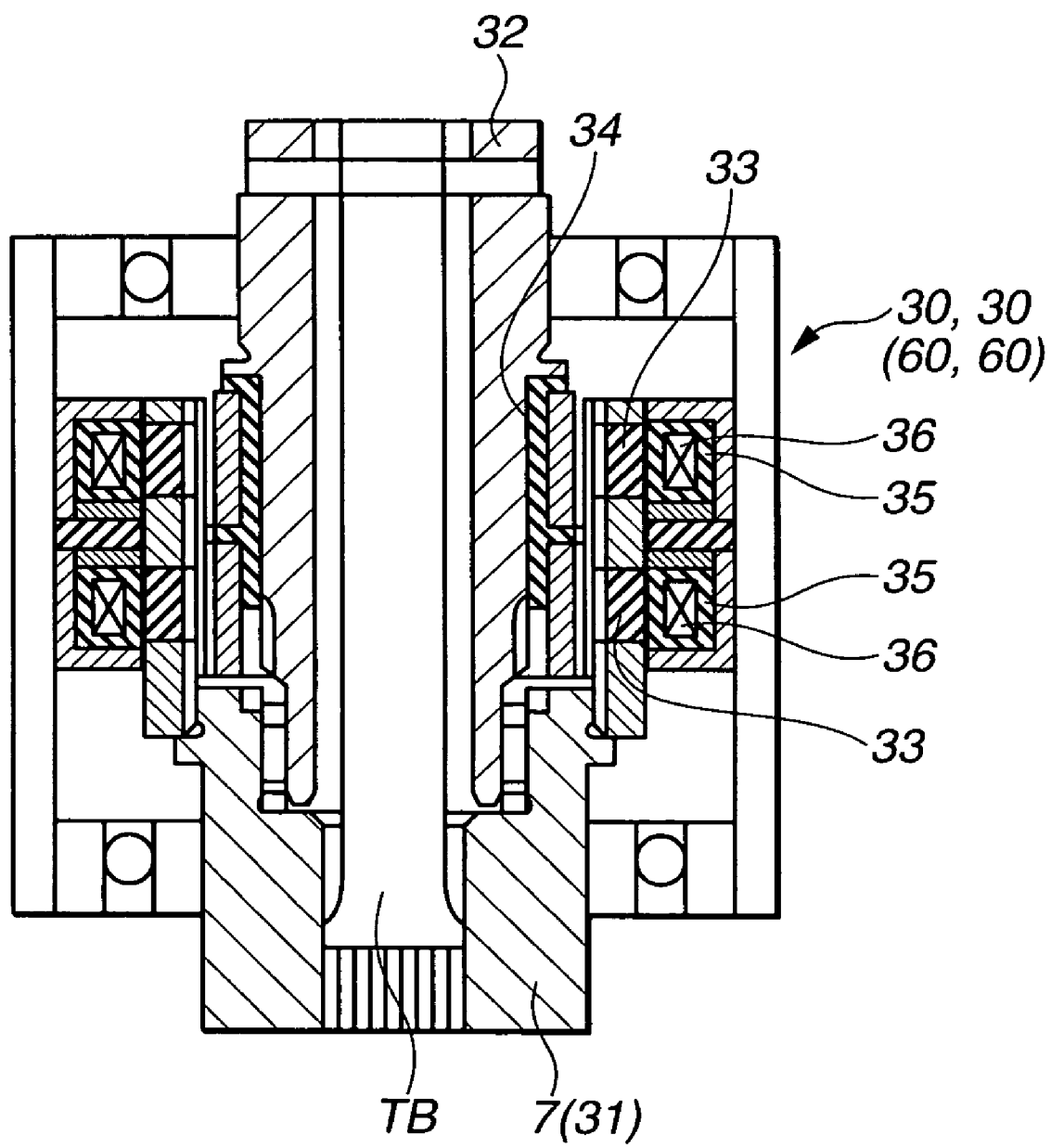
FIG. 33 is a longitudinal cross-sectional view showing a dual torque sensor system.

Referring now to FIG. 33, there is shown the longitudinal cross section of the dual torque sensor system (30, 30). As seen from the cross section of FIG. 33, the dual torque sensor system (30, 30) is comprised of the axially-extending torsion bar TB, a first shaft portion 31 (corresponding to the first column shaft 7), a second shaft portion 32, a first magnetic body 33, a second magnetic body 34, a third magnetic body 35, and an electromagnetic coil 36. The first shaft portion 31 (first column shaft 7) connected to one end of the torsion bar and coaxially arranged with respect to the axis of the torsion bar. The second shaft portion 32 is connected to the other end of the torsion bar and coaxially arranged with respect to the axis of the torsion bar. The first magnetic body 33 is fixedly connected to the first shaft portion 31 and split into two magnetic body portions 33, 33. The second magnetic body 34 is fixedly connected onto the outer periphery of the second shaft portion 32. Magnetic coil 36 is comprised of first and second coil portions (36, 36), and arranged outside of the first magnetic body portions 33, 33 such that the first and second coil portions (36, 36) are opposed to the respective first magnetic body portions 33, 33 and also opposed to the second magnetic body 34. The third magnetic body 35 is split into two magnetic body portions 35, 35, each covering or enclosing the associated one of the first and second coil portions (36, 36). The first, second, and third magnetic bodies 33, 34, and 35, and magnetic coil 36 cooperate with each other to provide a magnetic circuit. In presence of torque application to the torsion bar, a relative displacement between the first and second magnetic bodies 33 and 34 takes place, and thus a change in inductance in the magnetic circuit occurs. As a result, it is possible to detect the applied torque by an output signal based on the inductance change.

The reaction motor serves as feedback actuator 2 (reaction force actuator) that functions to apply a feedback torque or a steering reaction torque to steering wheel 1 during the SBW operating mode (during the SBW control). In the steering apparatus of FIG. 32, the reaction motor is comprised of a one-rotor one-stator motor whose rotation shaft is the first column shaft 7. The motor casing of reaction motor 2 is fixedly connected to and mounted on the vehicle body. Actually, a brushless motor is used as the reaction motor. As a result of the use of such a brushless motor, encoder 2e and Hall IC 2h are both added. It is possible to produce a motor torque by means of only the Hall IC 2h, but there is an increased tendency of very-small torque fluctuations in motor torque produced by only the Hall IC 2h, thereby deteriorating a steering feel in the feedback through steering wheel 1. In order to effectively reduce undesired very small fluctuations in motor torque produced by only the Hall IC 2h and thus to achieve fine and smooth high-precision reaction control and thus to provide the driver with a suitable natural steering feel in the feedback through steering wheel 1, encoder 2e is further attached to the first column shaft 7. In the steering apparatus of FIG. 32, encoder 2e is added. Instead of using the encoder, a resolver may be used.

The back-up system is comprised of a cable column (cable back-up mechanism 4) and clutch device 3 that enables or disables a back-up function of cable back-up mechanism 4. As shown in FIG. 32, clutch device 3 is provided between the first and second column shafts 7 and 8. Clutch device 3 is comprised of a friction clutch such as an electromagnetic clutch as shown in FIG. 29 or an electromagnetic mechanical clutch as shown in FIGS. 31A-31B.

The steering output system is comprised of an encoder 5e, steer angle sensor 22, a pair of torque sensors 60, 60, a Hall IC 5h, a pair of steering motors (a pair of steering actuators) 5, 5, a steering mechanism 69, and steered wheels 16, 16. Steer angle sensor 22 is attached to the upper end portion (the right-hand end portion in FIG. 32) of pinion shaft 9. The SBW vehicle steering apparatus of the fifteenth modification of FIG. 32 also uses the dual torque sensor system for the steering output system. The torque sensor pair (60, 60) is provided between the lower end portion (the left-hand end portion in FIG. 32) of pinion shaft 9 and near the pinion gear portion, for detecting a steering torque created by steering action of each steered wheel 16. In the steering apparatus of FIG. 32, an absolute-valued angular resolver (simply, an absolute resolver), which detects the applied torque based on the inductance change, is used as steer angle sensor 22. In this manner, by arranging steer angle sensor 22 on the cable back-up mechanism side of pinion shaft 9 and arranging the torque sensor pair (60, 60) on the steering rack-and-pinion mechanism side of pinion shaft 9, it is possible to detect the steer angle by means of steer angle sensor 22 attached to the pinion-shaft upper end portion without being affected by a torsion angle of torsion bar TB constructing part of the dual torque sensor system (60, 60).

Each of the steering motors serves as a steering actuator 5, which is disposed between steer angle sensor 22 and the torque sensor pair (60, 60) and provided in the middle of pinion shaft 9, and acts to apply steering torque to the pinion shaft during rotation of steering motor. In the steering apparatus of FIG. 32, the steering motor is comprised of a one-rotor two-stator motor that a single rotor can be driven by two stators. The one-rotor two-stator motor is capable of providing a dual steering actuator system, that is, the first steering actuator (or the first steering motor) 5A and the second steering actuator (or the second steering motor) 5B. Actually, a brushless motor is used as the one-rotor two-stator motor of the dual steering actuator system. In the same manner as the reaction motor constructed by a brushless motor, as a result of the use of such a brushless motor used as the one-rotor two-stator motor of the dual steering actuator system, encoder 5e and Hall IC 5h are both added. Steering mechanism 69 is comprised of rack shaft 10 slidably arranged in steering rack tube 20 and having the rack gear portion in meshed-engagement with the pinion gear of pinion shaft 9, left and right tie rods 25, 25 pin-connected to both ends of rack shaft 10, left knuckle arm 26 connected at one end to the left tie rod and also connected to at the other end to the left steered wheel, and right knuckle arm 26 connected at one end to the right tie rod and also connected to at the other end to the right steered wheel.

In the SBW vehicle steering apparatus of the fifteenth modification of FIG. 32 also uses the dual steering controller system, which is comprised of two controllers, namely the first steering controller 19A (ECU1) and the second steering controller 19B (ECU2) both executable arithmetic and logic operations by the respective electric power sources 18, 18 separated from each other, namely the first car battery (BATTERY1) and the second battery (BATTERY2).

Figure 34:
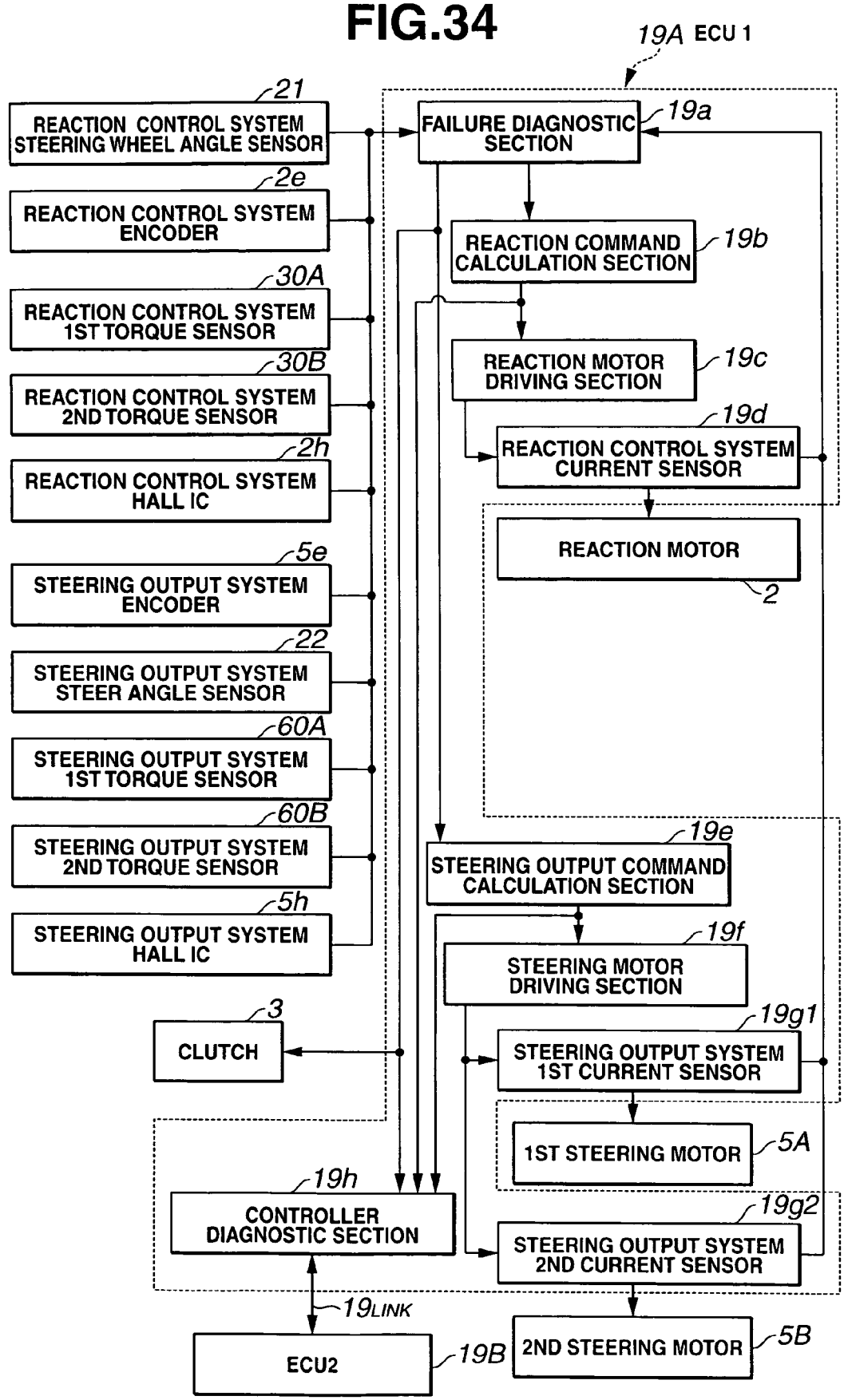
FIG. 34 is a general system block diagram showing the SBW vehicle steering apparatus of the modification of FIG. 32.

Referring to FIG. 34, there is shown the control system block diagram of the dual controller system including the first and second steering controllers 19A and 19B. The first and second steering controllers 19A and 19B are the same in construction. For the sake of simplicity, the detailed arithmetic and logic sections for only the first steering controller 19A are shown. As can be seen from the system block diagram of FIG. 34, the input/output interface (I/O) of the first steering controller 19A receives input information from reaction control system sensors, namely steering wheel angle sensor 21, encoder 2*e*, torque sensor pair (30, 30), and Hall IC 2*h*, and steering output system sensors, namely encoder 5*e*, steer angle sensor 22, torque sensor pair (60, 60), and Hall IC 5*h*. As clearly shown in FIG. 34, the first steering controller 19A includes a failure diagnostic section 19*a*. Failure diagnostic section 19*a* of the SBW vehicle steering system of the fifteenth modification of FIGS. 32-38 executes various arithmetic and logic operations, that is, the steering-control failure diagnostic routine of FIG. 35, the reaction-control failure diagnostic routine of FIG. 36, the electric motor-assist power-steering (EPS) control failure diagnostic routine of FIG. 37, and the SBW-to-EPS mode transition control routine of FIG. 38, i.e., a diagnosis on a transition from the SBW operating mode (SBW control with clutch device 3 disengaged) to the electric motor-assist power-steering (EPS) operating mode (EPS control with clutch device 3 engaged).

In addition to failure diagnostic section 19*a*, the first steering controller 19A includes a reaction command arithmetic calculation section 19*b*, a reaction motor driving section 19*c*, a reaction control system electric-current sensor 19*d*, a steering output command arithmetic calculation section 19*e*, a steering motor driving section 19*f*, a pair of steering output system electric-current sensors 19*g*, 19*g* (exactly, the first and second steering output system electric-current sensors 19*g*1 and 19*g*2), and a controller diagnostic section 19*h*. For mutual communication, the first and second steering controllers 19A and 19B are intercommunicated with each other via a bi-directional communication line 19LINK. As used hereafter, the first and second steering controllers 19A and 19B are collectively referred to as steering controller 19.

Figure 35:
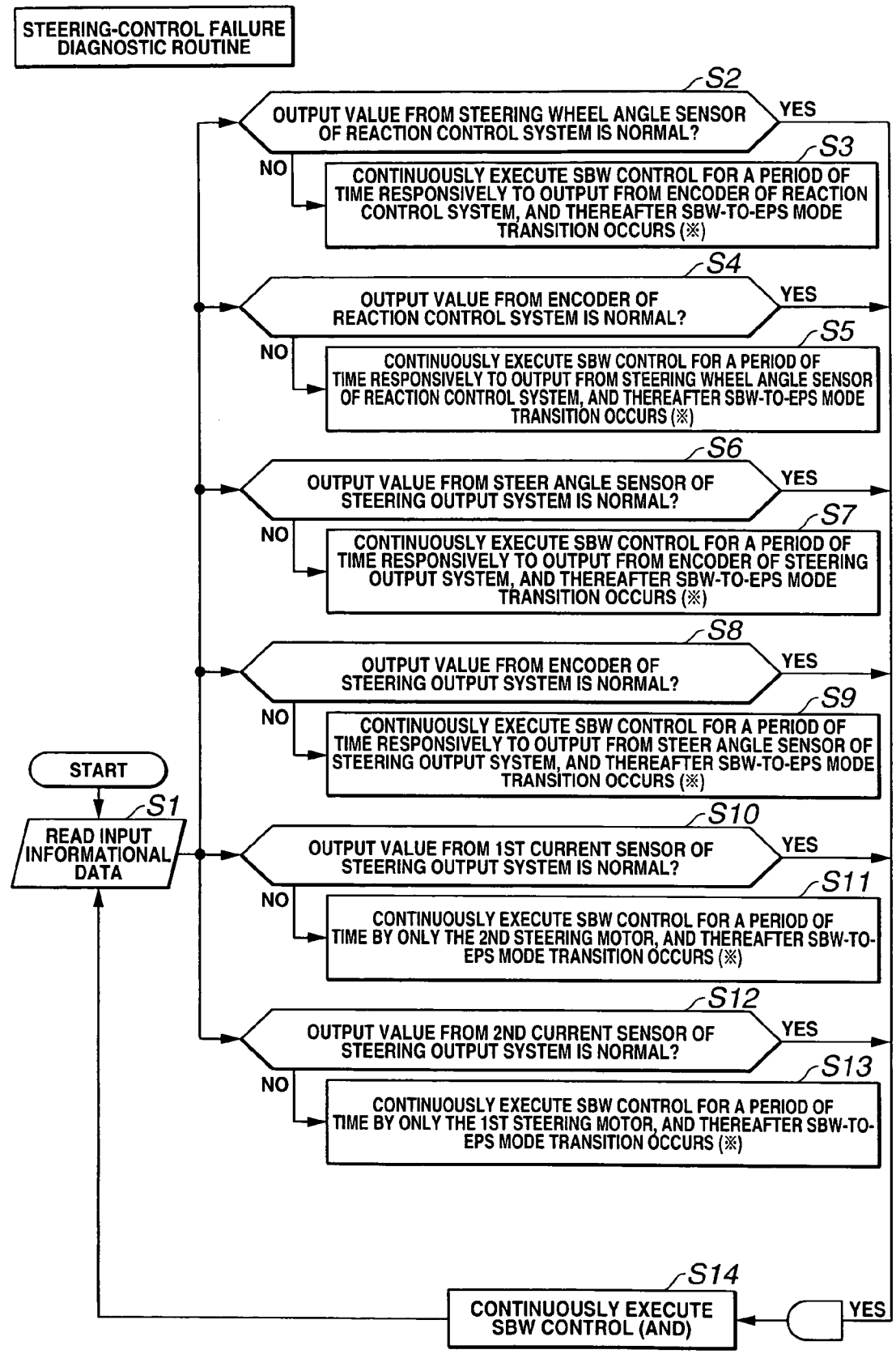
FIG. 35 is a flow chart showing a steering-control failure diagnostic routine executed within a failure diagnostic section of the steering controller incorporated in the SBW vehicle steering apparatus of the modification of FIG. 32.

Referring to FIG. 35, there is shown the steering-control failure diagnostic routine executed within failure diagnostic section 19*a* of steering controller 19.

At step S1, required input informational data from the reaction control system sensors and the steering output system sensors are read. Thereafter, the routine proceeds from step S1 parallelly to steps S2, S4, S6, S8, S10, and S12.

At step S2, a check is made to determine whether an output value of a sensor signal from steering wheel angle sensor 21 of the reaction control system is normal. When the answer to step S2 is in the affirmative (YES), the routine proceeds from step S2 to step S14. Conversely when the answer to step S2 is in the negative (NO), the routine proceeds from step S2 to step S3.

At step S3, on the basis of the diagnostic result that the output value from steering wheel angle sensor 21 is abnormal, the SBW operating mode is continuously executed for a period of time responsively to an output from reaction control system encoder 2*e*, with clutch device 3 disengaged. Thereafter, the processor of steering controller 19 operates to engage clutch device 3 so as to switch from the SBW operating mode to the EPS operating mode.

At step S4, a check is made to determine whether an output value of an encoder signal from encoder 2*e* of the reaction control system is normal. When the answer to step S4 is affirmative (YES), the routine proceeds from step S4 to step S14. Conversely when the answer to step S4 is negative (NO), the routine proceeds from step S4 to step S5.

At step S5, on the basis of the diagnostic result that the output value from reaction control system encoder 2*e* is abnormal, the SBW operating mode is continuously executed for a period of time responsively to an output from steering wheel angle sensor 21 of the reaction control system, with clutch device 3 disengaged. Thereafter, the processor of steering controller 19 operates to engage clutch device 3 so as to switch from the SBW operating mode to the EPS operating mode.

At step S6, a check is made to determine whether an output value of a sensor signal from steer angle sensor 22 of the steering output system is normal. When the answer to step S6 is affirmative (YES), the routine proceeds from step S6 to step S14. Conversely when the answer to step S6 is negative (NO), the routine proceeds from step S6 to step S7.

At step S7, on the basis of the diagnostic result that the output value from steer angle sensor 22 is abnormal, the SBW operating mode is continuously executed for a period of time responsively to an output from steering output system encoder 5*e*, with clutch device 3 disengaged. Thereafter, the processor of steering controller 19 operates to engage clutch device 3 so as to switch from the SBW operating mode to the EPS operating mode.

At step S8, a check is made to determine whether an output value of an encoder signal from encoder 5*e* of the steering output system is normal. When the answer to step S8 is affirmative (YES), the routine proceeds from step S8 to step S14. Conversely when the answer to step S8 is negative (NO), the routine proceeds from step S8 to step S9.

At step S9, on the basis of the diagnostic result that the output value from steering output system encoder 5*e* is abnormal, the SBW operating mode is continuously executed for a period of time responsively to an output from steer angle sensor 22 of the steering output system, with clutch device 3 disengaged. Thereafter, the processor of steering controller 19 operates to engage clutch device 3 so as to switch from the SBW operating mode to the EPS operating mode.

At step S10, a check is made to determine whether an output value of a sensor signal from the first current sensor 19*g*1 of the steering output system is normal. When the answer to step S10 is affirmative (YES), the routine proceeds from step S10 to step S14. Conversely when the answer to step S10 is negative (NO), the routine proceeds from step S10 to step S11.

At step S11, on the basis of the diagnostic result that the output value from the first current sensor 19*g*1 of the steering output system is abnormal, the SBW operating mode is continuously executed for a period of time by only the second steering motor 5B (regarded as the normally operating motor) of the steering output system, with clutch device 3 disengaged. Thereafter, the processor of steering controller 19 operates to engage clutch device 3 so as to switch from the SBW operating mode to the EPS operating mode.

At step S12, a check is made to determine whether an output value of a sensor signal from the second current sensor 19g2 of the steering output system is normal. When the answer to step S12 is affirmative (YES), the routine proceeds from step S12 to step S14. Conversely when the answer to step S12 is negative (NO), the routine proceeds from step S12 to step S13.

At step S13, on the basis of the diagnostic result that the output value from the second current sensor 19g2 of the steering output system is abnormal, the SBW operating mode is continuously executed for a period of time by only the first steering motor 5A (regarded as the normally operating motor) of the steering output system, with clutch device 3 disengaged. Thereafter, the processor of steering controller 19 operates to engage clutch device 3 so as to switch from the SBW operating mode to the EPS operating mode.

At step S14, under a condition where the answers to steps S2, S4, S6, S8, S10, and S12 are all in the affirmative (YES), the SBW operating mode is continuously executed, and then the routine returns to step S1.

Figure 36:
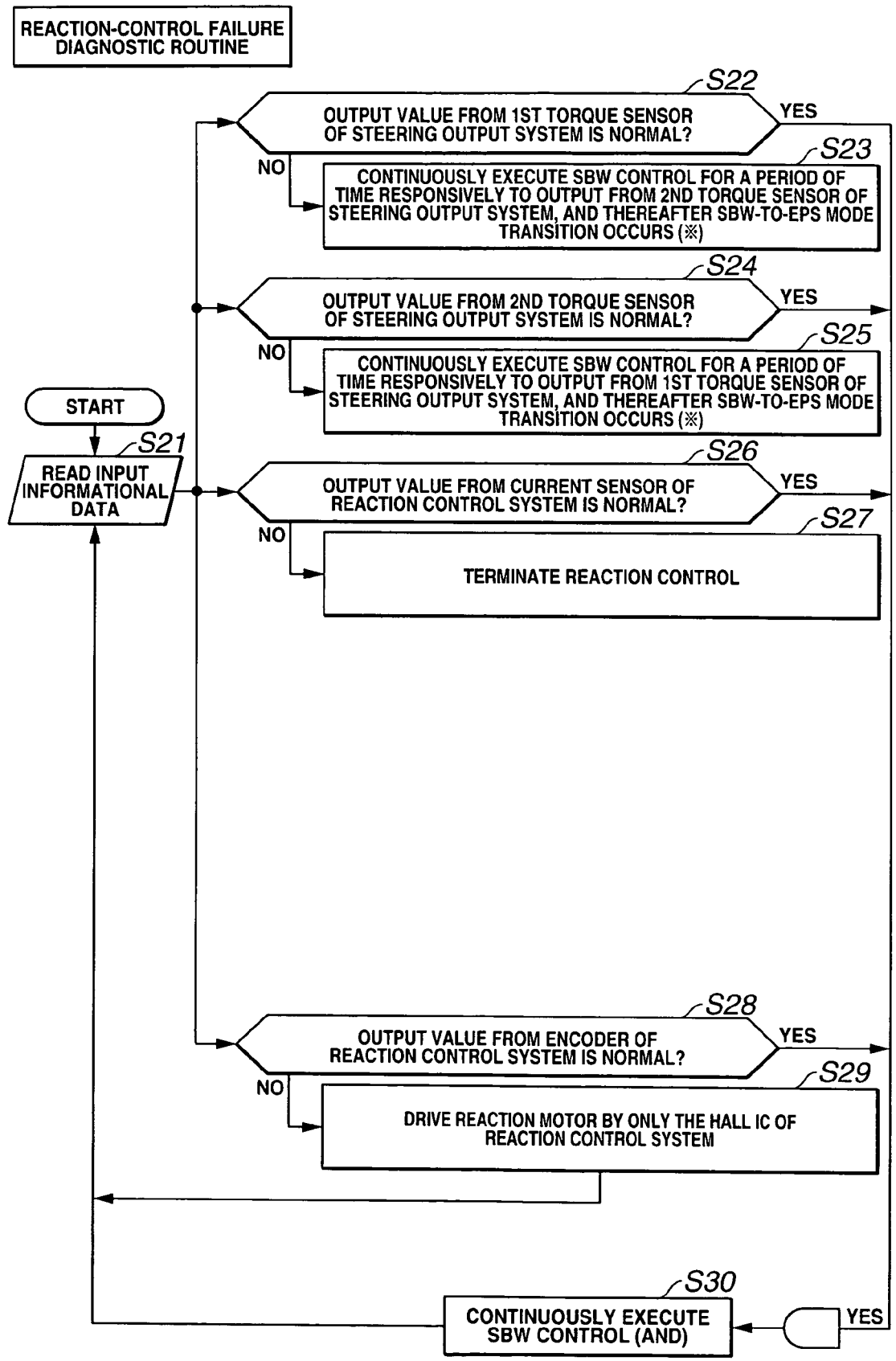
FIG. 36 is a reaction-control failure diagnostic routine executed within the failure diagnostic section of the steering controller incorporated in the SBW vehicle steering apparatus of the modification of FIG. 32.

Referring to FIG. 36, there is shown the reaction-control failure diagnostic routine executed within failure diagnostic section 19a of steering controller 19.

At step S21, required input informational data from the reaction control system sensors and the steering output system sensors are read. Thereafter, the routine proceeds from step S21 parallelly to steps S22, S24, S26, and S28.

At step S22, a check is made to determine whether an output value of a sensor signal from the first torque sensor 60A of the steering output system is normal. When the answer to step S22 is affirmative (YES), the routine proceeds from step S22 to step S30. Conversely when the answer to step S22 is negative (NO), the routine proceeds from step S22 to step S23.

At step S23, on the basis of the diagnostic result that the output value from the first torque sensor 60A of the steering output system is abnormal, the SBW operating mode is continuously executed for a period of time responsively to an output from the second torque sensor 60B of the steering output system, with clutch device 3 disengaged. Thereafter, the processor of steering controller 19 operates to engage clutch device 3 so as to switch from the SBW operating mode to the EPS operating mode.

At step S24, a check is made to determine whether an output value of a sensor signal from the second torque sensor 60B of the steering output system is normal. When the answer to step S24 is affirmative (YES), the routine proceeds from step S24 to step S30. Conversely when the answer to step S24 is negative (NO), the routine proceeds from step S24 to step S25.

At step S25, on the basis of the diagnostic result that the output value from the second torque sensor 60B of the steering output system is abnormal, the SBW operating mode is continuously executed for a period of time responsively to an output from the first torque sensor 60A of the steering output system, with clutch device 3 disengaged. Thereafter, the processor of steering controller 19 operates to engage clutch device 3 so as to switch from the SBW operating mode to the EPS operating mode.

At step S26, a check is made to determine whether an output value of a sensor signal from the current sensor 19g of the reaction control system is normal. When the answer to step S26 is affirmative (YES), the routine proceeds from step S26 to step S30. Conversely when the answer to step S26 is negative (NO), the routine proceeds from step S26 to step S27.

At step S27, on the basis of the diagnostic result that the output value from the current sensor 19g of the reaction control system is abnormal, reaction control is terminated.

At step S28, a check is made to determine whether an output value of an encoder signal from encoder 2e of the reaction control system is normal. When the answer to step S28 is affirmative (YES), the routine proceeds from step S28 to step S30. Conversely when the answer to step S28 is negative (NO), the routine proceeds from step S28 to step S29.

At step S29, on the basis of the diagnostic result that the output value from reaction control system encoder 2e is abnormal, reaction motor 2 is driven by only the reaction control system Hall IC 2h. Thereafter, the routine returns from step S29 to step S21.

At step S30, under a condition where the answers to steps S22, S24, S26, and S28 are all in the affirmative (YES), the SBW operating mode is continuously executed, and then the routine returns from step S30 to step S21.

Figure 37:
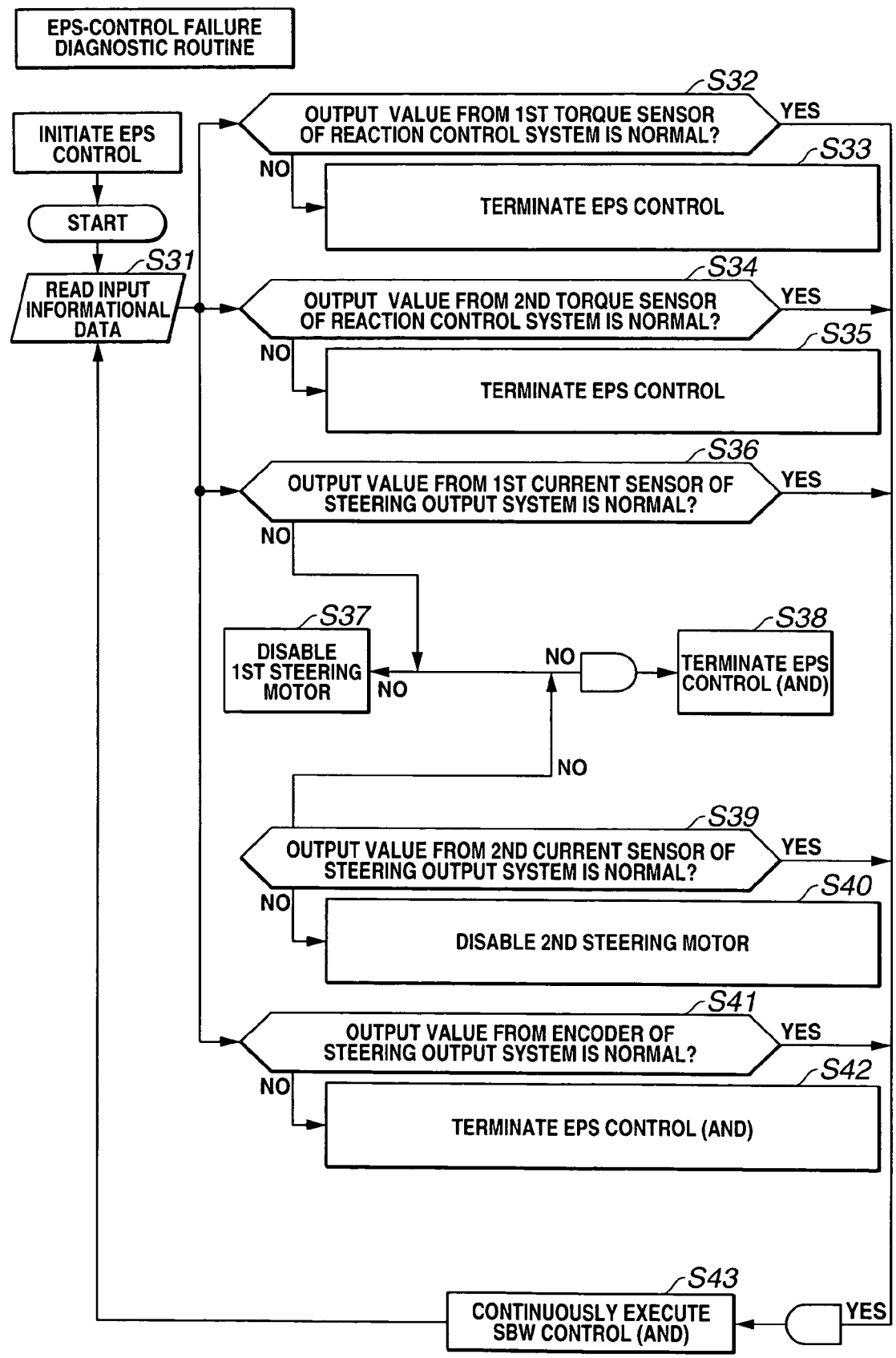
FIG. 37 is an electric motor-assist power-steering (EPS) control failure diagnostic routine executed within the failure diagnostic section of the steering controller incorporated in the SBW vehicle steering apparatus of the modification of FIG. 32.

Referring to FIG. 37, there is shown the EPS-control failure diagnostic routine executed within failure diagnostic section 19a of steering controller 19. The EPS-control failure diagnostic routine is initiated immediately when the EPS control (EPS operating mode) is started.

At step S31, required input informational data from the reaction control system sensors and the steering output system sensors are read. Thereafter, the routine proceeds from step S31 parallelly to steps S32, S34, S36, S39, and S41.

At step S32, a check is made to determine whether an output value of a sensor signal from the first torque sensor 30A of the reaction control system is normal. When the answer to step S32 is affirmative (YES), the routine proceeds from step S32 to step S43. Conversely when the answer to step S32 is negative (NO), the routine proceeds from step S32 to step S33.

At step S33, on the basis of the diagnostic result that the output value from the first torque sensor 30A of the reaction control system is abnormal, EPS control (EPS operating mode) is terminated.

At step S34, a check is made to determine whether an output value of a sensor signal from the second torque sensor 30B of the reaction control system is normal. When the answer to step S34 is affirmative (YES), the routine proceeds from step S34 to step S43. Conversely when the answer to step S34 is negative (NO), the routine proceeds from step S34 to step S35.

At step S35, on the basis of the diagnostic result that the output value from the second torque sensor 30B of the reaction control system is abnormal, EPS control (EPS operating mode) is terminated.

At step S36, a check is made to determine whether an output value of a sensor signal from the first current sensor 19g1 of the steering output system is normal. When the answer to step S36 is affirmative (YES), the routine proceeds from step S36 to step S43. Conversely when the answer to step S36 is negative (NO), the routine proceeds from step S36 to either one of steps S37 and S38.

At step S37, on the basis of the diagnostic result that the output value from the first current sensor 19g1 of the steering output system is abnormal, the first steering motor 5A is disabled.

At step S38, on the basis of the diagnostic result that the output value from either one of the first and second current sensors 19g1 and 19g2 of the steering output system is abnormal, EPS control (EPS operating mode) is terminated.

At step S39, a check is made to determine whether an output value of a sensor signal from the second current sensor 19g2 of the steering output system is normal. When the answer to step S39 is affirmative (YES), the routine proceeds from step S39 to step S43. Conversely when the answer to step S39 is negative (NO), the routine proceeds from step S39 to either one of steps S38 and S40.

At step S40, on the basis of the diagnostic result that the output value from the second current sensor 19g2 of the steering output system is abnormal, the second steering motor 5B is disabled.

At step S41, a check is made to determine whether an output value of an encoder signal from encoder 5e of the steering output system is normal. When the answer to step S41 is affirmative (YES), the routine proceeds from step S41 to step S43. Conversely when the answer to step S41 is negative (NO), the routine proceeds-from step S41 to step S42.

At step S42, EPS control is terminated.

At step S43, under a condition where the answers to steps S32, S34, S36, S39, and S41 are all in the affirmative (YES), the EPS operating mode is continuously executed, and then the routine returns from step S43 to step S31.

Figure 38:
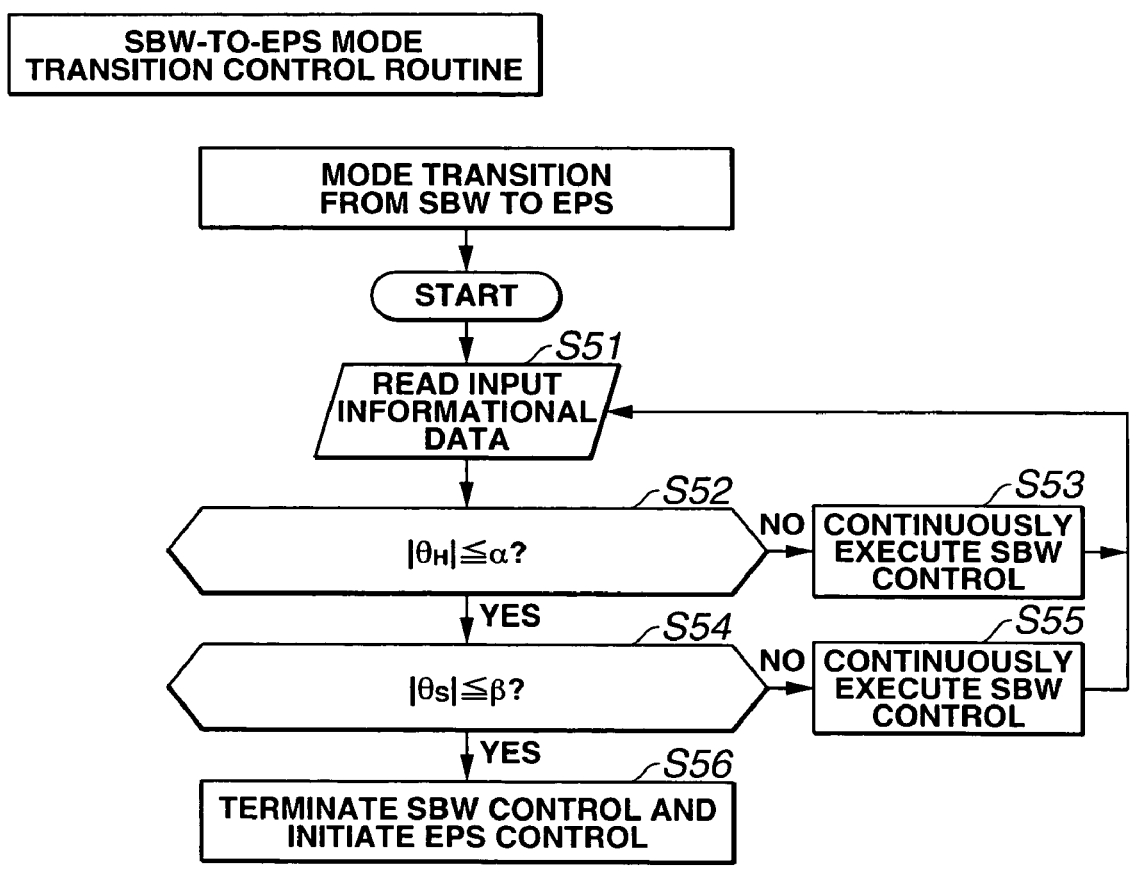
FIG. 38 is an SBW-to-EPS mode transition control routine executed within the failure diagnostic section of the steering controller incorporated in the SBW vehicle steering apparatus of the modification of FIG. 32.

Referring to FIG. 38, there is shown the SBW-to-EPS mode transition control routine executed within failure diagnostic section 19a of steering controller 19. The SBW-to-EPS mode transition control routine (steps S51-S56) of FIG. 38 is initiated, when mode-switching from the SBW operating mode to the EPS operating mode occurs in the steering-control failure diagnostic routine of FIG. 35 or in the reaction-control failure diagnostic routine of FIG. 36, that is, in each SBW-to-EPS mode transition permissible state marked by "※" in FIGS. 35 and 36.

At step S51, required input informational data from the reaction control system sensors and the steering output system sensors are read. Thereafter, the routine proceeds from step S51 to step S52.

At step S52, a check is made to determine whether the absolute value |θH| of the detected value of handle angle θH detected by steering wheel angle sensor 21 is less than or equal to a predetermined threshold value α. Predetermined threshold value α means a handle-angle neutral position decision criterion, in other words, a criterion needed to determine whether the detected handle angle is within a predetermined small handle-angle range substantially corresponding to a neutral position of the steering input section (steering wheel 1). When the answer to step S52 is affirmative (YES), that is, in case of |θH|≦α, the routine proceeds from step S52 to step S54. Conversely when the answer to step S52 is negative (NO), that is, in case of |θH|>α, the routine proceeds from step S52 to step S53.

At step S53, on the basis of the decision result that the absolute value |θH| of handle angle θH detected by steering wheel angle sensor 21 is greater than predetermined threshold value α and thus the detected handle angle is out of the predetermined small handle-angle range substantially corresponding to the neutral position of the steering input section (steering wheel 1), the SBW operating mode is continuously executed with clutch device 3 disengaged, and then the routine returns from step S53 to step S51.

At step S54, a check is made to determine whether the absolute value |θS| of the detected value of steer angle θS detected by steer angle sensor 22 is less than or equal to a predetermined threshold value β. Predetermined threshold value β means a steer-angle neutral position decision criterion, in other words, a criterion needed to determine whether the detected steer angle is within a predetermined small steer-angle range substantially corresponding to a neutral position of the steering output section (steering mechanism 69). When the answer to step S54 is affirmative (YES), that is, in case of |θS|≦β, the routine proceeds from step S54 to step S56. Conversely when the answer to step S54 is negative (NO), that is, in case of |θS|>β, the routine proceeds from step S54 to step S55.

At step S55, on the basis of the decision result that the absolute value |θS| of steer angle θS detected by steer angle sensor 22 is greater than predetermined threshold value β and thus the detected steer angle is out of the predetermined small steer-angle range substantially corresponding to the neutral position of the steering output section (steering mechanism 69), the SBW operating mode is continuously executed with clutch device 3 disengaged, and then the routine returns from step S55 to step S51.

At step S56, on the basis of the decision result that the condition of step S52 defined by |θH|≦α is satisfied and thus the detected handle angle θH is within the predetermined small handle-angle range substantially corresponding to the neutral position of the steering input section (steering wheel 1), and additionally the condition of step S54 defined by |θS|≦β is satisfied and thus the detected steer angle θS is within the predetermined small steer-angle range substantially corresponding to the neutral position of the steering output section (steering mechanism 69), steering controller 19 operates to terminate the SBW operating mode and to engage clutch device 3 so as to initiate EPS control.

Hereunder described in detail are the demerits of the SBW vehicle steering apparatus disclosed in JP2002-145098 and the merits of the SBW vehicle steering apparatus of the fifteenth modification shown in FIGS. 32-38.

The SBW vehicle steering apparatus disclosed in JP2002-145098 equipped with the dual steering actuator system and the single steering wheel angle sensor system has the following demerits.

First, immediately when the SBW system is failed during the SBW control, for instance, immediately when a primary steering actuator of the dual steering actuator system or a secondary steering actuator is failed, the controller disengages or disables a variable gear ratio steering (VGR) function, and additionally to forcibly adjust the orientations of steered wheels by controlling the normally-operating steering actuator of the dual steering actuator system, so as to achieve a proper relationship between the steering wheel rotation angle and the road-wheel steer angle such that there is a less phase difference between the neutral position of the steering wheel and the neutral position corresponding to zero average steer angle of the steered road wheels. In this manner, forcible phase-adjustment of the steered-road-wheel neutral position relative to the steering-wheel neutral position is achieved by means of the normally-operating steering actuator, immediately when the steering actuator failure occurs. Owing to such forcible phase-adjustment by the unfailed steering actuator, there is an increased tendency for the actual vehicle's traveling path to deviate from the driver's intended traveling line. As a result of this, there is a possibility that the vehicle undesirably deviates from the current driving lane.

Second, the steering apparatus of JP2002-145098 uses the single steering wheel angle sensor system. In presence of the single steering wheel angle sensor system failure, it is impossible to detect the steering wheel angle by way of the single steering wheel angle sensor system. Therefore, immediately when the steering wheel angle sensor system failure occurs, the clutch has to be rapidly engaged to initiate the back-up operating mode. This leads to the problem that there is a discrepancy between the neutral position of the steering wheel and the neutral position corresponding to zero average steer angle of steered wheels just after transition to the back-up operating mode.

Third, in the steering apparatus of JP2002-145098, when the SBW system failure occurs during the SBW control, the controller operates to engage the clutch irrespective of whether the vehicle is driving straight-ahead or going around a curve, and additionally to stop the feedback actuator (reaction motor). With the clutch engaged, the steering input section (the steering wheel) and the steering output section (the steering rack-and-pinion mechanism) are mechanically linked to each other, and then an electric motor-assist power-steering (EPS) function is attained by means of the normally-operating actuator, such as the unfailed steering actuator or the unfailed feedback actuator, serving as a power source that produces a steering assist force. Actually, the magnitude of an actuator command signal suitable for the SBW control differs from that of an actuator command signal suitable for the EPS control. Additionally, during the back-up operating mode during which the steering input and output sections are mechanically coupled to each other via the back-up system, a reaction force can be transmitted from the steered wheels through the back-up system to the steering wheel. Assuming that switching from the SBW operating mode to the EPS operating mode occurs under a condition where a command signal is generated to the actuator and a reaction force input from the steered wheels to the steering output section (the rack-and-pinion mechanism) is comparatively great during cornering, a rapid change in the command signal value for the actuator may occur, and simultaneously the comparatively great reaction force is transferred from the steered wheels via the back-up system to the steering wheel. In such a case, a change in the steering reaction torque, taken in by the driver through the steering wheel is great, thus deteriorating a steering feel.

Fourth, of the primary and secondary steering actuators and the feedback actuator (reaction actuator), if the feedback actuator is failed, the controller disables the feedback actuator function, and thereafter disables the VGR function, and phase-adjustment between the neutral position of the steering wheel and the neutral position corresponding to zero average steer angle of the steered road wheels is performed by means of the normally-operating actuator. After this, the clutch is engaged to enable the back-up function. Assuming that the feedback actuator failure occurs during cornering, the reaction force tends to temporarily reduce. Thereafter, as soon as the clutch is engaged, the reaction force is transferred from the steered wheels via the back-up system to the steering wheel and thus the reaction force begins to increase again. This deteriorates the driver's steering feel.

In contrast to the above, in the SBW vehicle steering apparatus of the fifteenth modification shown in FIGS. 32-38 using a dual or further high-graded (e.g., triplex) actuator system, a dual or further high-graded (e.g., triplex) sensor system, and a dual or further high-graded (e.g., triplex) controller system, when either one of actuators constructing the multiple actuator system is failed, the SBW control can be continuously executed by the unfailed actuator. In a similar manner, when either one of sensors constructing the multiple sensor system is failed, the SBW control can be continuously executed by the unfailed sensor. When either one of controllers 19A and 19B constructing the multiple controller system is failed, the SBW control can be continuously executed by the unfailed controller. Thus, it is possible to engage clutch device 3 and to switch to the back-up operating mode, while avoiding the undesired phase difference between the neutral positions of the steering input and output sections by repeatedly executing the SBW operating mode (containing the phase-adjustment) by means of the unfailed system for a period of time. For instance, when steering wheel angle sensor 21 of the reaction control system becomes conditioned in the failed state (or in the abnormal state), the routine of FIG. 35 flows from step S1 via step S2 to step S3. Owing to the SBW-to-EPS mode transition occurring through step S3, the subroutine of FIG. 38 flows from step S51 via step S52 to step S53, or flows from step S51 through steps S52 and S54 to step S55. The loop indicated by S51→S52→S53→S51 or the loop indicated by S51→S52→S54→S55→S51 is repeatedly executed and thus the SBW operating mode (SBW control) is continuously executed for a period of time by an output from reaction-control-system encoder 2e capable of detecting the steering wheel rotation angle (handle angle θH) in place of reaction-control-system steering wheel angle sensor 21. Thereafter, as soon as the condition of step S52 defined by |θH|≦α and the condition of step S54 defined by |θS|≦β are both satisfied, the subroutine of FIG. 38 proceeds from step S54 to step S56. At step S56, the SBW control is terminated and simultaneously clutch device 3 is engaged and then the EPS control is initiated by utilizing the steering motors 5, 5 each serving as a power source that produces a steering assist force. In the same manner as the state that the output value of the sensor signal from reaction-control-system steering wheel angle sensor 21 is abnormal (see the flow from step S2 to step S3), during steering control, (i) in a state that the output value of the encoder signal from reaction-control-system encoder 2e is abnormal (see the flow from step S4 to step S5 in FIG. 35), (ii) in a state that the output value of the sensor signal from steering-output-system steer angle sensor 22 is abnormal (see the flow from step S6 to step S7), (iii) in a state that the output value of the encoder signal from steering-output-system encoder 5e is abnormal (see the flow from step S8 to step S9), (iv) in a state that the output value of the sensor signal from steering-output-system 1st current sensor 19g1 is abnormal (see the flow from step S10 to step S11), and (v) in a state that the output value of the sensor signal from steering-output-system 2nd current sensor 19g2 is abnormal (see the flow from step S12 to step S13), according to the SBW-to-EPS mode transition control routine of FIG. 38, the SBW control can be continuously executed by means of the unfailed system for a period of time, until the conditions defined by |θH|≦α and |θS|≦β are both satisfied. Thereafter, under these conditions defined by |θH|≦α and |θS|≦β, clutch device 3 is engaged to complete the SBW-to-EPS mode transition. In a similar manner, during reaction control, (vi) in a state that the output value of the sensor signal from steering-output-system 1st torque sensor 60A is abnormal (see the flow from step S22 to step S23 in FIG. 36), and (vii) in a state that the output value of the sensor signal from steering-output-system 2nd torque sensor 60B is abnormal (see the flow from step S24 to step S25), according to the SBW-to-EPS mode transition control routine of FIG. 38, the SBW control can be continuously executed by means of the unfailed system for a period of time, until the conditions defined by |θH|≦α and |θS|≦β are both satisfied. Thereafter, under these conditions defined by |θH|≦α and |θS|≦β, clutch device 3 is engaged to complete the SBW-to-EPS mode transition. That is to say, the SBW vehicle steering apparatus of the fifteenth modification of FIGS. 32-38 is designed to complete a transition from the SBW operating mode to the EPS operating mode at a timing when the conditions defined by $|\theta H| \leq \alpha$ and $|\theta S| \leq \beta$ are both satisfied, while enabling or permitting subsequent executions of SBW control for a period of time even when the system failure has been occurred. This ensures a smooth, natural SBW-to-EPS mode transition by virtue of subsequent executions of SBW control after the system failure. Thus, the steering apparatus of the fifteenth modification of FIGS. 32-38 eliminates the necessity of forcible phase-adjustment of the steered-road-wheel neutral position relative to the steering-wheel neutral position, achieved by the unfailed steering actuator, immediately when the system failure has been occurred, and also contributes to reduced deviation of the actual vehicle's traveling path from the driver's intended traveling line. Additionally, as can be seen from the conditions defined by $|\theta H| \leq \alpha$ and $|\theta S| \leq \beta$ (see steps S52 and S54 of FIG. 38), when the detected handle angle θH is within the predetermined small handle-angle range ($|\theta H| \leq \alpha$) substantially corresponding to the neutral position of the steering input section (steering wheel 1) and additionally the detected steer angle θS is within the predetermined small steer-angle range ($|\theta S| \leq \beta$) substantially corresponding to the neutral position of the steering output section (steering mechanism 69), in other words, substantially during straight-ahead driving, the SBW vehicle steering apparatus of the fifteenth modification, capable of continuously executing the SBW control by means of the unfailed system of the multiple system configuration even in presence of the system failure, permits clutch device 3 of the back-up system to engage. Generally, substantially during straight-ahead driving, an actuator command signal value is very low and the magnitude of reaction force input from the steered wheels 16, 16 is small, irrespective of whether the steering system is operated in the SBW operating mode or in the EPS operating mode. Thus, permitting the clutch engagement under the conditions defined by $|\theta H| \leq \alpha$ and $|\theta S| \leq \beta$ contributes to the reduced steering-force change during the SBW-to-EPS mode transition, thus preventing a steering feel from deteriorating.

The SBW vehicle steering apparatus of the fifteenth modification of FIGS. 32-38 has the following effects (22)-(28).

(22) In the SBW vehicle steering apparatus, which includes a steering input section (steering wheel 1) receiving a steering input and a steering output section (steering mechanism 69) linked to steered wheels 16, 16 for steering, and a steering controller generating a command signal based on the steering input applied to the steering input section (steering wheel 1) and controlling the steering output section (steering mechanism 69) in response to the command signal under a condition where the steering input section (steering wheel 1) is mechanically separated from the steering output section (steering mechanism 69), each of system configurations of an actuator system, a sensor system, and a steering controller system, all provided to control the steering output section (steering mechanism 69) in response to the command signal, is comprised of a multiple system configuration higher than a dual system configuration. Additionally, a mechanical back-up system is provided between the steering input section (steering wheel 1) and the steering output section (steering mechanism 69), for mechanically transmitting the steering input from the steering input section (steering wheel 1) via the mechanical back-up system to the steering output section (steering mechanism 69). With this arrangement, even when a first control system of the SBW system of the multiple system configuration is failed, it is possible to shift to a back-up operating mode under a condition where there is no phase difference between the neutral position of steering wheel 1 and the neutral position corresponding to zero average steer angle of steered road wheels 16, 16, by continuously executing an SBW operating mode for a period of time by means of the unfailed control system after the first control system failure has occurred.

(23) When the first control system of the multiple system configuration is failed, controller 19 of the multiple steering controller system operates to continuously execute the SBW operating mode by means of the unfailed control system except the failed first control system, until the steering input section (steering wheel 1) becomes conditioned or positioned nearby its neutral position and thus the first condition defined by $|\theta H| \leq \alpha$ becomes satisfied and additionally the steering output section (steering mechanism 69) becomes conditioned or positioned nearby its neutral position and thus the second condition defined by $|\theta S| < P$ becomes satisfied. Immediately when the first and second conditions are both satisfied, the controllers operate to engage clutch device 3 constructing part of the mechanical back-up system so as to initiate the mode transition from the SBW operating mode to the back-up operating mode (or the EPS operating mode). Particularly when the mode transition from the SBW control to the back-up control occurs substantially during straight-ahead driving during which the first and second conditions defined by $|\theta H| \leq \alpha$ and $|\theta S| \leq \beta$ are both satisfied and also there is a less change in steering force, it is possible to avoid a steering feel from deteriorating.

(24) During the back-up operating mode, controller 19 executes an electric motor-assist power-steering (EPS) control, utilizing steering motors 5, 5. Thus, after the mode transition to the back-up operating mode, it is possible to effectively reduce a driver's steering effort or a steering force applied to steering wheel 1.

(25) The steering wheel angle sensor (handle angle sensor) 21 of the reaction control system is disposed between steering wheel 1 and the torque sensor system (30, 30) of the reaction control system. Thus, it is possible to accurately detect a steering wheel angle θH corresponding to the steering wheel movement without being affected by a torsion angle of torsion bar TB constructing part of the torque sensor system (30, 30) of the reaction control system.

(26) Steer angle sensor 22, which detects a steer angle θS of the steered wheels, is provided between the mechanical back-up system 4 and the torque sensor system (60, 60) of the steering output system. Thus, it is possible to accurately detect steer angle θS without being affected by a torsion angle of torsion bar TB constructing part of the torque sensor system (60, 60) of the steering output system.

(27) Actuators included in the reaction control system and the steering output system, that is, reaction motor 2, and steering motors 5, 5, are constructed by brushless motors. It is possible to detect steering wheel angle (handle angle) θH and steer angle θS of the steered wheels, utilizing reaction-control-system encoder 2e used for reaction control and steering-output-system encoder 5e used for steering control. Thus, it is possible to realize or achieve the dual steering-wheel-angle sensor system by a combination of a single steering wheel angle sensor 21 and reaction-control-system encoder 2e and also to realize or achieve the dual steer-angle sensor system by a combination of a single steer angle sensor 22 and steering-output-system encoder 5e, In other words, it is unnecessary to construct the dual steering-wheel-angle sensor system by two steering wheel angle sensors 21, 21, and it is unnecessary to construct the dual steer-angle sensor system by two steer angle sensors 22, 22.

(28) The previously-noted dual steering actuator system constructed by steering motors 5, 5, is comprised of a one-rotor two-stator brushless motor. In comparison with two one-rotor one-stator motors each having a rotor driven by a single stator, the one-rotor two-stator brushless motor is simple in construction and is superior in the reduced number of motor parts, reduced number of component parts interconnecting the motor shaft and pinion shaft 9, reduced total manufacturing costs of steering systems, and inexpensive, lightweight, and downsized dual actuator system of reduced motor-torque loss.

Figure 39:
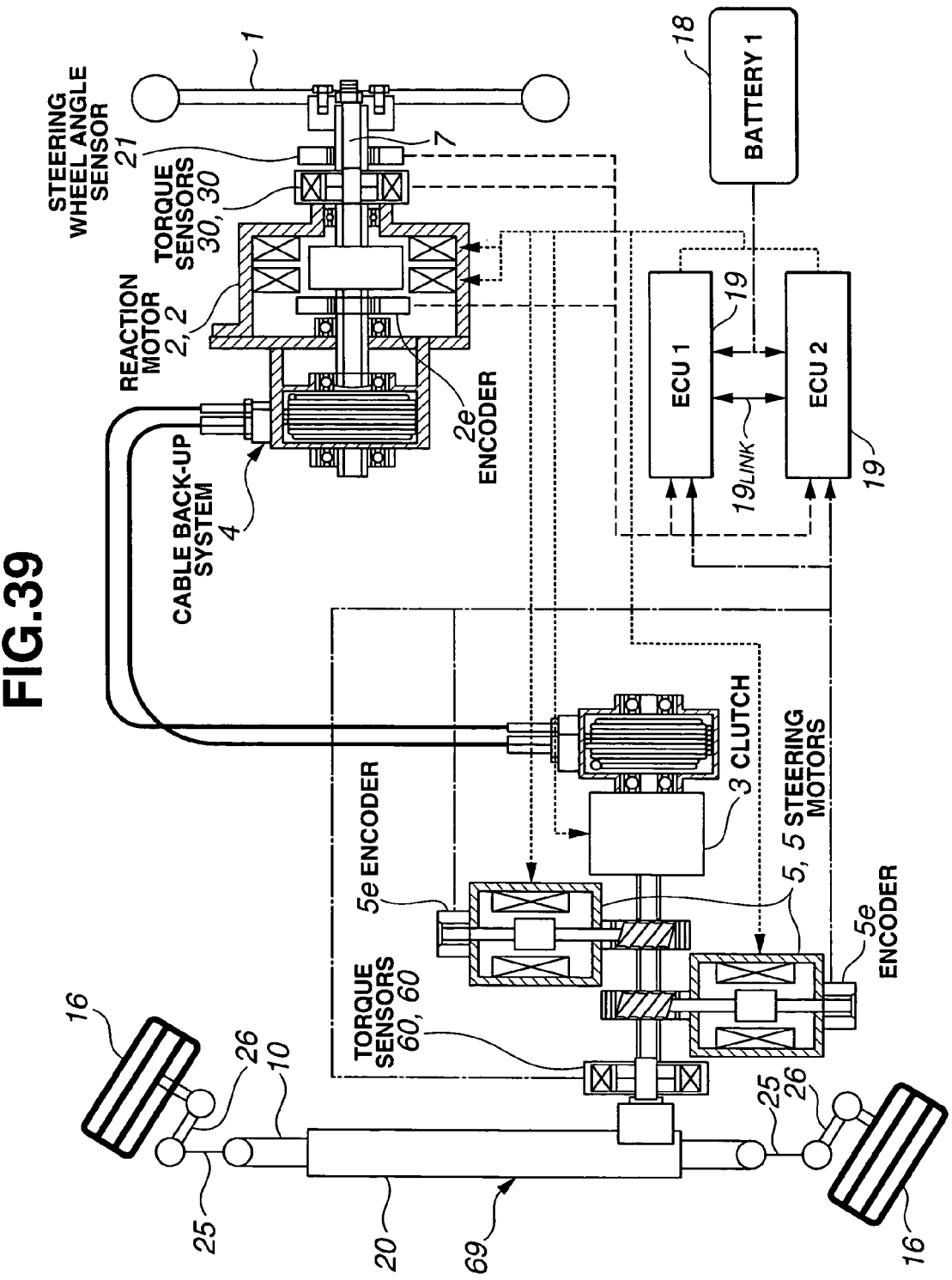
FIG. 39 is a detailed system diagram illustrating another modification of an SBW vehicle steering apparatus having a cable back-up mechanism, a dual actuator system, a dual sensor system, and a dual controller system.
Figure 40:
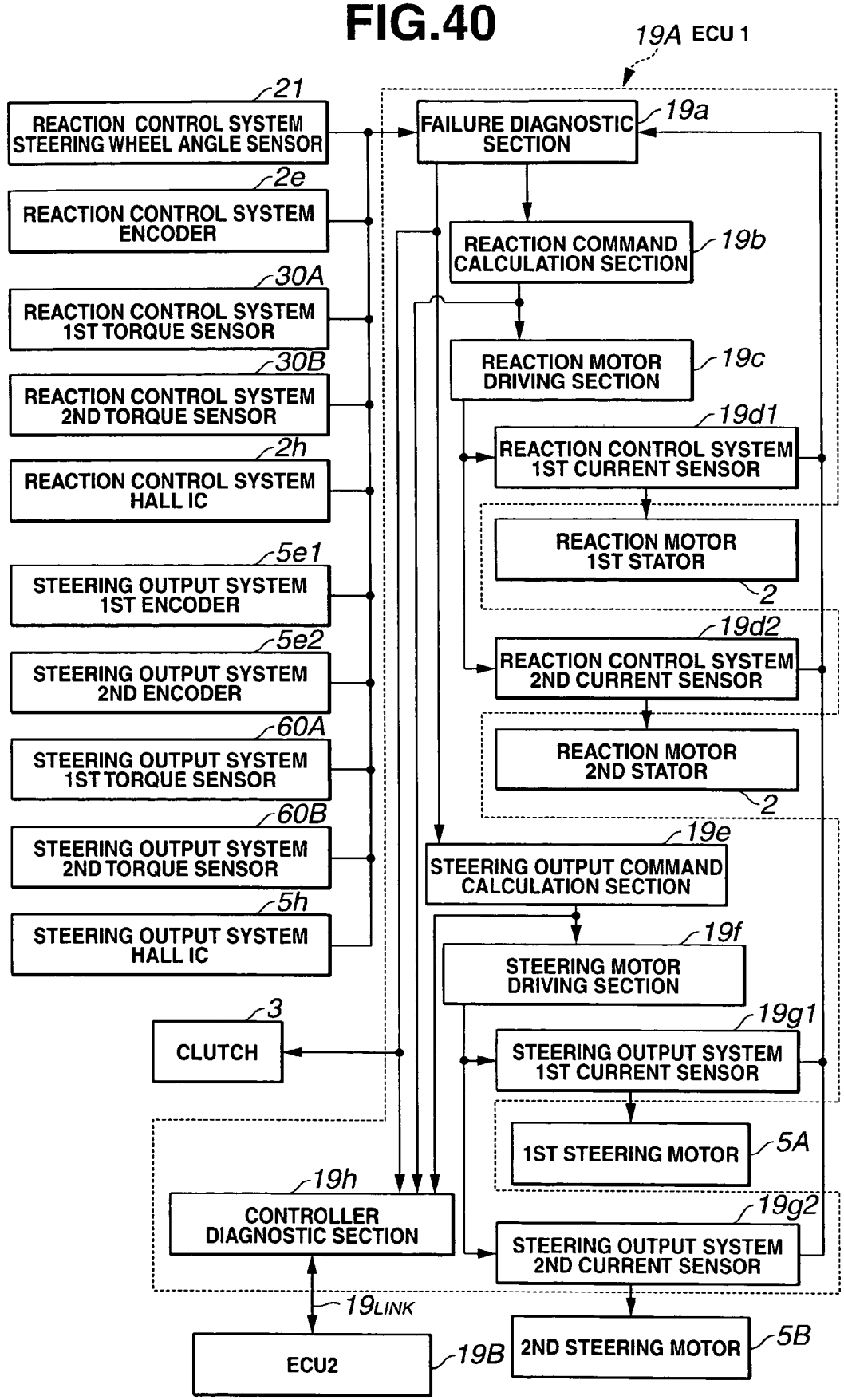
FIG. 40 is a general system block diagram showing the SBW vehicle steering apparatus of the modification of FIG. 39.

Referring now to FIGS. 39-43, there is shown the SBW vehicle steering apparatus of the sixteenth modification. The SBW vehicle steering apparatus of the sixteenth modification of FIGS. 39-43 is different from that of the fifteenth modification of FIGS. 32-38, in that in the sixteenth modification the dual reaction actuator system (reaction motors 2, 2) is constructed by a one-rotor two-stator brushless motor and each of the two steering motors 5, 5, constructing the dual steering actuator system, is comprised of a one-rotor one-stator brushless motor. As clearly shown in FIG. 39, clutch device 3 of the mechanical back-up system is provided on the side of the steering output system and attached to the pinion-shaft upper end portion. Owing to the use of brushless motors serving as steering motors 14, 14, encoders 5e, 5e are attached to the respective one-rotor one-stator brushless motors 5, 5. The use of encoders 5e, 5e eliminates the necessity of steer angle sensor 22. Thus, in the steering apparatus of the sixteenth modification of FIG. 39, steering-output-system steer angle sensor 22 is omitted. As discussed, in the sixteenth modification, the reaction motor system as well as the steering motor system is configured or constructed as a dual actuator system. For this reason, a pair of reaction control system electric-current sensors 19d, 19d (exactly, the first and second reaction control system electric-current sensors 19d1 and 19d2) are further provided. The other structure of the SBW vehicle steering apparatus of the sixteenth modification of FIG. 39 is identical to that of the fifteenth modification of FIGS. 32-38. Thus, in explaining the sixteenth modification of FIGS. 39-43, for the purpose of simplification of the disclosure, the same reference signs used to designate elements in the fifteenth modification of FIGS. 32-38 will be applied to the corresponding elements used in the sixteenth modification, while detailed description of the same reference signs will be omitted because the above description thereon seems to be self-explanatory. Failure diagnostic section 19a of the SBW vehicle steering system of the sixteenth modification of FIGS. 39-43 executes various arithmetic and logic operations, that is, the steering-control failure diagnostic routine of FIG. 41, the reaction-control failure diagnostic routine of FIG. 42, the EPS-control failure diagnostic routine of FIG. 43, and the SBW-to-EPS mode transition control routine of FIG. 38. The operations of the steering control system, the reaction control system, and the EPS control system of the SBW vehicle steering apparatus of the sixteenth modification of FIGS. 39-43 are hereunder described briefly.

Figure 41:
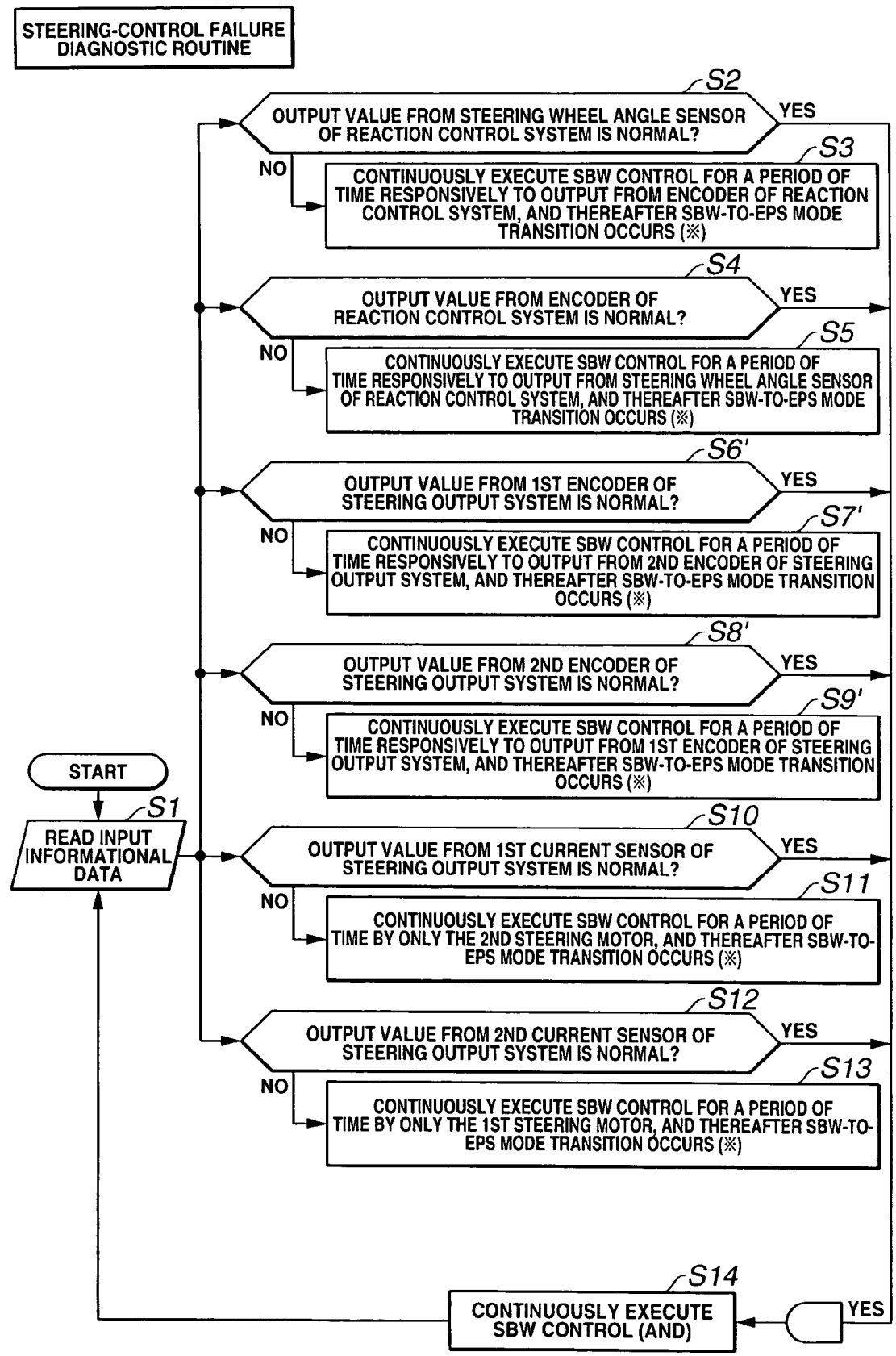
FIG. 41 is a flow chart showing a steering-control failure diagnostic routine executed within a failure diagnostic section of the steering controller incorporated in the SBW vehicle steering apparatus of the modification of FIG. 39.
Figure 42:
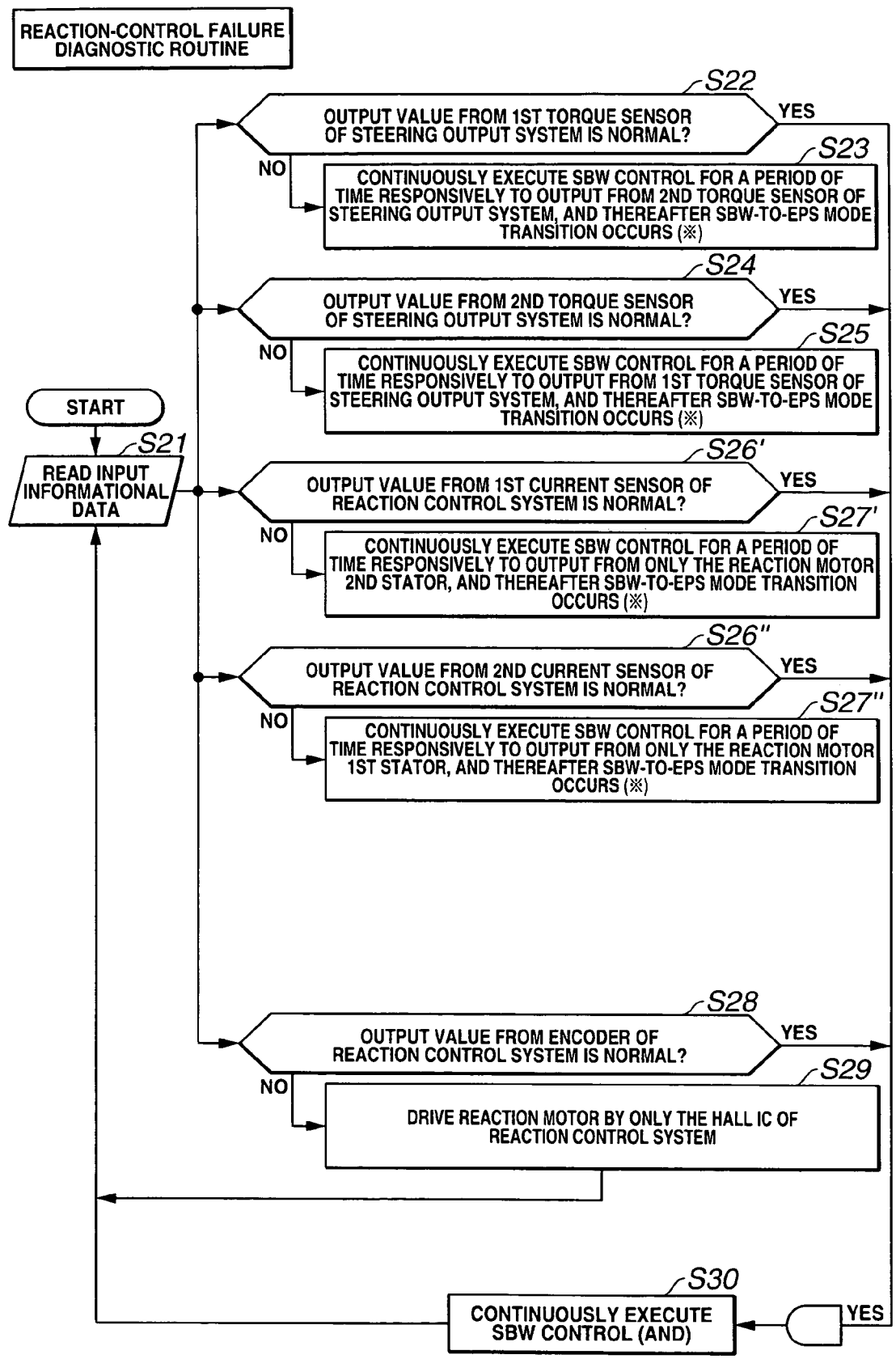
FIG. 42 is a reaction-control failure diagnostic routine executed within the failure diagnostic section of the steering controller incorporated in the SBW vehicle steering apparatus of the modification of FIG. 39.
Figure 43:
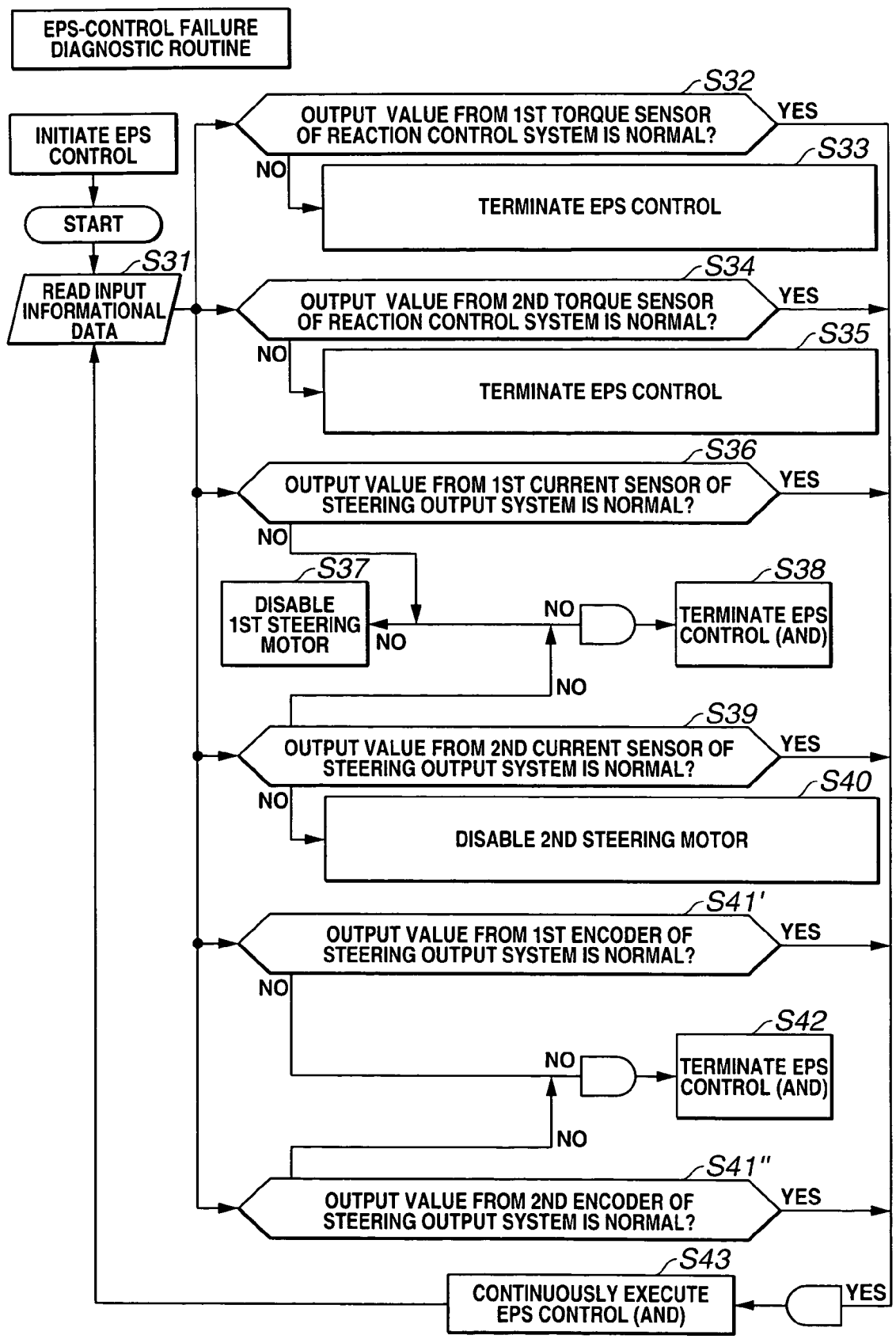
FIG. 43 is an EPS-control failure diagnostic routine executed within the failure diagnostic section of the steering controller incorporated in the SBW vehicle steering apparatus of the modification of FIG. 39.

Arithmetic and logic operations of steps S1-S5 and S10-S14 shown in FIG. 41, steps S21-S25 and S28-S30 shown in FIG. 42, and steps S31-S40 and S42-S43 shown in FIG. 43 are identical to those of the flow charts of FIGS. 35-37 executed within failure diagnostic section 19a of the SBW vehicle steering apparatus of the fifteenth modification of FIG. 32. Thus, the detailed description of the same steps S1-S5, S10-S14, S21-S25, S28-S40, and S42-S43 will be omitted because the above description thereon seems to be self-explanatory. Only the different steps S6', S7', S8', S9', S26', S27', S26", S27", S41', and S41" will be hereinafter described in detail.

At step S6' of the steering-control failure diagnostic routine of FIG. 41, a check is made to determine whether an output value of an encoder signal from the first encoder 5e1 of the steering output system is normal. When the answer to step S6' is affirmative (YES), the routine proceeds from step S6' to step S14. Conversely when the answer to step S6' is negative (NO), the routine proceeds from step S6' to step S7'.

At step S7', on the basis of the diagnostic result that the output value from the first encoder 5e1 of the steering output system is abnormal, the SBW operating mode is continuously executed for a period of time responsively to an output from the second encoder 5e2 of the steering output system, with clutch device 3 disengaged. Thereafter, the processor of steering controller 19 operates to engage clutch device 3 so as to switch from the SBW operating mode to the EPS operating mode.

At step S8', a check is made to determine whether an output value of an encoder signal from the second encoder 5e2 of the steering output system is normal. When the answer to step S8' is affirmative (YES), the routine proceeds from step S8' to step S14. Conversely when the answer to step S8' is negative (NO), the routine proceeds from step S8' to step S9'.

At step S9', on the basis of the diagnostic result that the output value from the second encoder 5e2 of the steering output system is abnormal, the SBW operating mode is continuously executed for a period of time responsively to an output from the first encoder 5e1 of the steering output system, with clutch device 3 disengaged. Thereafter, the processor of steering controller 19 operates to engage clutch device 3 so as to switch from the SBW operating mode to the EPS operating mode.

At step 26' of the reaction-control failure diagnostic routine of FIG. 42, a check is made to determine whether an output value of a sensor signal from the first current sensor 19d1 of the reaction control system is normal. When the answer to step S26' is affirmative (YES), the routine proceeds from step S26' to step S30. Conversely when the answer to step S26' is negative (NO), the routine proceeds from step S26' to step S27'.

At step S27', on the basis of the diagnostic result that the output value from the first current sensor 19d1 of the reaction control system is abnormal, the SBW operating mode is continuously executed for a period of time by only the reaction-motor second stator (regarded as the normally operating motor) of the reaction control system, with clutch device 3 disengaged. Thereafter, the processor of steering controller 19 operates to engage clutch device 3 so as to switch from the SBW operating mode to the EPS operating mode.

At step S26", a check is made to determine whether an output value of a sensor signal from the second current sensor 19d2 of the reaction control system is normal. When the answer to step S26" is affirmative (YES), the routine proceeds from step S26" to step S30. Conversely when the answer to step S26" is negative (NO), the routine proceeds from step S26" to step S27".

At step S27", on the basis of the diagnostic result that the output value from the second current sensor 19d2 of the reaction control system is abnormal, the SBW operating mode is continuously executed for a period of time by only the reaction-motor first stator (regarded as the normally operating motor) of the reaction control system, with clutch device 3 disengaged. Thereafter, the processor of steering controller 19 operates to engage clutch device 3 so as to switch from the SBW operating mode to the EPS operating mode.

At step S41' of the EPS-control failure diagnostic routine of FIG. 43, a check is made to determine whether an output value of an encoder signal from the first encoder 5e1 of the steering output system is normal. When the answer to step S41' is affirmative (YES), the routine proceeds from step S41' to step S43. Conversely when the answer to step S41' is negative (NO), the routine proceeds from step S41' to step S42.

At step S41" of the EPS-control failure diagnostic routine of FIG. 43, a check is made to determine whether an output value of an encoder signal from the second encoder 5e2 of the steering output system is normal. When the answer to step S41" is affirmative (YES), the routine proceeds from step S41" to step S43. Conversely when the answer to step S41" is negative (NO), the routine proceeds from step S41" to step S42.

In the SBW vehicle steering apparatus of the sixteenth modification of FIGS. 39-43, the SBW-to-EPS mode transition control routine (steps S51-S56) of FIG. 38 is initiated, when mode-switching from the SBW operating mode to the EPS operating mode occurs in the steering-control failure diagnostic routine of FIG. 41 or in the reaction-control failure diagnostic routine of FIG. 42, that is, in each SBW-to-EPS mode transition permissible state marked by "X" in FIGS. 41 and 42.

The SBW vehicle steering apparatus of the sixteenth modification of FIGS. 39-43 has the following effect (29) in addition to the effects (22)-(26) obtained by the steering apparatus of the fifteenth modification of FIGS. 32-38.

(29) The previously-noted dual reaction actuator system constructed by reaction motors 2, 2 is comprised of a one-rotor two-stator brushless motor. In comparison with two one-rotor one-stator motors each having a rotor driven by a single stator, the one-rotor two-stator brushless motor is simple in construction and is superior in the reduced number of motor parts, reduced number of component parts interconnecting the motor shaft and column shaft 7, reduced total manufacturing costs of steering systems, and inexpensive, lightweight, and downsized dual actuator system of reduced motor-torque loss.

Figure 44:
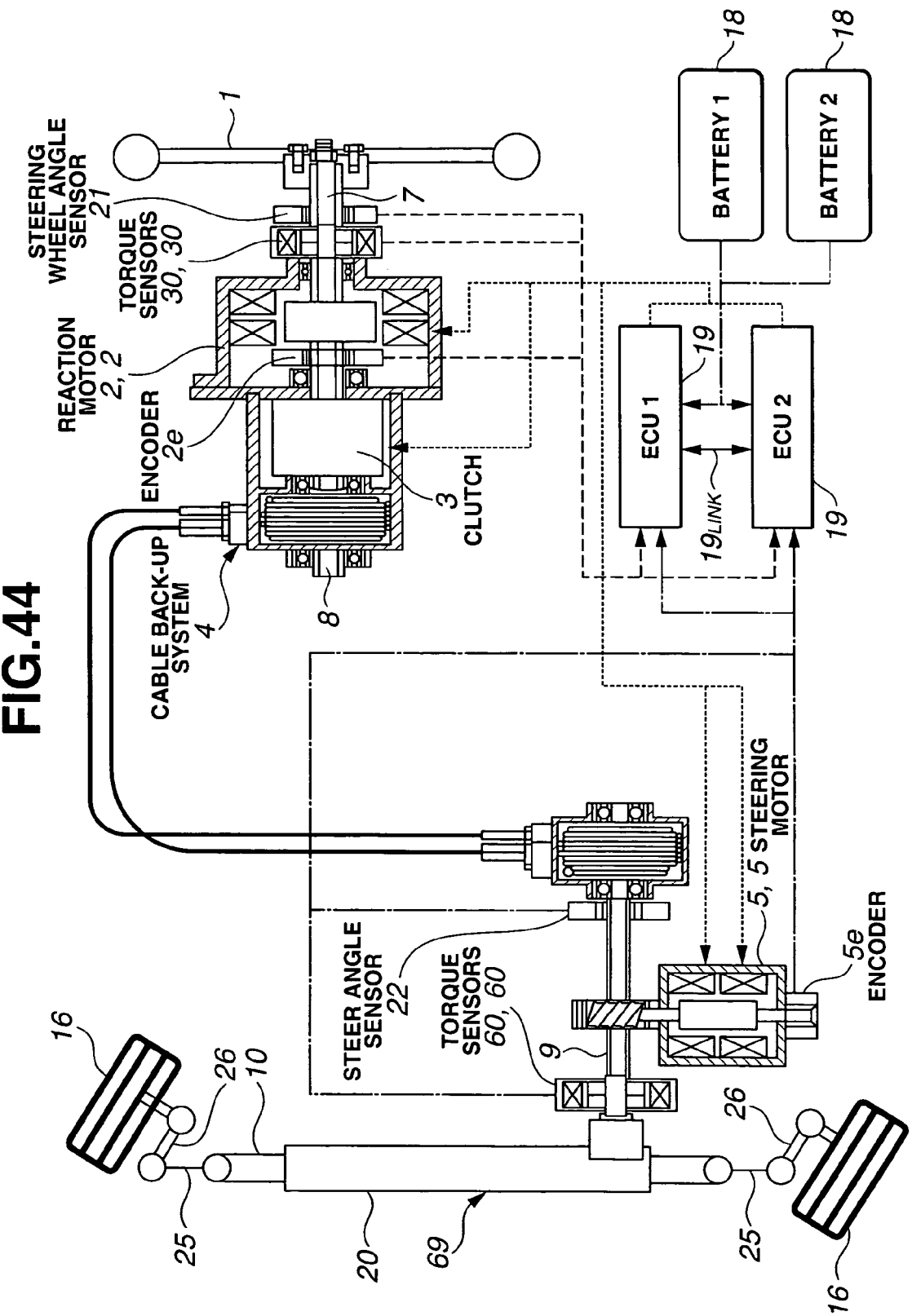
FIGS. 44-46 are detailed system diagrams illustrating another modifications.

Referring now to FIG. 44, there is shown the SBW vehicle steering apparatus of the seventeenth modification in which the dual reaction actuator system (reaction motors 2, 2) is constructed by a one-rotor two-stator brushless motor and the dual steering actuator system (steering motors 5, 5) is also constructed by a one-rotor two-stator brushless motor. As clearly shown in FIG. 44, clutch device 3 of the mechanical back-up system is provided on the side of the reaction control system and provided between the first and second column shafts 7 and 8. The other structure of the SBW vehicle steering apparatus of the seventeenth modification of FIG. 44 is identical to that of the fifteenth modification of FIGS. 32-38. The arithmetic and logic operations executed within failure diagnostic section 19a of the SBW vehicle steering system of the seventeenth modification of FIG. 44 are identical to those executed within failure diagnostic section 19a of the SBW vehicle steering system of the sixteenth modification of FIGS. 39-43. Thus, detailed description of the operations of the steering control system, the reaction control system, and the EPS control system of the SBW vehicle steering system of the seventeenth modification of FIG. 44 will be omitted because the above description thereon seems to be self-explanatory.

The SBW vehicle steering apparatus of the seventeenth modification of FIG. 44 has the following effect (30) in addition to the effects (22)-(27) obtained by the steering apparatus of the fifteenth modification of FIGS. 32-38.

(30) The previously-noted dual steering actuator system constructed by steering motors 5, 5, is comprised of a one-rotor two-stator brushless motor. Additionally, the previously-noted dual reaction actuator system constructed by reaction motors 2, 2 is comprised of a one-rotor two-stator brushless motor. In comparison with two one-rotor one-stator motors each having a rotor driven by a single stator, the one-rotor two-stator brushless motor is simple in construction and is superior in the reduced number of motor parts, reduced number of component parts interconnecting the motor shaft and the other shaft (column shaft 7 or pinion shaft 9), reduced total manufacturing costs of steering systems, and inexpensive, lightweight, and downsized dual actuator system of reduced motor-torque loss. Additionally, the mechanical back-up system is comprised of cable back-up mechanism 4 and clutch device 3. Clutch device 3 is provided on the side of the reaction control system and disposed between the steering input section (steering wheel 1) and cable back-up mechanism 4. Thus, during the SBW operating mode with clutch device 3 disengaged, it is possible to prevent the cables and pulleys of cable back-up mechanism 4 from being moved and dragged in synchronism with rotary motion of steering wheel 1, thereby avoiding the durability of cable back-up mechanism 4 from being deteriorated and also avoiding the driver's steering feel from being deteriorated owing to friction drag or frictional resistance between the outer tube and the inner cable of the Bowden cable.

Figure 45:
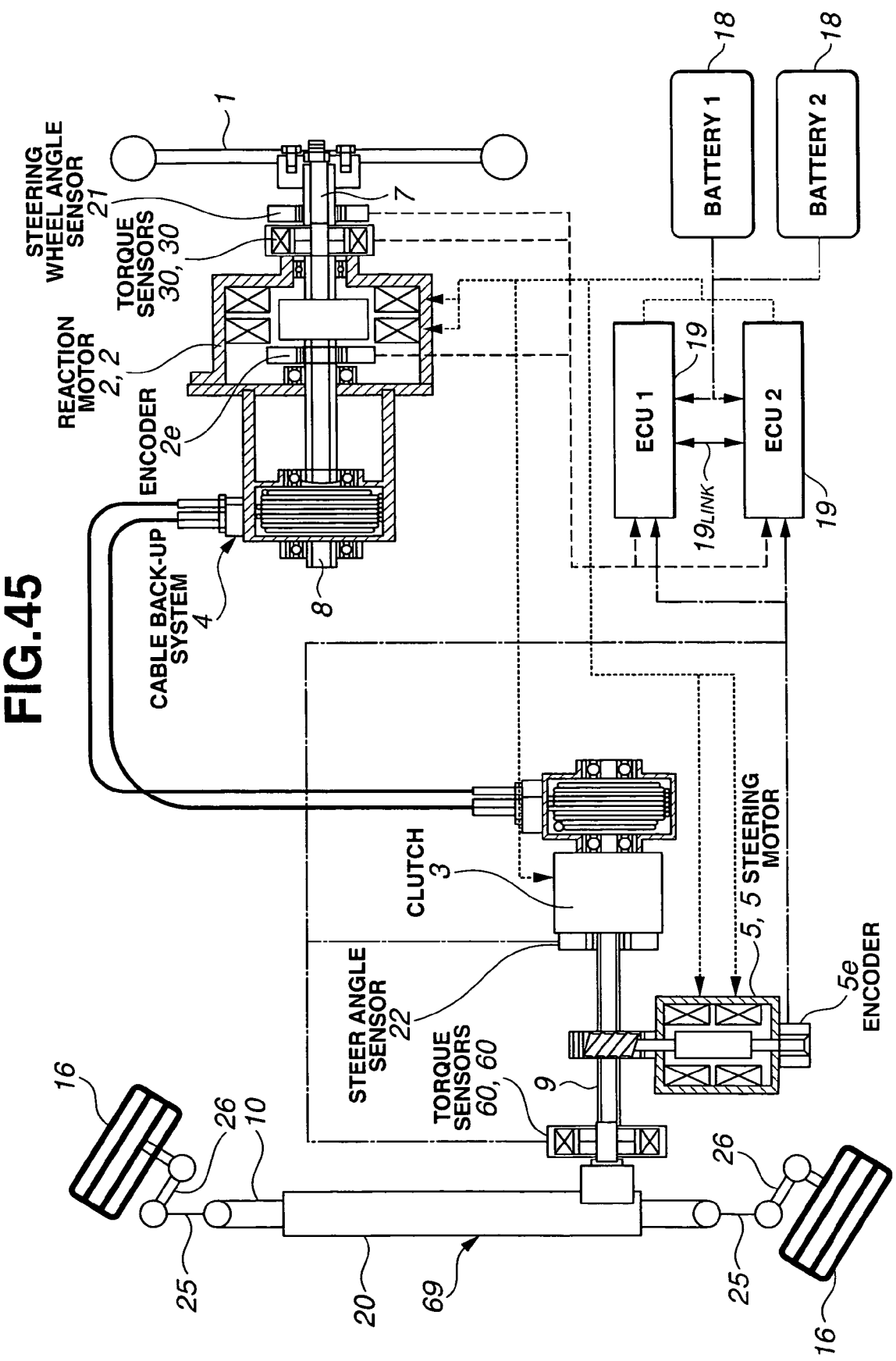

Referring now to FIG. 45, there is shown the SBW vehicle steering apparatus of the eighteenth modification in which the dual reaction actuator system (reaction motors 2, 2) is constructed by a one-rotor two-stator brushless motor and the dual steering actuator system (steering motors 5, 5) is also constructed by a one-rotor two-stator brushless motor, but clutch device 3 of the mechanical back-up system is provided on the side of the steering output system and arranged in the middle of pinion shaft 9. The other structure of the SBW vehicle steering apparatus of the eighteenth modification of FIG. 45 is identical to that of the fifteenth modification of FIGS. 32-38. The arithmetic and logic operations executed within failure diagnostic section 19a of the SBW vehicle steering system of the eighteenth modification of FIG. 45 are identical to those executed within failure diagnostic section 19a of the SBW vehicle steering system of the sixteenth modification of FIGS. 39-43. Thus, detailed description of the operations of the steering control system, the reaction control system, and the EPS control system of the SBW vehicle steering system of the eighteenth modification of FIG. 45 will be omitted because the above description thereon seems to be self-explanatory.

The SBW vehicle steering apparatus of the eighteenth modification of FIG. 45 has the following effect (31) in addition to the effects (22)-(27) obtained by the steering apparatus of the fifteenth modification of FIGS. 32-38.

(31) The previously-noted dual steering actuator system constructed by steering motors 5, 5, is comprised of a one-rotor two-stator brushless motor. Additionally, the previously-noted dual reaction actuator system constructed by reaction motors 2, 2 is comprised of a one-rotor two-stator brushless motor. In comparison with two one-rotor one-stator motors each having a rotor driven by a single stator, the one-rotor two-stator brushless motor is simple in construction and is superior in the reduced number of motor parts, reduced number of component parts interconnecting the motor shaft and the other shaft (column shaft 7 or pinion shaft 9), reduced total manufacturing costs of steering systems, and inexpensive, lightweight, and downsized dual actuator system of reduced motor-torque loss. Additionally, the mechanical back-up system is comprised of cable back-up mechanism 4 and clutch device 3. Clutch device 3 is provided on the side of the steering output system and disposed in the middle of pinion shaft 9. Thus, during the SBW operating mode with clutch device 3 disengaged, it is possible to prevent the cables and pulleys of cable back-up mechanism 4 from being moved and dragged in synchronism with movement of the steering output section (i.e., steering action for the steered wheels), thereby avoiding the durability of cable back-up mechanism 4 from being lowered.

Figure 46:
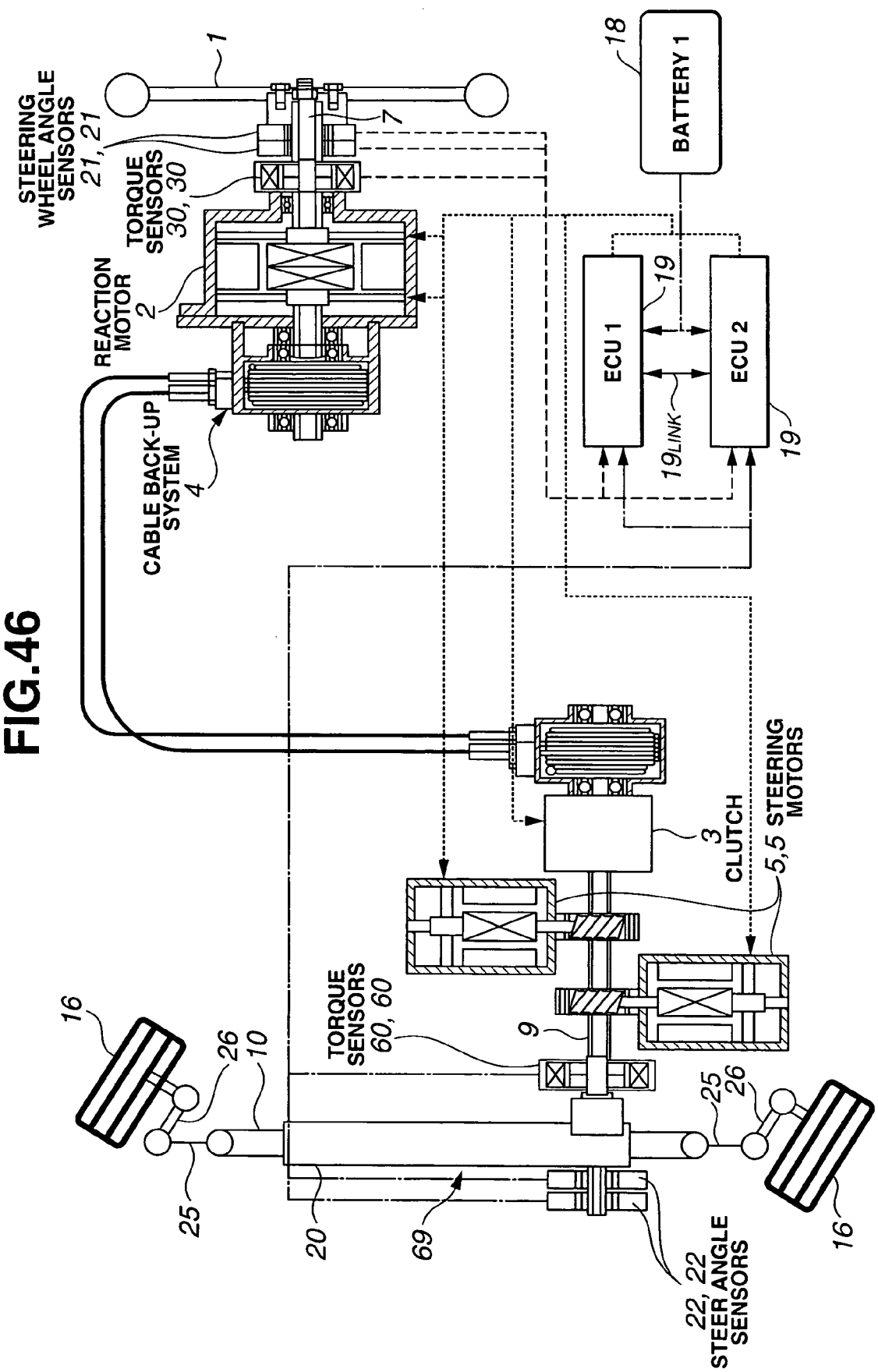
Figure 47:
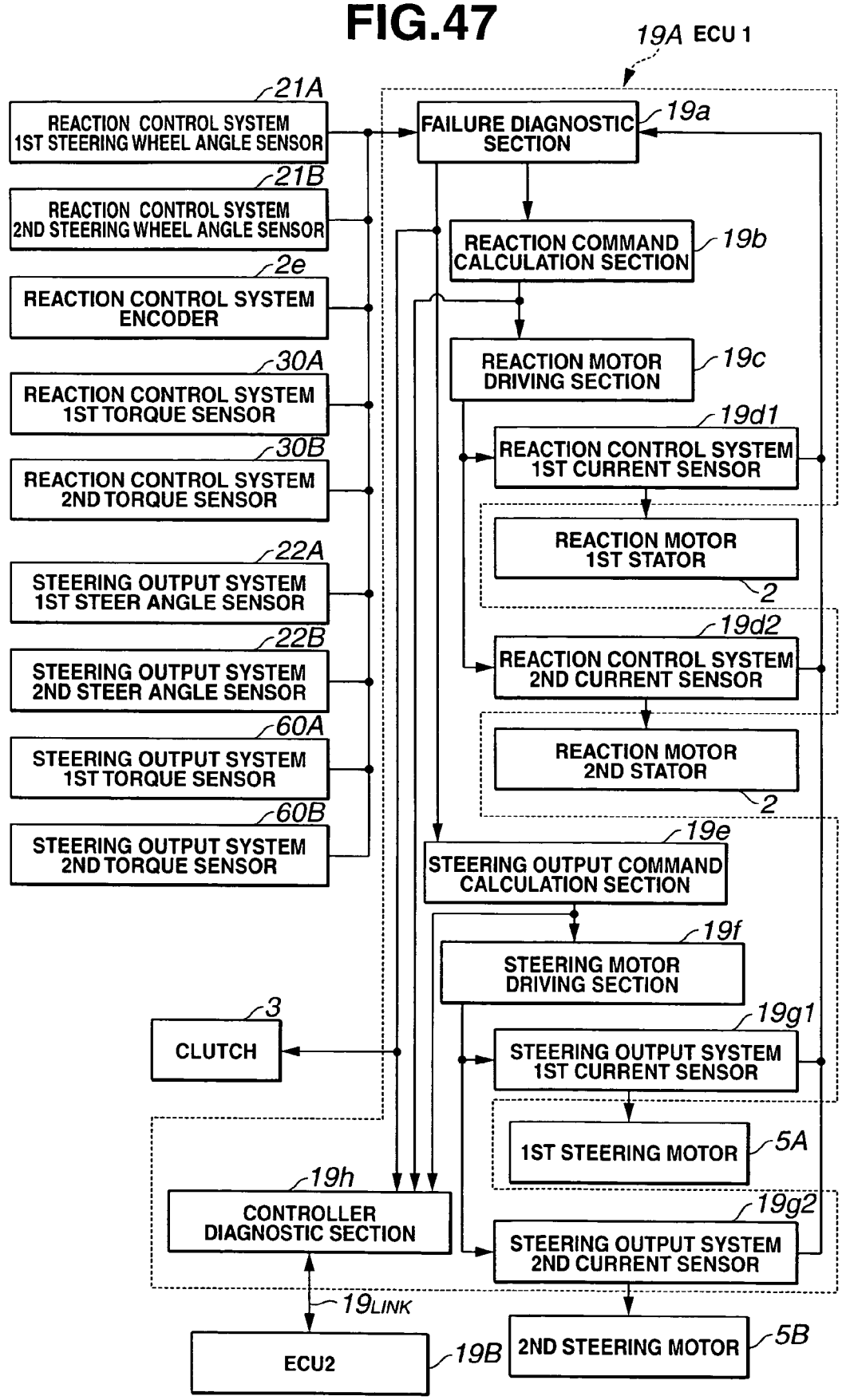
FIG. 47 is a general system block diagram showing the SBW vehicle steering apparatus of the modification of FIG. 46.

Referring now to FIGS. 46-50, there is shown the SBW vehicle steering apparatus of the nineteenth modification. As best seen in FIGS. 46-47,-in the SBW vehicle steering apparatus of the nineteenth modification of FIGS. 46-50, the actuators included in the reaction control system and the steering output system, that is, reaction motor 2, and steering motors 5, 5, are constructed by brush-equipped direct-current (DC) motors. In contrast, the SBW vehicle steering apparatus of the fifteenth (FIGS. 32-38), sixteenth (FIGS. 39-43), seventeenth (FIG. 44), eighteenth (FIG. 45) modifications use brushless motors as actuators. More concretely, as shown in FIGS. 46-47, the reaction actuator system, constructed by reaction motors 2, 2, is comprised of a two-rotor one-stator brush-equipped DC motor. Two steering wheel angle sensors 21, 21 are provided in the reaction control system instead of utilizing any encoder. In contrast to the clutch installation design of the fifteenth modification of FIGS. 32-38, clutch device 3 of the mechanical back-up system is provided on the side of the steering output system. Each of two steering motors 5, 5, constructing the dual steering actuator system, is comprised of a one-rotor one-stator brush-equipped DC motor. Two steer angle sensors 22, 22 are provided in the steering output system and attached to the axially-extending front end portion of pinion shaft 9, instead of utilizing any encoder. Due to the dual reaction motor system (reaction motors 2, 2), two reaction control system electric-current sensors 19*d*, 19*d* (exactly, the first and second reaction control system electric-current sensors 19*d*1 and 19*d*2) are provided. The other structure-of the SBW vehicle steering apparatus of the nineteenth modification of FIGS. 46-50 is identical to that of the fifteenth modification of FIGS. 32-38. Thus, in explaining the nineteenth modification of FIGS. 46-50, for the purpose of simplification of the disclosure, the same reference signs used to designate elements in the fifteenth modification of FIGS. 32-38 will be applied to the corresponding elements used in the nineteenth modification, while detailed description of the same reference signs will be omitted because the above description thereon seems to be self-explanatory. Failure diagnostic section 19*a* of the SBW vehicle steering system of the nineteenth modification of FIGS. 46-50 executes various arithmetic and logic operations, that is, the steering-control failure diagnostic routine of FIG. 48, the reaction-control failure diagnostic routine of FIG. 49, the EPS-control failure diagnostic routine of FIG. 50, and the SBW-to-EPS mode transition control routine of FIG. 38. The operations of the steering control system, the reaction control system, and the EPS control system of the SBW vehicle steering apparatus of the nineteenth modification of FIGS. 46-50 are hereunder described briefly.

Figure 48:
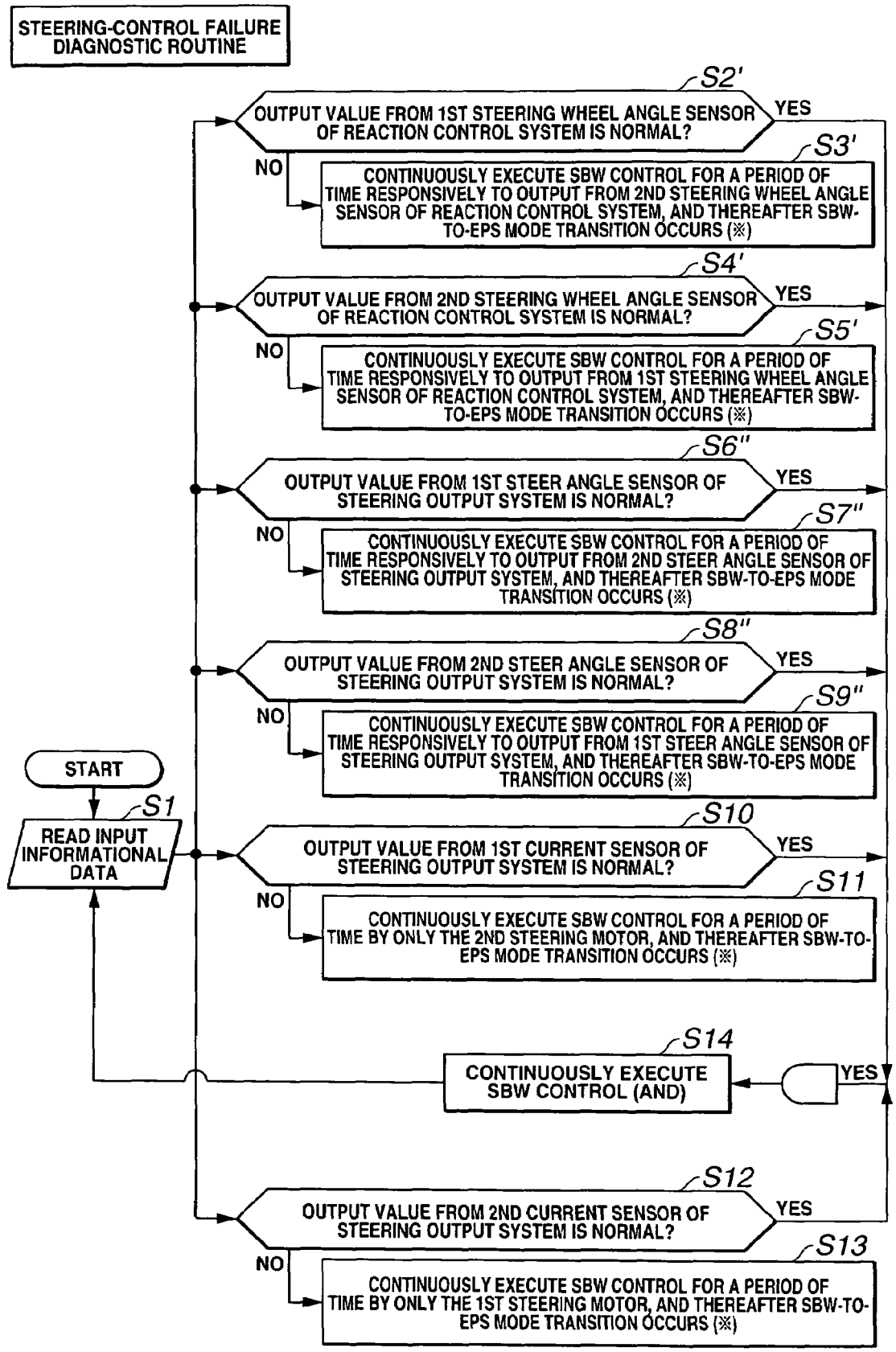
FIG. 48 is a flow chart showing a steering-control failure diagnostic routine executed within a failure diagnostic section of the steering controller incorporated in the SBW vehicle steering apparatus of the modification of FIG. 46.
Figure 49:
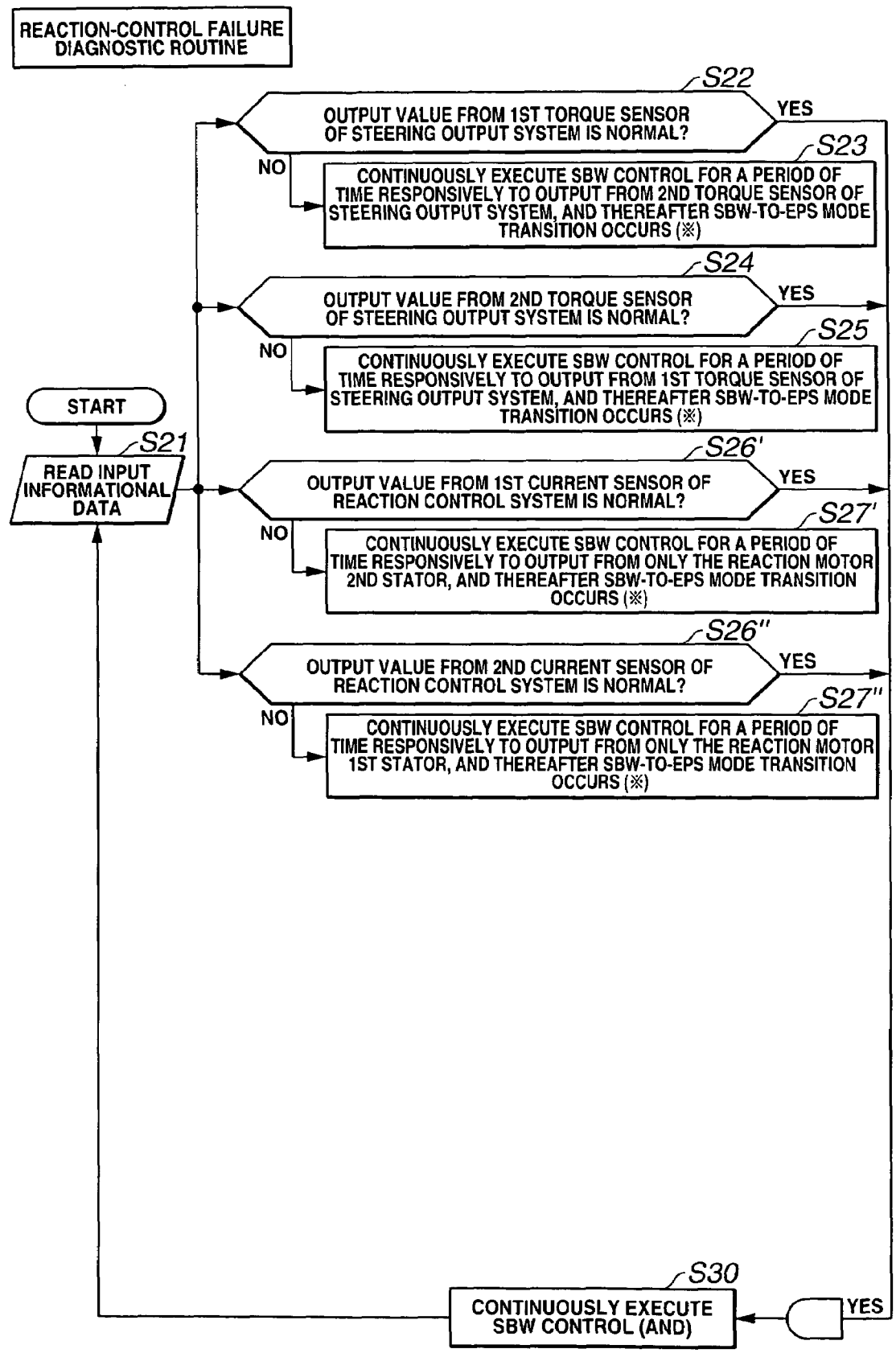
FIG. 49 is a reaction-control failure diagnostic routine executed within the failure diagnostic section of the steering controller incorporated in the SBW vehicle steering apparatus of the modification of FIG. 46.
Figure 50:
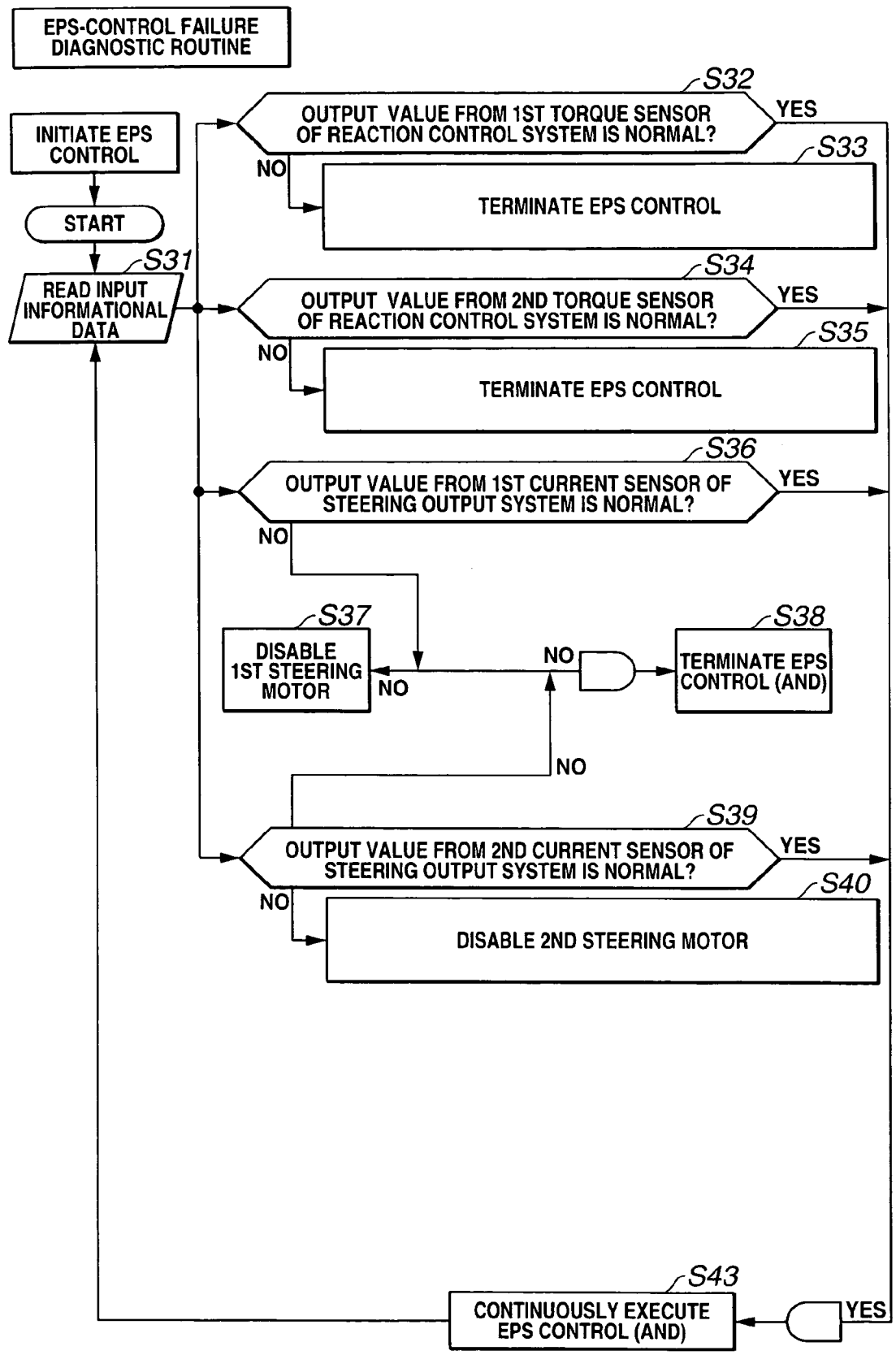
FIG. 50 is an EPS-control failure diagnostic routine executed within the failure diagnostic section of the steering controller incorporated in the SBW vehicle steering apparatus of the modification of FIG. 46.

Arithmetic and logic operations of steps S1 and S10-S14 shown in FIG. 48, steps S21-S25 and S30 shown in FIG. 49, and steps S31-S40 and S43 shown in FIG. 50 are identical to those of the flow charts of FIGS. 35-37 executed within failure diagnostic section 19*a* of the SBW vehicle steering apparatus of the fifteenth modification of FIG. 32. Also, arithmetic and logic operations of steps S26', S26", S27' and S27" shown in FIG. 49 are identical to those of the flow chart of FIG. 42 executed within failure diagnostic section 19*a* of the SBW vehicle steering apparatus of the sixteenth modification of FIG. 39. Thus, the detailed description of the same steps Si, S10-S14, S21-S25, S30-S40, S43, S26', S26", S27' and S27" will be omitted because the above description thereon seems to be self-explanatory. Only the different steps S2', S3', S4', S5', S6", S7", S8", and S9" will be hereinafter described in detail.

At step S2' of the steering-control failure diagnostic routine of FIG. 48, a check is made to determine whether an output value of a sensor signal from the first steering wheel angle sensor 21A of the reaction control system is normal. When the answer to step S2' is affirmative (YES), the routine proceeds from step S2' to step S14. Conversely when the answer to step S2' is negative (NO), the routine proceeds from step S2' to step S3'.

At step S3', on the basis of the diagnostic result that the output value from the first steering wheel angle sensor 21A of the reaction control system is abnormal, the SBW operating mode is continuously executed for a period of time by the second steering wheel angle sensor 21B of the reaction control system, with clutch device 3 disengaged. Thereafter, the processor of steering controller 19 operates to engage clutch device 3 so as to switch from the SBW operating mode to the EPS operating mode.

At step S4', a check is made to determine whether an output value of a sensor signal from the second steering wheel angle sensor 21B of the reaction control system is normal. When the answer to step S4' is affirmative (YES), the routine proceeds from step S4' to step S14. Conversely when the answer to step S4' is negative (NO), the routine proceeds from step S4' to step S5'.

At step S5', on the basis of the diagnostic result that the output value from the second steering wheel angle sensor 21B of the reaction control system is abnormal, the SBW operating mode is continuously executed for a period of time by the first steering wheel angle sensor 21A of the reaction control system, with clutch device 3 disengaged. Thereafter, the processor of steering controller 19 operates to engage clutch device 3 so as to switch from the SBW operating mode to the EPS operating mode.

At step S6", a check is made to determine whether an output value of a sensor signal from the first steer angle sensor 22A of the steering output system is normal. When the answer to step S6" is affirmative (YES), the routine proceeds from step S6" to step S14. Conversely when the answer to step S6" is negative (NO), the routine proceeds from step S6" to step S7".

At step S7", on the basis of the diagnostic result that the output value from the first steer angle sensor 22A of the steering output system is abnormal, the SBW operating mode is continuously executed for a period of time by the second steer angle sensor 22B of the steering output system, with clutch device 3 disengaged. Thereafter, the processor of steering controller 19 operates to engage clutch device 3 so as to switch from the SBW operating mode to the EPS operating mode.

At step S8", a check is made to determine whether an output value of a sensor signal from the second steer angle sensor 22B of the steering output system is normal. When the answer to step S8" is affirmative (YES), the routine proceeds from step S8" to step S14. Conversely when the answer to step S8" is negative (NO), the routine proceeds from step S8" to step S9".

At step S9", on the basis of the diagnostic result that the output value from the second steer angle sensor 22B of the steering output system is abnormal, the SBW operating mode is continuously executed for a period of time by the first steer angle sensor 22A of the steering output system, with clutch device 3 disengaged. Thereafter, the processor of steering controller 19 operates to engage clutch device 3 so as to switch from the SBW operating mode to the EPS operating mode.

In the SBW vehicle steering apparatus of the nineteenth modification of FIGS. 46-50, the SBW-to-EPS mode transition control routine (steps S51-S56) of FIG. 38 is initiated, when mode-switching from the SBW operating mode to the EPS operating mode occurs in the steering-control failure diagnostic routine of FIG. 48 or in the reaction-control failure diagnostic routine of FIG. 49, that is, in each SBW-to-EPS mode transition permissible state marked by "✕" in FIGS. 48 and 49.

The SBW vehicle steering apparatus of the nineteenth modification of FIGS. 46-50 has the following effects (32)-(33) in addition to the effects (22)-(25) obtained by the steering apparatus of the fifteenth modification of FIGS. 32-38.

(32) The previously-noted dual steering actuator system constructed by steering motors 5, 5, is comprised of a pair of two-rotor one-stator brush-equipped DC motors. Additionally, the previously-noted dual reaction actuator system constructed by reaction motors 2, 2 is comprised of a brush-equipped DC motor. In case of the use of DC motors, it is possible to produce both of reaction torque (feedback torque) and steering torque by directly using a direct current from a DC electric-power source (a car battery) without using a DC-AC converter that converts the direct current from the DC power source to an alternating current (AC).

(33) The previously-noted dual reaction actuator system constructed by reaction motors 2, 2 is comprised of a two-rotor one-stator brush-equipped DC motor. In comparison with two one-rotor one-stator motors each having a rotor driven by a single stator, the two-rotor one-stator brush-equipped DC motor is simple in construction and is superior in the reduced number of motor parts, reduced number of component parts interconnecting the motor shaft and column shaft 7, reduced total manufacturing costs of steering systems, and inexpensive, lightweight, and downsized dual actuator system of reduced motor-torque loss.

In the SBW vehicle steering apparatus of each of the modifications of FIGS. 32-50, clutch device 3 of the mechanical back-up system is provided on either one of the side of the reaction control system and the side of the steering output system. Alternatively, two clutch devices 3, 3 of the mechanical back-up system may be respectively provided on the side of the reaction control system and the side of the steering output system, so as to completely avoid the cables and pulleys of cable back-up mechanism 4 from being undesirably moved and dragged in synchronism with movement of the steering input section (steering wheel 1) and movement of the steering output section linked to steered wheels 16, 16, during the back-up operating mode with clutch devices 3, 3 both disengaged.

The entire contents of Japanese Patent Application Nos. 2003-344520 (filed Oct. 2, 2003), 2003-344839 (filed Oct. 2, 2003), 2003-395960 (filed Nov. 26, 2003), and 2003-344519 (filed Oct. 2, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle steering apparatus comprising:
    a steering input section having at least a steering wheel to which steering input is applied;
    a steering output section having at least a steering rack shaft and operatively associated with left and right steered wheels for steering the steered wheels by steering-rack-shaft movement produced by a steering force determined based on the steering input;
    mechanical transmission means via which the steering force is transmitted to the steering rack shaft;
    the steering rack shaft being split into left and right movable rack shaft portions; and
    the mechanical transmission means including a steer angle converter enabling a differential rack stroke between left and right rack strokes of the left and right movable rack shaft portions by one rotation input that is input directly to the steering rack shaft, when steering the left and right steered wheels.

2. The vehicle steering apparatus as claimed in claim 1, wherein:
    the steer angle converter comprises:
    (i) a left variable-pitch rack-and-pinion mechanism including a left variable rack having a left variable-pitch rack gear portion formed on the left movable rack shaft portion and a left pinion shaft having a left pinion gear portion in meshed-engagement with the left variable-pitch rack gear portion; and
    (ii) a right variable-pitch rack-and-pinion mechanism including a right variable rack having a right variable-pitch rack gear portion formed on the right movable rack shaft portion and a right pinion shaft having a right pinion gear portion in meshed-engagement with the right variable-pitch rack gear portion,
    wherein the left and right variable-pitch rack-and-pinion mechanisms cooperate with each other to enable a rack-stroke difference between the left and right movable rack shaft portions for a same pinion-shaft rotary motion.

3. A vehicle steering apparatus comprising:
    a steering input section having at least a steering wheel to which steering input is applied;
    a steering output section having at least a steering rack shaft and operatively associated with left and right steered wheels for steering the steered wheels by steering-rack-shaft movement produced by a steering force determined based on the steering input and transmitted directly or indirectly to the steering rack shaft;
    the steering rack shaft being split into left and right movable rack shaft portions; and
    a steer angle converter enabling a differential rack stroke between left and right rack strokes of the left and right movable rack shaft portions,
    wherein:
    the steer angle converter comprises:
    (i) a left variable-pitch rack-and-pinion mechanism including a left variable rack having a left variable-pitch rack gear portion formed on the left movable rack shaft portion and a left pinion shaft having a left pinion gear portion in meshed-engagement with the left variable-pitch rack gear portion; and (ii) a right variable-pitch rack-and-pinion mechanism including a right variable rack having a right variable-pitch rack gear portion formed on the right movable rack shaft portion and a right pinion shaft having a right pinion gear portion in meshed-engagement with the right variable-pitch rack gear portion, wherein the left and right variable-pitch rack-and-pinion mechanisms cooperate with each other to enable a rack-stroke difference between the left and right movable rack shaft portions for a same pinion-shaft rotary motion;

a steer-by-wire (SBW) system in which the steering wheel of the steering input section is mechanically separated from the steering rack shaft of the steering output section and the steering-rack-shaft movement is produced responsively to a command signal determined based on the steering input; and a mechanical back-up system capable of mechanically coupling the steering input section with the steering output section, the mechanical back-up system comprising:

(i) a cable back-up mechanism having three cylindrical pulleys; and (ii) a clutch device provided on a side of the steering input section; and the SBW system comprising two steering actuators that drive the respective movable rack shaft portions responsively to the command signal.

4. The vehicle steering apparatus as claimed in claim 2, further comprising:

a steer-by-wire (SBW) system in which the steering wheel of the steering input section is mechanically separated from the steering rack shaft of the steering output section and the steering-rack-shaft movement is produced responsively to a command signal determined based on the steering input;

a mechanical back-up system capable of mechanically coupling the steering input section with the steering output section, the mechanical back-up system comprising:

(i) a cable back-up mechanism having two cylindrical pulleys;

(ii) a first clutch device provided on a side of the steering input section; and (iii) a second clutch device provided on a side of the steering output section; and the SBW system comprising a single steering actuator that drives the left and right movable rack shaft portions responsively to the command signal.

5. The vehicle steering apparatus as claimed in claim 2, further comprising:

a direct-coupled steering linkage comprising:

(i) a column shaft fixedly connected to the steering wheel (1) and formed integral with a first one of the left and right pinion shafts;

(ii) a movable connection shaft mechanically linking the first and second pinion shafts to each other;

(iii) a first constant-pitch rack-and-pinion mechanism including a first constant-pitch rack having a first constant-pitch rack gear portion formed on the movable connection shaft and the first pinion shaft having a first pinion gear portion in meshed-engagement with the first constant-pitch rack gear portion; and (iv) a second constant-pitch rack-and-pinion mechanism including a second constant-pitch rack having a second constant-pitch rack gear portion formed on the movable connection shaft and the second pinion shaft having a second pinion gear portion in meshed-engagement with the second constant-pitch rack gear portion, wherein the column shaft, the movable connection shaft, and the first and second constant-pitch rack-and-pinion mechanisms cooperate with each other to directly transmit the steering force from the steering wheel via the direct-coupled steering linkage to each of the left and right movable rack shaft portions.

6. A vehicle steering apparatus comprising:

a steering input section having at least a steering wheel to which steering input is applied;

a steering output section having at least a steering rack shaft and operatively associated with left and right steered wheels for steering the steered wheels by steering-rack-shaft movement produced by a steering force determined based on the steering input and transmitted directly or indirectly to the steering rack shaft;

the steering rack shaft being split into left and right movable rack shaft portions; and a steer angle converter enabling a differential rack stroke between left and right rack strokes of the left and right movable rack shaft portions, wherein:

the steer angle converter comprises:

(i) a left frusto-conical taper pulley of a cable steering column system associated with a left rack-and-pinion mechanism and fixedly connected to and coaxially arranged with a left pinion shaft, so that an effective diameter of a cable wound on the left taper pulley varies depending on the rack stroke of the left movable rack shaft portion; and (ii) a right frusto-conical taper pulley of the cable steering column system associated with a right rack-and-pinion mechanism and fixedly connected to and coaxially arranged with a right pinion shaft, so that an effective diameter of a cable wound on the right taper pulley varies depending on the rack stroke of the right movable rack shaft portion, and that a sum of the effective diameter of the cable wound on the left taper pulley and the effective diameter of the cable wound on the right taper pulley is constant;

wherein the left and right taper pulleys cooperate with each other to provide a differential movement of the left and right pinion shafts and consequently to enable the differential rack stroke between the left and right movable rack shaft portions.

7. The vehicle steering apparatus as claimed in claim 6, further comprising:

a steer-by-wire (SBW) system in which the steering wheel of the steering input section is mechanically separated from the steering rack shaft of the steering output section and the steering-rack-shaft movement is produced responsively to a command signal determined based on the steering input;

a mechanical back-up system capable of mechanically coupling the steering input section with the steering output section, the mechanical back-up system comprising:

(i) a cable back-up mechanism having a cylindrical pulley and the left and right taper pulleys; and (ii) a clutch device provided on a side of the steering input section; and the SBW system comprising two steering actuators that drive the respective movable rack shaft portions responsively to the command signal, wherein the left rack-and-pinion mechanism includes a left constant-pitch rack having a left constant-pitch rack gear portion formed on the left movable rack shaft portion and the left pinion shaft having a left pinion gear portion in meshed-engagement with the left constant-pitch rack gear portion, and the right rack-and-pinion mechanism includes a right constant-pitch rack having a right constant-pitch rack gear portion formed on the right movable rack shaft portion and the right pinion shaft having a right pinion gear portion in meshed-engagement with the right constant-pitch rack gear portion, and wherein the left and right constant-pitch rack-and-pinion mechanisms cooperate with each other to enable a rack-stroke characteristic that there is no rack-stroke difference between the left and right movable rack shaft portions for a same pinion-shaft rotary motion, and the left and right taper pulleys cooperate with each other to provide a differential movement of the left and right pinion shafts and consequently to enable the differential rack stroke between the left and right movable rack shaft portions.

8. The vehicle steering apparatus as claimed in claim 6, further comprising:

a steer-by-wire (SBW) system in which the steering wheel of the steering input section is mechanically separated from the steering rack shaft of the steering output section and the steering-rack-shaft movement is produced responsively to a command signal determined based on the steering input;

a mechanical back-up system capable of mechanically coupling the steering input section with the steering output section, the mechanical back-up system comprising:

(i) a cable back-up mechanism having a cylindrical pulley and the left and right taper pulleys; and (ii) a clutch device provided on a side of the steering input section; and the SBW system comprising two steering actuators that drive the respective movable rack shaft portions responsively to the command signal, wherein the left rack-and-pinion mechanism includes a left variable rack having a left variable-pitch rack gear portion, which is formed on the left movable rack shaft portion and whose gear pitch gradually decreases from an innermost end to an outermost end, and the left pinion shaft having a left pinion gear portion in meshed-engagement with the left variable-pitch rack gear portion; and the right rack-and-pinion mechanism includes a right variable rack having a right variable-pitch rack gear portion, which is formed on the right movable rack shaft portion and whose gear pitch gradually decreases from an innermost end to an outermost end, and the right pinion shaft having a right pinion gear portion in meshed-engagement with the right variable-pitch rack gear portion, wherein the left and right variable-pitch rack-and-pinion mechanisms cooperate with each other to enable a differential rack-stroke characteristic that the rack stroke of a first one of the left and right movable rack shaft portions, extending and moving outside, becomes relatively greater than the rack stroke of the second rack shaft portion, contracting and moving inside during steering operation.

9. The vehicle steering apparatus as claimed in claim 6, further comprising:

a steer-by-wire (SBW) system in which the steering wheel of the steering input section is mechanically separated from the steering rack shaft of the steering output section and the steering-rack-shaft movement is produced responsively to a command signal determined based on the steering input;

a mechanical back-up system capable of mechanically coupling the steering input section with the steering output section, the mechanical back-up system comprising:

(i) a cable back-up mechanism having a cylindrical pulley and the left and right taper pulleys; and (ii) a clutch device provided on a side of the steering input section; and the SEW system comprising two steering actuators that drive the respective movable rack shaft portions responsively to the command signal, wherein the left rack-and-pinion mechanism includes a left variable rack having a left variable-pitch rack gear portion, which is formed on the left movable rack shaft portion and whose gear pitch gradually increases from an innermost end to an outermost end, and the left pinion shaft having a left pinion gear portion in meshed-engagement with the left variable-pitch rack gear portion; and the right rack-and-pinion mechanism includes a right variable rack having a right variable-pitch rack gear portion, which is formed on the right movable rack shaft portion and whose gear pitch gradually increases from an innermost end to an outermost end, and the right pinion shaft having a right pinion gear portion in meshed-engagement with the right variable-pitch rack gear portion, wherein the left and right variable-pitch rack-and-pinion mechanisms cooperate with each other to enable an inverted differential rack-stroke characteristic that the rack stroke of a first one of the left and right movable rack shaft portions, extending and moving outside, becomes relatively smaller than the rack stroke of the second rack shaft portion, contracting and moving inside during steering operation.

10. The vehicle steering apparatus as claimed in claim 6, further comprising:

a steer-by-wire (SBW) system in which the steering wheel of the steering input section is mechanically separated from the steering rack shaft of the steering output section and the steering-rack-shaft movement is produced responsively to a command signal determined based on the steering input;

a mechanical back-up system capable of mechanically coupling the steering input section with the steering output section, the mechanical back-up system comprising:

(i) a cable back-up mechanism having a cylindrical pulley and the left and right taper pulleys; and (ii) a clutch device provided on a side of the steering input section; and the SBW system comprising a single steering actuators that drives the left and right movable rack shaft portions responsively to the command signal, wherein the left rack-and-pinion mechanism includes a left constant-pitch rack having a left constant-pitch rack gear portion formed on the left movable rack shaft portion and the left pinion shaft having a left pinion gear portion in meshed-engagement with the left constant-pitch rack gear portion, and the right rack-andpinion mechanism includes a right constant-pitch rack having a right constant-pitch rack gear portion formed on the right movable rack shaft portion and the right pinion shaft having a right pinion gear portion in meshed-engagement with the right constant-pitch rack gear portion, and wherein the left and right constant-pitch rack-and-pinion mechanisms cooperate with each other to enable a rack-stroke characteristic that there is no rack-stroke difference between the left and right movable rack shaft portions for a same pinion-shaft rotary motion, and the left and right taper pulleys cooperate with each other to provide a differential movement of the left and right pinion shafts and consequently to enable the differential rack stroke between the left and right movable rack shaft portions.

11. The vehicle steering apparatus as claimed in claim 6, further comprising:

a steer-by-wire (SBW) system in which the steering wheel of the steering input section is mechanically separated from the steering rack shaft of the steering output section and the steering-rack-shaft movement is produced responsively to a command signal determined based on the steering input;

a mechanical back-up system capable of mechanically coupling the steering input section with the steering output section, the mechanical back-up system comprising:
(i) a cable back-up mechanism having a cylindrical pulley and the left and right taper pulleys; and
(ii) a clutch device provided on a side of the steering input section; and the SBW system comprising a single steering actuators that drives the left and right movable rack shaft portions responsively to the command signal, wherein the left rack-and-pinion mechanism includes a left variable rack having a left variable-pitch rack gear portion, which is formed on the left movable rack shaft portion and whose gear pitch gradually decreases from an innermost end to an outermost end, and the left pinion shaft having a left pinion gear portion in meshed-engagement with the left variable-pitch rack gear portion; and the right rack-and-pinion mechanism includes a right variable rack having a right variable-pitch rack gear portion, which is formed on the right movable rack shaft portion and whose gear pitch gradually decreases from an innermost end to an outermost end, and the right pinion shaft having a right pinion gear portion in meshed-engagement with the right variable-pitch rack gear portion, wherein the left and right variable-pitch rack-and-pinion mechanisms, and the left and right taper pulleys cooperate with each other to enable a multiplied differential rack-stroke characteristic that the rack stroke of a first one of the left and right movable rack shaft portions, extending and moving outside, becomes relatively greater than the rack stroke of the second rack shaft portion, contracting and moving inside during steering operation.

12. The vehicle steering apparatus as claimed in claim 6, further comprising:

a steer-by-wire (SBW) system in which the steering wheel of the steering input section is mechanically separated from the steering rack shaft of the steering output section and the steering-rack-shaft movement is produced responsively to a command signal determined based on the steering input;

a mechanical back-up system capable of mechanically coupling the steering input section with the steering output section, the mechanical back-up system comprising:
(i) a cable back-up mechanism having a cylindrical pulley and the left and right taper pulleys; and
(ii) a clutch device provided on a side of the steering input section; and the SBW system comprising a single steering actuators that drives the left and right movable rack shaft portions responsively to the command signal, wherein the left rack-and-pinion mechanism includes a left variable rack having a left variable-pitch rack gear portion, which is formed on the left movable rack shaft portion and whose gear pitch gradually increases from an innermost end to an outermost end, and the left pinion shaft having a left pinion gear portion in meshed-engagement with the left variable-pitch rack gear portion; and the right rack-and-pinion mechanism includes a right variable rack having a right variable-pitch rack gear portion, which is formed on the right movable rack shaft portion and whose gear pitch gradually increases from an innermost end to an outermost end, and the right pinion shaft having a right pinion gear portion in meshed-engagement with the right variable-pitch rack gear portion, wherein the left and right variable-pitch rack-and-pinion mechanisms, and the left and right taper pulleys cooperate with each other to enable a multiplied inverted differential rack-stroke characteristic that the rack stroke of a first one of the left and right movable rack shaft portions, extending and moving outside, becomes relatively smaller than the rack stroke of the second rack shaft portion, contracting and moving inside during steering operation.

13. The vehicle steering apparatus as claimed in claim 3, further comprising:

a steering wheel angle sensor that detects a steering wheel angle of the steering wheel;

a steering controller system capable of selectively engaging or disengaging the clutch device depending on the steering wheel angle detected;

the steering controller system engaging the clutch device when the steering wheel angle is within a predetermined steering-wheel-angle range, for enabling a synchronous movement of the left and right movable rack shaft portions with no differential rack stroke of the left and right movable rack shaft portions; and the steering controller system disengaging the clutch device when the steering wheel angle is out of the predetermined steering-wheel-angle range, for controlling the two steering actuators independently of each other to provide the differential rack stroke between the left and right movable rack shaft portions and consequently to enable a required Ackerman ratio.

14. The vehicle steering apparatus as claimed in claim 3, further comprising:

a vehicle speed sensor that detects a vehicle speed;

a steering controller system capable of selectively engaging or disengaging the clutch device depending on the vehicle speed detected;

the steering controller system engaging the clutch device when the vehicle speed is out of a predetermined vehicle-speed range, for enabling a synchronous movement of the left and right movable rack shaft portions with no differential rack stroke of the left and right movable rack shaft portions; and the steering controller system disengaging the clutch device when the vehicle speed is within the predetermined vehicle speed range, for controlling the two steering actuators independently of each other to provide the differential rack stroke between the left and right movable rack shaft portions and consequently to enable a required Ackerman ratio.

15. The vehicle steering apparatus as claimed in claim 3, wherein:
the clutch device of the steering input section comprises a friction clutch provided between the steering wheel and the cable back-up mechanism; and
a predetermined transmitted torque capacity of the friction clutch is set to be lower than a lower one of an axial yielding point of an inner cable of the cable back-up mechanism and an axial yielding point of an outer tube of the cable back-up mechanism.

16. The vehicle steering apparatus as claimed in claim 4, wherein:
the first clutch device of the steering input section comprises a first friction clutch provided between the steering wheel and the cable back-up mechanism and the second clutch device of the steering output section comprises a second friction clutch provided between the cable back-up mechanism and the steering rack shaft; and
a first limitation transmitted torque, above which the first friction clutch starts to slip in a clutch engaged state in which the first and second friction clutches are both engaged, is set to be lower than a second limitation transmitted torque, above which the second friction clutch starts to slip in the clutch engaged state.

17. The vehicle steering apparatus as claimed in claim 16, wherein:
a predetermined transmitted torque capacity of the first friction clutch is set to be lower than a lower one of an axial yielding point of an inner cable of the cable back-up mechanism and an axial yielding point of an outer tube of the cable back-up mechanism.

18. The vehicle steering apparatus as claimed in claim 3, wherein:
each of system configurations of an actuator system, a sensor system, and a steering controller system, all provided to control the steering output section in response to the command signal, comprises a multiple system configuration higher than a dual system configuration.

19. The vehicle steering apparatus as claimed in claim 18, wherein:
when a first control system of the SBW system of the multiple system configuration is failed, a normally-operating, unfailed control system except the failed first control system continuously executes an SBW operating mode for a period of time until a predetermined condition that the steering input section is conditioned at a position substantially corresponding to a neutral position of the steering input section and additionally the steering output section is conditioned at a position substantially corresponding to a neutral position of the steering output section becomes satisfied, and then operates to shift from the SBW operating mode to a back-up operating mode by engaging the clutch device of the mechanical back-up system only when the predetermined condition has been satisfied.

20. The vehicle steering apparatus as claimed in claim 19, wherein:
during the back-up operating mode, the unfailed control system executes an electric motor-assist power-steering (EPS) control.

21. The vehicle steering apparatus as claimed in claim 18, further comprising:
a first torque sensor system that detects a steering torque applied to the steering wheel; and
a steering wheel angle sensor that detects a steering wheel angle of the steering wheel and is provided between the steering wheel and the first torque sensor system.

22. The vehicle steering apparatus as claimed in claim 18, wherein:
the steering controller system comprises a first steering controller and a second steering controller;
the system configuration of the actuator system comprises two steering actuators operatively associated with the left pinion shaft and two steering actuators operatively associated with the right pinion shaft;
the first and second steering controllers comprises a diagonal-split layout of command-signal circuits that the first steering controller is assigned to control a first one of the two steering actuators operatively associated with the left pinion shaft to drive the left rack and a first one of the two steering actuators operatively associated with the right pinion shaft to drive the right rack, and the second steering controller is assigned to control the second steering actuator operatively associated with the left pinion shaft to drive the left rack and the second steering actuator operatively associated with the right pinion shaft to drive the right rack.

23. The vehicle steering apparatus as claimed in claim 18, further comprising:
a second torque sensor system that detects a steering torque created by steering action of the steered wheel; and
a steer angle sensor that detects a steer angle of the steered wheel and is provided between the mechanical back-up system and the second torque sensor system.

24. The vehicle steering apparatus as claimed in claim 18, wherein:
the steering input section comprises a reaction control system having a reaction actuator system that reproduces a virtual steering reaction torque acting on the steering wheel;
the steering output section comprises a steering output system having a steering actuator system through which the steered wheels are steered;
the reaction actuator system comprises reaction motors each comprising a brushless motor; and
the steering actuator system comprises steering motors each comprising a brushless motor.

25. The vehicle steering apparatus as claimed in claim 24, wherein:
the steering motor comprises a one-rotor two-stator brushless motor.

26. The vehicle steering apparatus as claimed in claim 24, wherein:
the reaction motor comprises a one-rotor two-stator brushless motor.

27. The vehicle steering apparatus as claimed in claim 24, wherein:
each of the steering motor and the reaction motor comprises a one-rotor two-stator brushless motor; and
the clutch device is provided between the reaction control system and the cable back-up mechanism.

28. The vehicle steering apparatus as claimed in claim 24, wherein:

each of the steering motor and the reaction motor comprises a one-rotor two-stator brushless motor; and the clutch device is provided between the cable back-up mechanism and the steering output system.

29. The vehicle steering apparatus as claimed in claim 18, wherein:

the steering input section comprises a reaction control system having a reaction actuator system that reproduces a virtual steering reaction torque acting on the steering wheel;

the steering output section comprises a steering output system having a steering actuator system through which the steered wheels are steered;

the reaction actuator system comprises reaction motors each comprising a brush-equipped direct-current (DC) motor; and the steering actuator system comprises steering motors each comprising a brush-equipped DC motor.

30. The vehicle steering apparatus as claimed in claim 29, wherein:

the reaction motor comprises a two-rotor one-stator brush-equipped DC motor.

31. The vehicle steering apparatus as claimed in claim 3, wherein:

the clutch device comprises an electromagnetic clutch capable of coupling clutch input and output shafts with each other by way of an attraction force arising from a magnetic flux produced by applying an exciting current to an electromagnetic coil.

32. The vehicle steering apparatus as claimed in claim 3, wherein:

the clutch device comprises an electromagnetic mechanical clutch, which is a combined clutch unit of an electromagnet and a two-way roller clutch.

\* \* \* \* \*